United States Patent [19]

Tesler et al.

[11] Patent Number: 5,357,283
[45] Date of Patent: Oct. 18, 1994

[54] REFLECTED MODULATED TELEVISION SYSTEM

[76] Inventors: Vladimir E. Tesler; Irina A. Averbukh, both of prospekt Mira, 9I, kirpus I, kv. I20, Moscow, Russian Federation

[21] Appl. No.: 124,426

[22] Filed: Sep. 20, 1993

Related U.S. Application Data

[63] Continuation of Ser. No. 490,650, May 29, 1990, abandoned.

[51] Int. Cl.$^5$ .............................................. H04N 7/08
[52] U.S. Cl. ................... 348/433; 348/423; 348/436; 348/434; 348/435
[58] Field of Search ............... 348/432, 433, 434, 435, 348/436, 453, 455, 457; H04N 7/08, 7/087

[56] References Cited

U.S. PATENT DOCUMENTS 4,622,578 11/1986 Rzeszewski.
4,630,099 12/1986 Rzeszewski.

FOREIGN PATENT DOCUMENTS 48623 12/1976 Japan.
2169468 7/1986 United Kingdom.
3957 7/1987 World Int. Prop. O..

OTHER PUBLICATIONS

An HDTV Broadcasting System Utilizing a Bandwidth Compression Technique-MUSE, by Yuichi Ninomiya, et al., NHK (Japan Broadcasting Corp.) Science and Technical Research Lab. IEEE Transactions On Broadcasting, vol. BC-33, No. 4, Dec. 1987.
Report 1074–Satellite Transmission Of Multiplexed Analogue Component (MAC) Vision Signals, pp. 82–98, 1986.
Electronics (Russian), vol. 56, No. 14, pp. 82–84, 1983.

*Primary Examiner*—Tommy P. Chin
*Assistant Examiner*—Vu Le
*Attorney, Agent, or Firm*—Lilling & Lilling

[57] ABSTRACT

A television system, the composite color television signal ($E_M(t)$) whereof is generated using reflected modulated signals ($E_3(t)$), wherein at the transmitting side video signals ($E_{1-1}(t)$, $E_{1-2}(t)$) are used to quadrature modulate subcarriers at the zero and $\pm(\pi/2)$ phases, thereby generating folded-band signals ($E_3(t)$) at subcarrier frequencies selected such as to provide the required phase shifts of the subcarriers in adjacent lines of one frame and in identically numbered lines of adjacent frames. The thus generated folded-band signals are transmitted during time intervals allocated for them in the composite color television signal ($E_M(t)$). At the receiving side, separating messages of folded-band signals ($E_3(t)$) out of the received composite color television signal ($E_M(t)$) and delaying these messages in delay units (11) for time intervals constituting multiples of the television scan. The process then involves multiplying the delayed and undelayed messages by harmonic signals ($U_1(t)$, $U_2(t)$) in multipliers ($12_1$, $12_2$), algebraically summing the products in adder (13), and separating the modulating video signals ($E_{1-1}(t)$, $E_{1-2}(t)$) out of the resulting signals.

25 Claims, 15 Drawing Sheets

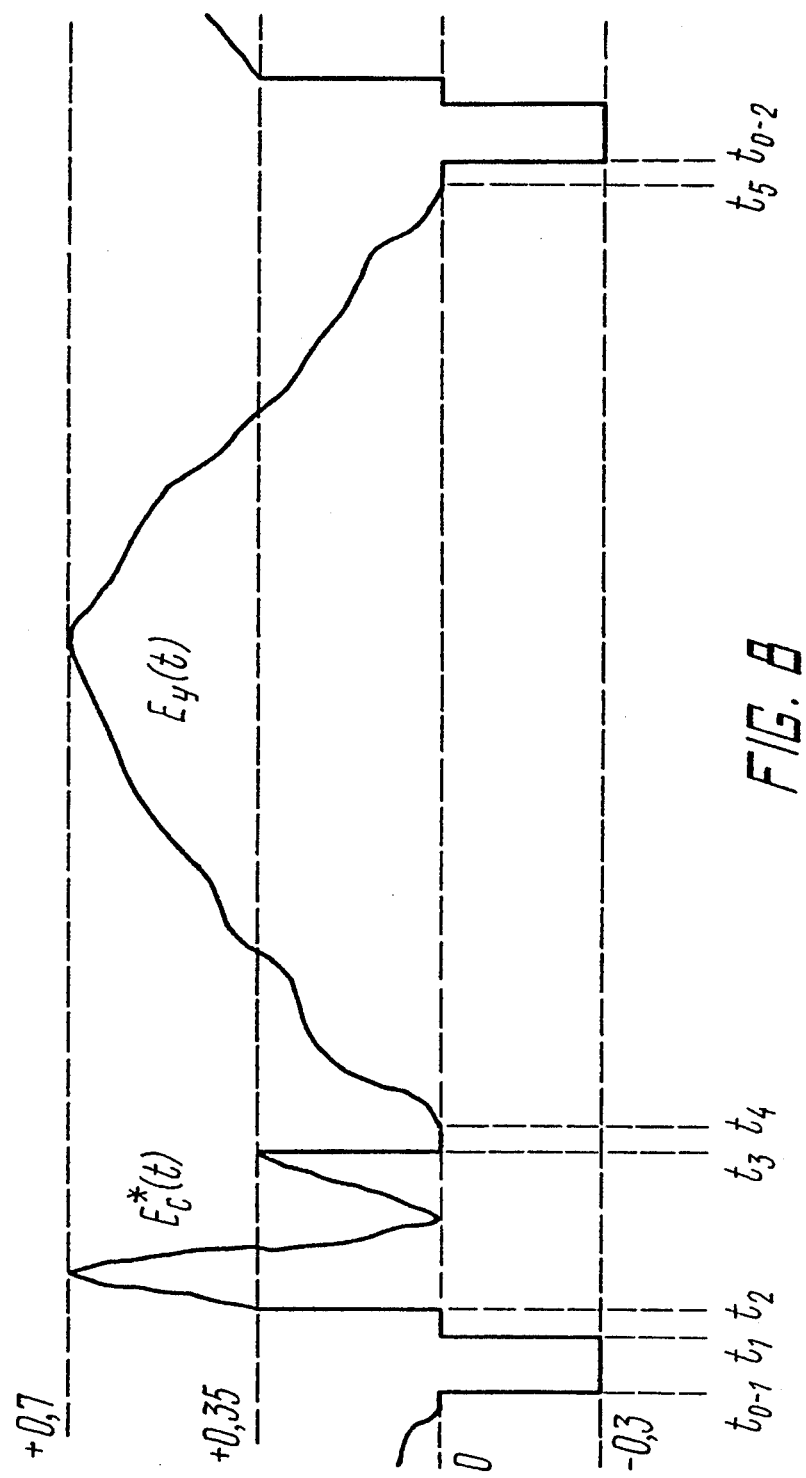

REFLECTED MODULATED TELEVISION SYSTEM

This is a continuation of copending application Ser. No. 07/490,650 filed on May 29, 1990, now abandoned.

FIELD OF THE INVENTION

The invention relates to communications systems technology, in particular to telecommunications, and more specifically to television systems.

DESCRIPTION OF THE PRIOR ART

In television broadcasting systems two methods of multiplexing signals containing luminance and chrominance data are used-frequency-division and time-division multiplexing.

With frequency-division multiplexing, the chrominance signal produced by modulating the chrominance subcarrier with colour-difference signals is transmitted within the luminance signal frequency spectrum. This method is utilized in standard television broadcasting systems NTSC, SECAM, PAL (CCIR Report 407-1, 1966–1970). The advantage of frequency-division multiplexing of luminance and chrominance signals is the relative simplicity of the decoder design in the television receiver. This constituted a crucial point in its favour as the state of the art on early stages of colour television, in the 1950's and 1960's. However, with frequency-division multiplexing the colour image quality is substantially impaired by cross-modulation interference between the luminance and chrominance signals. Such interference being suppressed, as a rule, at the expense of a lower resolution in the space and time domains. For instance, comb filtering by summing the signals of adjacent frames provides complete suppression of cross-modulation products between the luminance and chrominance signals only on stationary parts of the picture, and necessitates summing of signals of two adjacent frames in the NTSC system, four adjacent frames in the PAL system and up to six frames in the SECAM system. Comb filtering by summing the adjacent in time and space line signals reduces both the horizontal and the vertical resolution. Locating the chrominance signal frequency components in the upper part of the composite colour television signal spectrum makes the standard broadcast signal more susceptible to 1) irregularities of the frequency and phase response of the signal path, 2) noise with a square spectral density distribution, and 3) distortions of the differential gain and differential phase type.

With this in mind, time-division multiplexing is proposed for television systems of improved quality and also for future high definition television (HDTV) systems, wherein it is proposed to transmit luminance and chrominance signals sequentially during the line interval.

A number of modifications of the MAC system (Multiplexed Analogue Component, CCIR Report AB/10-11, 1983–1986) for direct satellite broadcasting have been proposed for use in high quality television systems, without changing the number of lines z and the frame repetition frequency $f_p$. In the MAC system, one of the colour-difference signals with a 3:1 time compression ratio and the luminance signal with a 1.5:1 time compression ratio are transmitted during the active part of the line, with colour-difference signals transmitted on alternate interlaced lines. Retaining the luminance definition requires a 1.5 times wider bandwidth of the composite colour television signal. Since such a widening of the bandwidth is not feasible in satellite broadcasting channels currently established, the MAC-D2 modification has been proposed, with the composite colour signal bandwidth conforming to ground-based broadcast standards, and a horizontal luminance definition correspondingly 1.5 times lower.

Other time-division multiplexing methods envisage luminance signal transmission without changing its time scale during the entire active interval, with time-compressed colour-difference signals being transmitted during the blanking interval. Such a method is described, for instance, in Patent No. 51-48623 (Japan), Cl. 95(5), H11(9), 1976, and proposed for the MUSE system (NHK Techn. Report, 1984, vol. 27, No. 7, p. 19; IEEE Trans., 1987, vol. BC-33, No. 4, p. 130) and HDTV system with time-division multiplexing of the luminance and colour-difference signals (Electronics, 1983, vol. 56, No. 14, pp. 82–84). In all these systems colour-difference signals are transmitted sequentially. For instance, the R-Y colour difference signal is transmitted during the blanking interval of one line and the B-Y colour-difference signal is transmitted during the blanking interval of the next scan line.

Two important advantages of systems utilizing time-division multiplexing are: 1) is the complete absence of cross-modulation between the luminance and colour-difference signals, and 2) a lower susceptibility to irregularities in the phase and frequency response of the communications channel and to noise with a square spectral density distribution "as compared to standard broadcast systems."

At the same time, sequential transmission of colour-difference signals is inferior to their simultaneous transmission in terms of interference immunity and noise visibility. This is due to their coarser vertical structure, with the next line repeating the colour-difference signal and noise transmitted during the previous line. Sequential transmission is accompanied by luminance and chrominance flicker at the horizontal boundaries between colour details of the picture. Such flicker can only be completely eliminated by stopping the structure of colour-difference signals transmission, as in the MAC system, with odd lines always carrying one and the same colour-difference signal, for instance the R-Y signal, and the even lines used to transmit the other colour-difference signal B-Y, so that each frame begins with the R-Y signal transmission. However, this leads to a noticeable and irremovable reduction of colour definition along the vertical. This becomes especially pronounced with transcoding to signals of standard broadcast systems. Furthermore, since the R-Y and B-Y signals may be of substantially different peak-to-peak values, their nonlinearity distortions in the transmission channel result in irremovable colour shade distortions, because the interrelation between the R-Y and B-Y signals is disturbed. Similar difficulties are encountered also when addressing problems of reducing the digital stream speed during transmission of time-compressed colour-difference signals in digital communication lines. Due to the difference in peak-to-peak values of the R-Y and B-Y signals, digitizing their high frequency components at a small number of quantizing levels can lead to colour fringing.

Up to the present time, no acceptable methods for simultaneous transmission of two colour-difference signals during a blanking interval were known.

Another range of problems is related to the necessity of increasing the volume of data transmitted during a line, field and frame of the television scan, arrising in the development of new systems-which incorporate image ratios of 16:9, real-time transmission of two colour pictures and high definition transmissions.

Changing the image ratio from the existing 4:3 to 16:9, while retaining the same horizontal and vertical definition, requires a wider bandwidth of the composite colour television signal by one third, just as it does in existing broadcasting systems.

Transmission of two colour pictures, for instance in stereo colour system, at the same definition and with the same methods of generating a composite colour television signal, just as in existing broadcasting systems, necessitates a twice wider bandwidth at the 4:3 image ratio and a 2.67 times wider bandwidth at a 16:9 image ratio.

Changing over from the existing television standards of 525 lines by 60 fields (30 frames) and 625 lines by 50 fields (25 frames) to the standards of high definition systems, with the existing methods of generating a composite colour television signal, will require a substantially wider bandwidth.

Thus, in the Japanese HDTV system with time-division multiplexed luminance and colour-difference signals, 1125 scan lines, 60 fields (30 frames), and a 16:9 image ratio, the total bandwidth, with the equivalent improvement in horizontal and vertical definition taken into account, would constitute 33.75 MHz. Taking into account the various values of the Kell factor adopted in various countries, the total bandwidth range would be from 25.8 MHz to 31.1 MHz, i.e. 5 to 6 times wider than in existing standard systems. Reducing the bandwidth in this system to 20 MHz, as proposed by Japanese experts, provides an improvement in horizontal definition, with the changeover to the 16:9 image ratio taken into account, by: $-1.56$ times (1.96 times improved vertical definition), as compared to the $525 \times 60$ system, at a 4.76 times wider bandwidth; $-1.16$ times, as compared to the 625-line system with a 4:2:2 ratio (analogue code base in studios), at a 3.48 times wider bandwidth; $-1.11$ times, as compared to the OIRT 625-line system, at a 3.33 times wider bandwidth; as compared to 625-line systems, the vertical definition is improved by a factor of 1.8.

Since the frequency bands allocated for television broadcasting have no channels of 20 MHz bandwidth, the HDTV system was modified to the MUSE system, which, strictly speaking, should be treated as the MUSE method of HDTV signal transmission. In the MUSE system the frame repetition rate is 15 Hz, at a 60 Hz rate of field repetition, i.e. each frame is composed of four fields, with interlaced scanning combined with raster interlacing. Each field contains 562.5 lines of 29.63 $\mu$s duration, with 1125 lines reproduced on the screen (1035 lines in the active picture). The bandwidth of the composite colour signal is 8.1 MHz. Each transmitted line contains up to 374 independent luminance pixels, and one picture line on the screen is produced by two transmitted lines (from two fields), i.e. the arriving luminance signal contains 748 independent luminance samples.

Thus, at 1125 lines per one 30 Hz frame at the transmitting side (a 33750 line Hz repetition frequency), the number of transmission lines in a composite colour television signal is doubled at the expense of reducing the frame repetition rate from 30 Hz to 15 Hz, at the same line repetition rate. Indeed, the frame period, i.e. the time interval between data transmissions concerning one and the same point of the image, constitutes four field periods in the MUSE system, this corresponding to about 66667 $\mu$s (1/15 Hz). In this case, the number of lines transmitted per frame, specified in CCIR Recommendation No. 476 as the ratio of the line repetition rate $f_H$ to the frame repetition rate $f_p$, constitutes 2250. If the initial picture, at 1125 scan lines and 30 frames per second, contains 1560 luminance samples (pixels) per line, $1.61 \cdot 10^6$ pixels per frame, and about $48.44 \cdot 10^6$ pixels per second at a 33.75 MHz luminance signal bandwidth, limiting the luminance signal bandwidth to 20 MHz will reduce these numbers to about 924, $0.957 \cdot 10^6$ and $28.7 \cdot 10^6$, respectively, at a 16.2 MHz bandwidth these numbers are further reduced to about 748, $0.775 \cdot 10^6$, and $23.25 \cdot 10^6$, respectively. In the MUSE system the picture is reproduced by restoring luminance pixels transmitted in two lines, $2 \times 374 = 748$ pixels, $0.774 \cdot 10^6$ per transmitted frame, $11.61 \cdot 10^6$ pixels per second.

The theoretical limit of definition in the MUSE system is 748 luminance pixels per line, however in actual practice, at an interlaced raster some loss is unavoidable, because it is impossible to synthesize a filter with an infinitely steep cut-off of its frequency response characteristic. Thus, when using the studio 4:2:2 digital code ratio, the losses will constitute about 17%. Even if the losses during picture reproduction in the MUSE system are assumed to be 5% to 10%, the horizontal definition, as compared to standard 625-line broadcasting systems and with the changeover from a picture ratio of 4:3 to one of 16:9 taken into account, will be:

0.97 to 1.03 (theoretical limit 1.08) at a luminance signal bandwidth $\Delta F = 5$ MHz, as recommended by CCIR Standard G;

0.88 to 0.93 (theoretical limit 0.98) at $\Delta F = 5.5$ MHz (Great Britain);

0.84 to 0.9 (theoretic limit 0.94) at $\Delta F = 5.75$ MHz (4:2:2 studio code ratio);

0.81 to 0.85 (theoretical limit 0.9) at $\Delta F = 6$ MHz (OIRT and France).

It should be noted, that such values are attained in the MUSE system only for stationary details of the picture, the horizontal definition for moving objects is substantially lower.

Due to the high correlation between signals of adjacent frames, (near 100% for luminance signals from stationary picture details), the reduced frame repetition rate is considered to be quite allowable and to be but a reduction of the television signal redundancy. Motion blurring, is more pronounced at lower frame repetition rates. The MUSE system takes special measures to compensate this undesirable effect (the so called "movement detector" system), by reducing the spatial picture definition. At the same time, the frame repetition rate is reduced from 30 Hz to 15 Hz at the transmitting side and each pixel is repeated at the receiving side to restore the 30 Hz repetition rate (to eliminate flicker). This enhances noise visibility on the screen by about 7.7 dB. With the passband expanded to 8.1 MHz, the interference immunity of the MUSE system is considerably inferior, as compared to existing television broadcasting systems. With the MUSE system, the allowable noise power in the communication channel with frequency modulation (satellite communications) is lower than existing broadcast system by an order of magnitude.

Such a picture requires transmission of a volume of data which can be carried by the most wideband colour television signal of existing broadcasting systems. The signal of the 625-line, 25 frames system with $\Delta F=6$ MHz, 52 $\mu$s active line part, 575 active lines per frame, can contain data concerning only $8.97 \cdot 10^6$ independent luminance pixels per second (624 pixels in the active part of a line, about $0.359 \cdot 10^6$ in the active part of a frame), i.e. of the order of 77.3% of that required in the MUSE system and about 3.2 times less than in the HDTV system with 1125 scan lines and 30 frames per second, at $\Delta F=20$ MHz.

Thus, the creation of television systems of improved quality and new broadcasting systems, such as HDTV and stereo colour, requires a larger volume of information to be transmitted by the composite colour television signal.

Increasing the volume of data transmitted by the composite colour signal by simply proportionally expanding the signal bandwidth is impracticable, because it would require a reduction of the number of programs and a change of the entire frequency allocation plan. All frequency bands are already alloted and are being used by communications channels that have been, designed to transmit signals with a maximal bandwidth of about 6 MHz (the radio frequency bandwidth of ground-based channels is of the order of 8 MHz in the most wideband systems, in FM satellite channels it constitutes 27 MHz).

An alternate approach is to transmit additional data by eliminating the television signal redundancy. The methods implemented in broadcasting systems to this end include:

transmitting chrominance signals in the luminance signal bandwidth with the aid of frequency-division multiplexing (for instance, in the NTSC, SECAM, PAL and MAC-60 systems).

- alternate transmission of signals carrying chrominance data (for instance, in the SECAM, MAC, MUSE, HDTV 1125×60 ×2:1 systems);

- reducing the frame repetition rate (for instance, in the MUSE, HD-NTSC with raster interlacing systems).

A number of aspects of the effect of such approaches on the quality and interference immunity of pictures were discussed herein above.

A third approach is to reduce the data signal bandwidth, without reducing the redundancy. In television technology the possibility of such an approach was noted as long ago as during the development of the PAL system. It is theoretically possible to transmit and demodulate quadrature modulated signals by means of two specifically generated signal messages, with partial and even complete suppression of one sideband, i.e. trade off the bandwidth for the transmission time, and just this was partly utilized in transmitting chrominance signals in the PAL system. However, a sufficiently effective tradeoff of this kind in actual practice proves to be unfeasible even with a high degree of correlation between television signals in adjacent frames, especially with time-division multiplexed luminance and chrominance signals. One sideband has to be completely suppressed, not partially as in the PAL chrominance signals, because with time-division multiplexing of quadrature modulated chrominance signals with luminance signals the subcarrier frequency has to be very low, and its practical utilization requires the use of almost ideal filters, since the television signal spectrum width is of the order of megahertz and contains "zero" frequency components. Consequently, effective suppression of one sideband would require the use of filters with megahertz bandwidths and a cutoff slope of dozens of decibel per units or dozens of kilohertz. Restoring the quadrature modulated signal with a low subcarrier frequency and one suppressed sideband by performing an inverse translation to a high carrier frequency with the aid of heterodyne conversion would require, along with such almost ideal filters, the use of almost ideal phase shifters (providing an exact shift of, for instance, 90° of all spectrum components with frequencies ranging from units of hertz or kilohertz to several megahertz). Therefore, for instance in cable trunk communication lines carrying single-sideband modulated television signals, the carrier frequency has to be selected in the range about 25% to 40% of the bandwidth of one sideband, so that the efficiency of trading off the bandwidth for transmission time does not exceed some 70% to 80%. This trade-off is, at the same time, rather technically difficult to implement. However, if it proved practicable to (1) "pack" the quadrature modulated television signal avoiding said technical impediments and bring the efficiency of trading off the bandwidth for transmission time to nearly 100% (an exactly 100% effectiveness in this case is unattainable even theoretically), (2) restore the initial quadrature modulated television signal from two messages and (3) thereafter demodulate the modulating signals out of the restored signal with the aid of relatively simple means, then this approach to reducing the bandwidth of a composite television signal without eliminating its redundancy would appear to be extremely promising.

It should be noted, that simply stretching out in time a quadrature modulated television signal with a $2\Delta F$ bandwidth and its location in a passband from 0 to $\Delta F$ (F is the carrier frequency) is unapplicable to chrominance signals because there are two colour-difference signals and with this approach twice less signals would be transmitted per each frame.

Furthermore, such a transmission would require a very high linearity of the phase response in the frequency band from zero to F.

SUMMARY OF THE INVENTION

This invention is to provide a television system with a greater information in the composite colour television signal transmitted per time unit, without expanding the bandwidth of this signal.

This is possible, if, utilizing the high correlation between signals of adjacent frames, fields and lines in a television picture, the video signals in the composite colour television signal containing the luminance and chrominance information are replaced by signals of higher information capacity. In particular, messages of quadrature modulated television signals are such signals, because their bandwidth is approximately equal to that of one sideband.

A very simple means of folding the spectrum of a quadrature modulated television signal to allocate it within a bandwidth approximately equal to that of one sideband is quadrature modulation of its carrier or subcarrier frequency that is much lower than the upper limiting frequency in the modulating video signal spectrum, without resorting to complete or partial sideband suppression. Such a voltage with a folded lower sideband contains all the frequency components of the upper and lower sidebands of a quadrature modulated signal. On these grounds such a voltage can be assumed to retain all the information carried by a quadrature modulated signal with a high carrier frequency. However, strictly speaking, the voltage with a folded lower sideband produced by translating the quadrature modulated signal to a low carrier frequency, can be considered as the information signal only if the information contained in the modulating signals can be detected out of it at the receiving side.

Studies carried out have proved this to be feasible, and, moreover, be relatively simple in implementation, as is described herein later in the description of this invention.

Since the voltage with a folded sideband can be used to transmit information, it may be termed a signal.

A typical feature of such a quadrature modulated signal with a carrier frequency much lower than the upper limiting frequency in the modulating signals spectra is the presence of a reflected lower sideband. The process of generation of such a signal may be termed "reflected quadrature modulation", in contrast to quadrature modulation with unfolded sidebands, including quadrature vestigial-sideband modulation, as mentioned herein above.

The signal generated by "reflected quadrature modulation" may be termed a "reflected quadrature modulated signal" or for breviety a "reflected modulated signal".

This is achieved by a television system that has composite colour television signals whereof, containing luminance and chrominance information, are time-division multiplexed. These signals are multiplexed by transmitting the luminance signals during the entire active line interval and transmitting the time-compressed colour-difference signals carrying the chrominance information transmitted during the line blanking interval. According to this invention, the composite colour television signal is generated utilizing reflected modulated signals containing information on individual features of the picture, including reflected modulated luminance signals and reflected modulated chrominance signals. These signals containing information on individual features of the picture, i.e. video signals, including luminance signals and colour-difference signals, are used for quadrature modulation of a subcarrier at the zero and $\pm \pi/2$ phases, thus generating reflected modulated signals with subcarrier frequencies f selected so as to ensure the required phase shift $\phi$ between unmodulated subcarriers of adjacent lines, $\phi_H$, of one and the same frame and between identically numbered lines of adjacent frames, $\phi_p$. The reflected modulated signals thus generated are transmitted during their alloted time intervals in the composite colour television signal. At the receiving side messages of reflected modulated signals are detected in the received composite colour television signal and directed to data processing channels, wherein the information contained in these reflected modulated signals is processed. Processing channels provide a delay of reflected modulated signal messages by a time interval constituting a multiple of the television scan period, and the delayed and undelayed messages are processed conjointly by multiplying them by harmonic signals with preselected phases. The products of these multiplications of the delayed and undelayed reflected modulated signal messages by harmonic signals in a given processing channel are algebraically summed to detect the modulating video signals out of the summary voltage. The luminance and colour-difference signals which have been demodulated by appropriate processing channels and with equalized time scales are then aligned in time.

According to this invention, the delayed and undelayed reflected modulated signal messages can be processed by multiplying one of them by a harmonic signal of the form $U_1(t)=2\cos\omega_x t$ and by multiplying the other one of them by harmonic signals of the form $U_2(t)=2\cos(\omega_x t+\pi+q\phi_H)$, where $\omega_x=2\pi f_x$, $f_x$ is the frequency of the harmonic signal and is higher than the limiting frequency in the reflected modulated signal spectrum, $\phi_H=2\pi f\tau_H$, f is the subcarrier frequency of the signal, $\tau_H$ is the line duration, and q is a natural number. Algebraic summing of the voltages generated during multiplication of the reflected modulated signal messages by harmonic signals $U_1(t)$ and $U_2(t)$ provides a quadrature modulated signal with unfolded sidebands at a high carrier frequency, detection whereof may be used to obtain video signals modulating the carrier at the transmitting side.

According to this invention, conjoint processing of the delayed and undelayed reflected modulated signal messages can also be performed at the receiving side directly at the subcarrier frequency f, by multiplying one message by a harmonic signal $U_1(t)=2\cos\omega t$, where $\omega=2\pi f$, and the other message by a harmonic signal of the form $U_2(t)=2\cos(\omega t+\pi+q\phi_H)$. Algebraic summing of the products provides direct detection of one of the modulating signals. To detect the other modulating signal one of the reflected modulated signal messages is multipled by a harmonic signal of the form $U_3(t)=2\sin\omega t$ and the other message is multiplied by a harmonic signal of the form $U_4(t)=2\sin(\omega t+\pi+q\phi_H)$. Algebraic summing of these products directly provides the second modulating signal.

It is expedient that, in the composite colour television signal of the television system of this invention, the line blanking intervals be used to transmit simultaneously both colour-difference signals, generating the chominance signal by reflected quadrature modulation of the chrominance subcarrier frequency $$f_o = \frac{(2n-1)f_H \pm (2m-1)f_p}{4},$$

where $f_H=1/\tau_H$ is the line frequency, $f_p$ is the frame repetition frequency, m and n are natural numbers selected so as to provide a phase shift $\phi_D$ of the chrominance subcarrier on adjacent lines $\phi_{OH}\approx(\pi/2)(2n-1)$ in one and the same frame and equal to $\phi_{Dp}=(2i-1)$ on identically numbered lines of adjacent frames, where i is an integer. To this end, as video signals modulating the chrominance subcarrier, colour-difference signals have to be used and the time scale of the resulting chrominance signal has to be compressed with a compression factor K equal to the ratio of the upper limiting frequency of the rated bandwidth of a composite colour television signal to the selected value of the upper limiting frequency in the chrominance signal spectrum transmitted in a line prior to its being time-compressed. The colour burst sync signals in the chrominance signal are K times time-compressed reflected modulated signals of the subcarrier at its reference phase and may be transmitted by several lines of the frame blanking interval, with the duration of transmission of each colour burst message in the lines of the frame blanking interval equal to the duration of the chrominance signal transmission in one line of the active frame. The generated time-compressed chrominance signal should be transmitted by lines of the composite colour television signal during the time intervals between the trailing edge of the horizontal sync pulse and the start of the active line. On the receiving side it is expedient to delay the chrominance signal message being separated out of the received composite colour television signal by a frame period and to execute algebraic summing with chrominance signal messages separated in identical in numbers lines of the undelayed frame signal arriving at the input. The messages of algebraically summed chrominance signals from lines of adjacent frames which are identical in number should be additionally delayed by $T=q\tau_H$, where $\tau_H=1/f_H$, and conjointly process the additionally delayed and undelayed chrominance signal messages by multiplying them by harmonic signals with appropriate phases. It should be noted, that the phase shift $\Delta\phi_D$ between the unmodulated colour subcarrier phase $\phi_{D1}$ in the delayed chrominance signal message and the unmodulated colour subcarrier phase $\phi_{D2}$ in the undelayed chrominance signal message is related to the delay time T, according to the relation:

$$\Delta\phi_D=\phi_{D1}-\phi_{D2}=\omega_D q\tau_H,$$

where $\omega_D=2\pi f_D$.

According to the invention, conjoint processing of the delayed and undelayed messages of summed up chrominance signals in identical in number lines of adjacent frames may be executed by multiplying one of them by a harmonic signal of the form $U_1(t)=2\cos\omega_x t$ and by multiplying the other of them by a harmonic signal of the form $U_2(t)=2\cos(\omega_x t+\pi+\Delta\phi_D)$, where $\omega_x=2\tau f_x$, $f_x$ is the frequency of the harmonic signal and is higher than the limiting frequency in the chrominance signal spectrum. Summing of the voltages thus generated provides a quadrature modulated signal with unfolded sidebands at a high carrier frequency. Synchronous detection of this signal provides detection of both colour-difference signals.

Also feasible is conjoint processing of the delayed and undelayed summed chrominance signal messages from identical in number lines of adjacent frames and detection of the colour-difference signals directly at the colour subcarrier $f_D$. This processing involves multiplying one message by a harmonic signal of the form $U_1(t)=2\cos\omega_D t$ and the other message by a harmonic signal of the form $U_2(t)=2\cos(\omega_D t+\pi+\Delta\phi_D)$ and algebraic summation of the products thus generated to directly detect one of the colour-difference signals. To detect the second colour-difference signal, one of these messages is multiplied by a harmonic signal of the form $U_3(t)=2\sin\omega_D t$ and the other-by a harmonic signal of the form $U_4(t)=2\sin\times(\omega_D t+\pi+\Delta\phi_D)$ and the products thus obtained algebraically summed.

According to the invention, it is suitable to set the additional time delay of the messages of summed chrominance signals from identically numbered lines in adjacent frames during their conjoint processing at the receiving side, equal to the line duration $\tau_H$. In this case the phase shift between the harmonic signals by which the delayed and undelayed messages are multiplied, should be set equal to $\pi+\Delta\phi_D\approx(\pi/2)(2n+1)$.

In a number of the applications of the television system of this invention, it is also suitable during conjoint processing at the receiving side of the delayed and undelayed messages of summed chrominance signals from identically numbered lines of adjacent frames, the additional delay time, T, be set approximately equal to the television field duration, $T=(z\pm1)\tau_H/2$, where z is the number of horizontal lines. Two embodiments of such a delay are feasible. In the first embodiment the messages are additionally delayed in the first field by $T_1=(z+1)\tau_H/2$ and in the second field by $T_2=(z-1)\tau_H/2$. The phase shift between the harmonic signals, by which the delayed and undelayed chrominance signal messages are to be multiplied, should be set equal to $$\pi - \pi\left(\frac{2n-1}{4} \pm \frac{2m-1}{4z}\right)(z+1)$$

on the first field, and $$\pi - \pi\left(\frac{2n-1}{4} \pm \frac{2m-1}{4z}\right)(z-1)$$

on the second field.

In the second embodiment, the additional delay of the summed up chrominance signal messages from identically numbered lines of adjacent frames is set one and the same in the first and second fields and equal to $T_1=(z+1)\tau_H/2$. Correspondingly, the phase shift between the harmonic signals, by which the delayed and undelayed messages are to be multiplied, should be set equal to $$\pi - \pi\left(\frac{2n-1}{4} \pm \frac{2m-1}{4z}\right)(z+1)$$

in both fields.

In television systems with simulatneous transmission of colour-difference signals during blanking intervals in the composite colour television signal, it is beneficial that reflected modulated signals containing information on the luminance and chrominance of adjacent in space picture lines be transmitted during the time duration of a single line, and that two colour television pictures be transmitted in real time simulataneously in an aligned frequency band, specified as the rated bandwidth to transmit a single such television picture. To this end, at the transmitting side, the luminance and chrominance signals of two fields of one frame of the first and second picture have to be stored separately, and then the signals of adjacent in space scan lines of the first and second fields of each picture are sequentially allocated into the memory in such a way, that the (2S−1) record line contains data on the luminance and chrominance of the (2S−1) picture line of the first field and the 2S record line contains data on the luminance and chrominance of the $$\left(2S - 1 + \frac{z+1}{2}\right)$$

picture line of the second field, where S is a natural number. The signals stored in two record lines (2S−1) and 2S of the first picture are converted into signals of a single first picture transmission line. Signals of the second picture stored in record lines (2S−1) and 2S are also converted into signals of a single second picture transmission line. This conversion is executed separately for signals of the first and second pictures, but by identical means. In this process chrominance signals are read out simultaneously from record lines (2S−1) and 2S, and algebraically summed to produce a common to picture lines (2S−1) and 2S chrominance signal with an $f_D$ chrominance subcarrier frequency. The phase shift between the unmodulated chrominance subcarrier in transmission lines, generated out of the signals stored in record lines (2S−1) and 2S, and that of transmission lines generated out of signals stored in record lines (2S+1) and (2S+2), of the same picture will constitute $\phi_{DH}=2\pi f_D\pi_H$ or about $(\pi/2)(2n−1)$. Luminance signals stored in record lines (2S−1) and 2S are also transmitted simultaneously, using them to generate a reflected modulated luminance signal. To this end luminance signals, read out from record lines (2S−1) and 2S are used to reflected quadrature modulate the luminance subcarrier frequency $f_y=(2d−1)f_H/4$, where d is a natural number, selected such, that the phase shift between the unmoduated luminance subcarrier in identically numbered lines of adjacent frames is $\phi_{yp}=(\pi/2)(2d−1)$. The generated reflected modulated luminance signals and the chrominance signals, containing luminance and chrominance data stored in record lines (2S−1) and 2S of the first picture, are transmitted on the (2S−1) line of the composite colour television signal; the reflected modulated luminance signals and the chrominance signals, carrying information of the luminance and chrominance signals stored in record lines (2S−1) and 2S of the second picture, are transmitted on the 2S line of the composite colour television signal. The chrominance signals of the first and second picture are transmitted during the horizontal blanking intervals of the respective lines, and the reflected modulated luminance signals are transmitted without changing their time scales on the active lines of the composite colour television signal. Signals of one and the same picture are transmitted on identically numbered lines of adjacent frames. At the receiving side the signals of the first and second pictures are separated out of the composite colour television signal and passed into processing channels, wherein signals of each picture are submitted to identical processing operations, including: (1) time delay by a frame period of the signals arriving at the channel input, (2) separation of chrominance signals from identically numbered lines of adjacent frames, (3) algebraic summing of delayed (by a frame period) and undelayed chrominance signals from identically numbered lines of adjacent frames, (4) additional delay of these algebraically summed chrominance signals by the duration of two scan lines, (5) multiplying the additionally delayed and undelayed messages of summed chrominance signals from identically numbered lines of adjacent frames by harmonic signals, the phase shift between which, $\tau+\Delta\phi_D$, should approximately constitute $(\pi/2)(2n+1)$, and (6) detecting the colour-difference signals. These colour-difference signals generated at the outputs of the processing channels are used to restore chrominance data stored in record lines (2S−1) and 2S. Processing the reflected modulated luminance signals includes: separating messages of these signals out of the delayed by a frame period and undelayed line signals, conjoint processing of the delayed and undelayed messages of reflected modulated luminance signals from identically numbered lines of adjacent frames by multiplying these messages by harmonic signals of appropriately set phases, algebraic summing of the multiplication products, and detection of the luminance signals stored in record lines (2S−1) and 2S. The detected signals, containing chrominance and luminance data stored in record line 2S, have to be delayed by $T_1=(z+1)\tau_H/2$ to restore the composite colour television signal with interlaced scanning of the initial picture.

According to this invention, at the receiving side conjoint processing of the delayed and undelayed message of reflected modulated luminance signals may be accomplished by multiplying one of them by a harmonic signal of the form $U_1=2\cos\omega_{xy}t$ and multiplying the other one of them by a harmonic signal of the form $$U_2(t) = 2\cos\left[\omega_{xy}t + \frac{\pi}{2}(2d+1)\right],$$

where $\omega_{xy}=2\pi f_{xy}$, $f_{xy}$ is the carrier frequency and complying to the condition that $f_{xy}-f_y$ be higher than the upper limiting frequency in the reflected modulated luminance signal spectrum. Algebraic summing of the products of these multiplication operations produces a quadrature modulated signal with unfolded sidebands at a high carrier frequency. Detecting this signal produces the luminance signals stored in record lines (2S−1) and 2S.

The delayed and undelayed messages of reflected modulated luminance signals may also be conjointly processed and the luminance signals stored in record lines (2S−1) and 2S detected at the receiving side directly at the luminance subcarrier frequency. To this end one message has to be multiplied by a harmonic signal of the form $U_1(t)=2\cos\omega_y t$ and the other message multiplied by a harmonic signal of the form $U_2(t)=2\cos[\omega_y t+\pi(2d+1)]$. Algebraic summing of the products directly detects the luminance signal stored in the (2S−1) record line. Multiplying one message by a harmonic signal of the form $U_3(t)=2\sin\omega_y t$ and the other message by a harmonic signal of the form $U_4(t)=2\sin[\omega_y t+\pi(2d+1)]$ and algebraic summing of the products directly detects the luminance signal stored in record line 2S.

It is expedient, that in the television system according to this invention with two colour pictures transmitted in an aligned bandwidth, at the receiving side the composite colour television signal be processed, so that the processing channels of each picture provide detection of chrominance signals from the signals arriving at their input and repeat these chrominance signals by delaying them by a time interval $T_1=(z+1)\tau_H/2$. The undelayed message is positioned to the horizontal blanking interval of the restored luminance signal of scan line (2S−1) of the given picture, and the delayed chrominance signal message is positioned to the horizontal blanking interval of the restored luminance signal of scan line $$\left(2S-1+\frac{z+1}{2}\right)$$

of the same picture, thus restoring the composite colour television signal of the respective picture.

It is expedient, that in a television system with simultaneous transmission of colour-difference signals during the blanking intervals in the composite colour television signal, a duration of two scan lines be used to transmit stretched in time reflected modulated signals containing information on the luminance and chrominance of two spatially adjacent picture scan lines. This can be achieved by a twofold increase in the time of transmission of the luminance and chrominance signals of each picture line and using the pairs of time-stretched signals of two spatially adjacent scan lines to be transmitted simultaneously to generate a composite colour television signal with a line frequency of $f_H/2$ and a duration of each of these lines equal to $2\tau_H$. Such a composite colour television signal allows real time transmission of television pictures, the initial number of scan lines whereof is $z_1 = f_H/f_p$ and the initial number of frames per second whereof is $N = 1/f_p$, in a bandwidth equal to half the rated bandwidth necessary for transmitting such television pictures using known techniques. To this end at the transmitting side the luminance and chrominance signals of two fields of one frame have to be stored sequentially in record lines, with record line $(2S-1)$ storing luminance and chrominance information about the $(2S-1)$ picture line of the first field and record line 2S storing information about the $$\left(2S - 1 + \frac{z+1}{2}\right)$$

picture line of the second field. Simultaneous readout of the contents of record lines $(2S-1)$ and 2S containing information on chrominance and algebraic summing of these signals provides chrominance signals with an $f_D$ chrominance subcarrier frequency. The phase shift between the unmodulated subcarrier, generated from the signals stored in record lines $(2S-1)$ and 2S, and that generated from signals stored in record lines $(2S+1)$ and $(2S+2)$ constitutes approximately $\Delta\phi_D = \pi(2n-1)/2$. Quadrature modulated luminance signals are generated by reflected quadrature modulating the luminance subcarrier with luminance signals simultaneously read out of record lines $(2S-1)$ and 2S. The luminance subcarrier frequency is $f_y = (2d-1)f_H/4$, this providing a phase shift between unmodulated luminance subcarriers of identically numbered lines of adjacent frames, equal to $\phi_{yp} = \pi(2d-1)/2$. A twofold stretching in time of the generated chrominance and reflected modulated luminance signals provides a correspondingly twofold narrower width of their frequency spectrum and also reduces the chrominance and luminance subcarrier frequencies to $f_D/2$ and $f_y/2$, respectively. These stretched in time reflected modulated luminance signals and chrominance signals are transmitted, respectively during the active lines and the blanking intervals of the composite colour television signal. Since the duration of each transmitted line is $2\tau_H$, the number of lines transmitted per frame will constitute:

$$z_2 = \frac{f_H}{2} = \frac{1}{2\tau_H f_p}.$$

At the receiving side, the line duration in the composite colour television signal received has to be halved to restore the time durations of the chrominance signals during the blanking intervals and the reflected modulated luminance signals during the active lines, and thus restore the initial bandwidth of the spectra of these signals and their subcarrier frequencies $f_D$ and $f_y$, respectively. The composite colour television signals, with line durations compressed to $\tau_H$, should be delayed by a frame period. The delayed and undelayed signals of identically numbered lines of adjacent frames should be used to separate out messages of chrominance signals and messages of reflected modulated luminance signals. The messages of chominance signals should then be algebraically summed. The summed messages of chrominance signals are additionally delayed by $2\tau_H$ and the phase shift between the harmonic signals, by which these messages are to be multiplied, is set equal to about $\pi + \Delta\phi_D = \pi(2n+1)/2$; the resulting colour-difference signals are then used to restore the chrominance information contained in record lines $(2S-1)$ and 2S.

Messages of reflected modulated luminance signals, from identically numbered lines of adjacent frames, undelayed and delayed by a frame period, are processed conjointly by multiplying them by harmonic signals with appropriate phases, the products then algebraically summed and used to detect the luminance signals stored in record lines $(2S-1)$ and 2S. The signals detected, containing information about the luminance and chrominance of lines stored in record lines 2S, are delayed by an interval of $T_1 = (z+1)\tau_H/2$ to restore lines $(2S-1)$ and $$\left(2S - 1 + \frac{z+1}{2}\right)$$

of the interlaced scan of the initial picture.

According to the invention, it is suitable that at the receiving side conjoint processing of the delayed and undelayed messages of reflected modulated luminance signals be performed by multiplying one message by a harmonic signal of the form $U_1(t) = 2 \cos \omega_{xy} t$ and multiplying the other message by a harmonic signal of the form $U_2(t) = 2 \cos [\omega_{xy}t + (\pi)/2 \ (2d+1)]$, where $\omega_{xy} = 2\pi f_{xy}$ and $f_{xy}$ is the carrier frequency complying to the condition, that $f_{xy} - f_x$ is higher than the upper limiting frequency in the reflected modulated luminance signal spectrum prior to its time-stretching. The products of these multiplication operations are algebraically summed, to generate a signal with unfolded sidebands at a high carrier frequency, this latter signal is detected to produce the luminance signals stored in record lines $(2S-1)$ and 2S.

It is also feasible, that conjoint processing of the delayed and undelayed messages of reflected modulated luminance signals at the receiving side and detection of the luminance signals stored in record lines $(2S-1)$ and 2S be carried out directly at the luminance subcarrier frequency $f_y = \omega_y/2\pi$. This is achieved by multiplying one message by a harmonic signals of the form $U_1(t) = 2 \cos \omega_y t$ and the other message by a harmonic signal of the form $U_2(t) = 2 \cos [\omega_y t + (\pi/2)(2d+1)]$. Algebraic summing of the products thus obtained provides direct detection of luminance signal stored in record line $(2S-1)$. Multiplying one message by a harmonic signal of the form $U_3(t) = 2 \sin \omega_y t$ and the other message by a harmonic signal of the form $U_4(t) = 2 \sin [\omega_y t + (\pi/2))2d+1)]$ and algebraic summing of the products directly yields the luminance signal stored in memory line 2S.

It is expedient, that at the receiving side the number of scan lines, providing visual perception of the vertical definition specified, be set equal to $z_3$ exceeding the number $z_1$ of the luminance and colour-difference scan lines on the transmitting side. To this end, the number of reproducing lines $z_3$ may be obtained by interpolating the number of lines $z_1$, with interpolation of each reproduced line requiring the use of signals from 1 scan lines at the transmitting side, wherein half of these 1 lines are leading relative to the reproduced line and the other half are lagging lines. The number of scan lines $z_1$ at the transmitting side should be selected in accordance with the method of interpolating therefrom the number $z_3$ of reproduced lines.

It is expedient that, at the transmitting side, the luminance and colour-difference signals are used as modulating signals $E_{1-1}(t)$ and $E_{1-2}(t)$ to: (1) modulate the luminance and chrominance subcarriers, respectively, and (2) to generate the refleted modulated luminance signals and the chrominance signals after a preliminary correction. The modulating video signal prior to correction has to be delayed by the duration $2\pi_p$ of two frames, and a difference signal, corresponding to the difference between the values of this video signal prior to its correction at the instants of time t and $t-2\pi_p$, has to be generated. This difference signal may be submitted to additional processing, including, for instance, noise suppression by frequency filtering. This difference signal is algebraically summed with the video signal prior to correction, the latter being delayed by the duration $\pi_p$ of one frame. The resulting video signal is thereafter used to modulate the appropriate subcarrier to generate reflected modulated signals $E_3(t)$, constituting components of the composite colour television signal.

It is also expedient, that at the transmitting side chrominance signals and reflected modulated luminance signals be generated by specially preprocessed colour-difference signals and luminance signals, used to modulate the chrominance subcarrier and the luminance subcarrier, respectively. This preprocessing should include recording signals of each scan line with a sampling frequency $f_{s1}$ and readout of these signals with a sampling frequency $f_{s2}(t)$ varying along the line according to the relation:

$$f_{s2}(t) = \frac{f_{s1} \int_0^{\pi/w_1} \cos \phi_1(t) d\phi}{\cos \phi_1(t)},$$

$$\phi_1(t) = \frac{2\pi}{w_1 \tau_H} \left( \frac{\tau_H + \Delta \tau_H}{2} - t \right),$$

where t varies in the range from zero to $\tau_H$, $\tau_H$ is the scan line duration, $\Delta \tau_H$ is the horizontal blanking interval duration, $w_1$ is a positive number exceeding 2, $\tau/w_1$ is the modulus of $\phi_1(t)$ at $t+\Delta \tau_H/2$. These preprocessed video signals, after appropriate correction, can be used to modulate the chrominance and luminance subcarriers, respectively, to generate the chrominance signals and reflected modulated luminance signals of the composite colour television signal. At the receiving side the detected luminance and colour-difference signals will have to be by-line stored at a sampling frequency $f_{s3}$ and read out with a varying along the line sampling frequency of:

$$f_{s4} = \frac{f_{s3} \cos \phi_1(t)}{\int_0^{\pi/w_1} \cos \phi_1(t) d\phi}.$$

It is further expedient, that modulating video signal processing at the transmitting side be executed at a sampling frequency for recording, varying during a field period $\tau_v$ according to:

$$f_{s1}(t) = \frac{f_{s1} \int_0^{\pi/w_2} \cos \phi_2(t) d\phi}{\cos \phi_2(t)},$$

where $$\phi_2(t) = \frac{2\pi}{w_2 \tau_v} \left( \frac{\tau_v - \Delta \tau_v}{2} - t \right),$$

t varies within the limits from zero to $\tau_v$, $\Delta \tau_v$ is the field blanking interval duration, $w_2$ is a positive number exceeding 2, $\tau/w_2$ is the modulus of $\phi_2(t)$ at $$t = \Delta \tau_v/2, f_{s1}(t) = f_{s1} \text{ at } \cos\phi_2(t) = \int_0^{\pi/w_2} \cos\phi_2(t)d\phi.$$

At the receiving side, correspondingly, processing of the luminance and color difference signals has to be performed with a recording sampling frequency $f_{s3}(t)$ varying according to the relation:

$$f_{s3}(t) = \frac{f_{s3} \cos \phi_2(t)}{\int_0^{\pi/w_2} \cos \phi_2(t) d\phi},$$

where $$f_{s3}(t) = f_{s3} \text{ at } \cos \phi_2(t) = \int_0^{\pi/w_2} \cos \phi_2(t) d\phi.$$

It is highly beneficial that, in the television system of this invention during the processing of the information signals at the transmitting side, the recording sampling frequency $f_{s1}$ be varied during a time interval equal to the field duration $\tau_v$ according to:

$$f_{s1}(t) = \frac{2}{(1 + c_1)\tau_v} f_{s1} [c_1 \tau_v + (1 - c_1)|\tau_v + \Delta \tau_v - 2t|],$$

where $\{\tau_v + \Delta \tau_v - 2t\}$ is the absolute value of $(\tau_v + \Delta \tau_v - 2t)$, $c_1$ is a positive differing from zero coefficient equal to the ratio of the value of $f_{s1}(t)$ at $t = \Delta \tau_v/2$ to its value at $t = (\tau_v + \Delta \tau_v)/2$, $f_{s1}$ is the value of $f_{s1}(t)$ at $t = (\tau_v/4) + (\Delta \tau_v/2)$, and that readout be carried out at a sampling frequency $f_{s2}(t)$ varying along the scan line according to the relation:

$$f_{s2}(t) = \frac{2}{(1 + c_2)\tau_H} f_{s1}(t)[c_2\tau_H + (1 - c_2)|\tau_H + \Delta \tau_H - 2t|],$$

where $\{\tau_H + \Delta \tau_H - 2t\}$ is the absolute value of $(\tau_H + \Delta \tau_H - 2t)$, t varies from zero to $\tau_H$, $c_2$ is a positive unequal to zero coefficient equal to the ratio of the value of $f_{s2}(t)$ at $t = \Delta \tau_H/2$ to its value at $t = (\tau_H + \Delta \tau_H)/2$, and also that at the receiving side storing be carried out with a sampling frequency $f_{s3}(t)$ varying during a field duration $\tau_v$ interval according to the relation:

$$f_{s3}(t) = f_{s3} \frac{0.5(1 + c_1)\tau_v}{c_1\tau_v + (1 - c_1)|\tau_v + \Delta\tau_v - 2t|},$$

where $f_{s3}$ is the value of $f_{s3}(t)$ at $t=(\tau_v+2\Delta\tau_v)/4$, with readout performed with a sampling frequency $f_{s4}(t)$ varying during a line duration interval $\tau_H$ according to the relation:

$$f_{s4}(t) = f_{s3}(t) \frac{0.5(1 + c_2)\tau_H}{c_2\tau_H + (1 - c_2)|\tau_H + \Delta\tau_H - 2t|}$$

with t varying within the limits from zero to $\tau_H$.

BRIEF DESCRIPTION OF THE DRAWINGS

FIG. 8 shows the approximate pattern of a line of the composite colour television signal in the television system of this invention, with simultaneous transmission of colour-difference signals during the blanking interval;

DESCRIPTION OF THE PREFERRED EMBODIMENT OF THE INVENTION

The television system of the invention, with time-division multiplexing of the luminance and chrominance signals and with a composite colour television signal generated using reflected modulated signals of the $E_3(t)$ kind containing information on individual features of the picture, is embodied as follows. Luminance signals $E_y(t)$ are positioned within the entire active line, whereas time-compressed color difference signals $E_{R-Y}(t)$ and $E_{B-Y}(t)$ containing chrominance information are transmitted during horizontal blanking intervals. At the transmitting side video signals $E_{1-1}(t)$ and $E_{1-2}(t)$ are used to quadrature modulate the subcarriers at phases "O" and "$\pm\pi/2$", thus generating a $E_3(t)$ reflected modulated signal. The subcarrier frequencies $f=\omega/2\pi$ are selected such, as to ensure the required phase $\phi$ shifts of the reflected modulated signals $E_3(t)$ subcarriers in adjacent lines of a frame $\phi_H$ and in identically numbered lines of adjacent frames $\phi_p$ prespectively. Selection of these phases, $\phi_H$ and $\phi_p$, will be treated in detail herein below.

Figure 1:
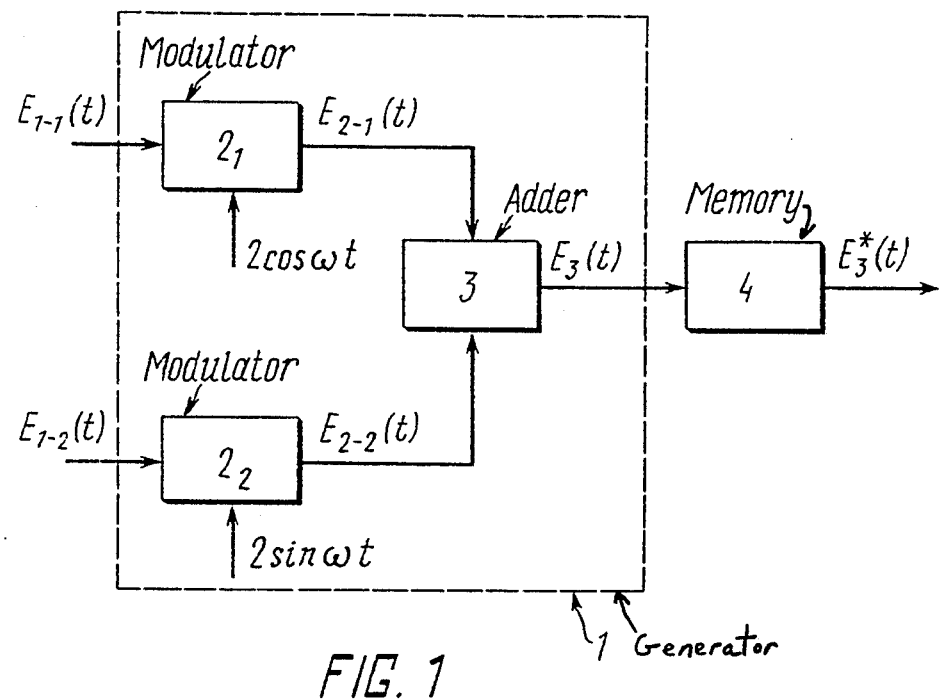
FIG. 1 shows a block diagram for generating a reflected modulated signal.

Reflective modulated signals $E_3(t)$ are provided by generator 1, an embodiment of the functional diagram whereof is presented in FIG. 1.

Here one of the modulating signals, $E_{1-1}(t)$, arrives at an input of modulator $2_1$, the second input whereof receives the subcarrier frequency 2 cos ω t voltage. The second modulating video signal, $E_{1-2}(t)$, is applied to the first input of modulator $2_2$ with the other input thereof receiving a 2 sin ωt voltage, so that a signal $E_{2-2}(t)=2E_{1-2}(t)$ sin ω t is generated at the output thereof. Similarly, a signal $E_{2-1}(t)=2E_{1-1}(t)$ cos ω t is generated at the output of modulator $2_1$. Signals $E_{2-1}(t)$ and $E_{2-2}(t)$ are passed to the inputs of adder 3 to generate a reflected quadrature modulated signal $E_3(t)$ (in the following abbreviated to "reflected modulated signals"). Reflected modulated signals $E_3(t)$ may be generated both in analogue and digital form; in the latter case video signals $E_{1-1}(t)$, $E_{1-2}(t)$, subcarrier voltages 2 sin ωt, 2 cos ω t, and signals $E_{2-1}(t)$, $E_{2-2}(t)$, $E_3(t)$ are digital streams, modulators $2_1$ and $2_2$ are digital multipliers, and adder 3 is a digital adder.

Reflected modulated signal $E_3(t)$ generation is thus completed.

In case of need, to be discussed herein below, the time scale of the reflected modulated signal $E_3(t)$ can be modified at the transmitting end by entering this signal at a sampling frequency $f_1$ into memory 4, with subsequent readout at a clock frequency of $f_2$, thus producing a signal $E_3^*(t)$ with a modified time scale. The time scaling factor K will be $K=f_2/f_1$.

The thus generated reflected modulated signals $E_3(t)$ are transmitted during allocated intervals of the composite colour television signal $E_M(t)$. Allocation of signals carrying information on individual features of the picture in one scan line of the composite colour television signal $E_M(t)$ is shown schematically in FIG. 2.

At a total line duration from $t_{o-1}$ to $t_{o-2}$, the time interval from $t_{o-1}$ to $t_1$ is allocated for synchronization signals and, if needed, supplementary data signals. The chrominance signal is allocated to the time interval from $t_2$ to $t_3$, the luminance signal is allocated to the time interval from $t_4$ to $t_5$. The intervals from $t_1$ to $t_2$, from $t_3$ to $t_4$, and from $t_5$ to $t_{o-2}$ are guard spaces.

Transmission of supplementary data is not obligatory. Sound accompaniment may be such a supplementary data signal.

Figure 3:
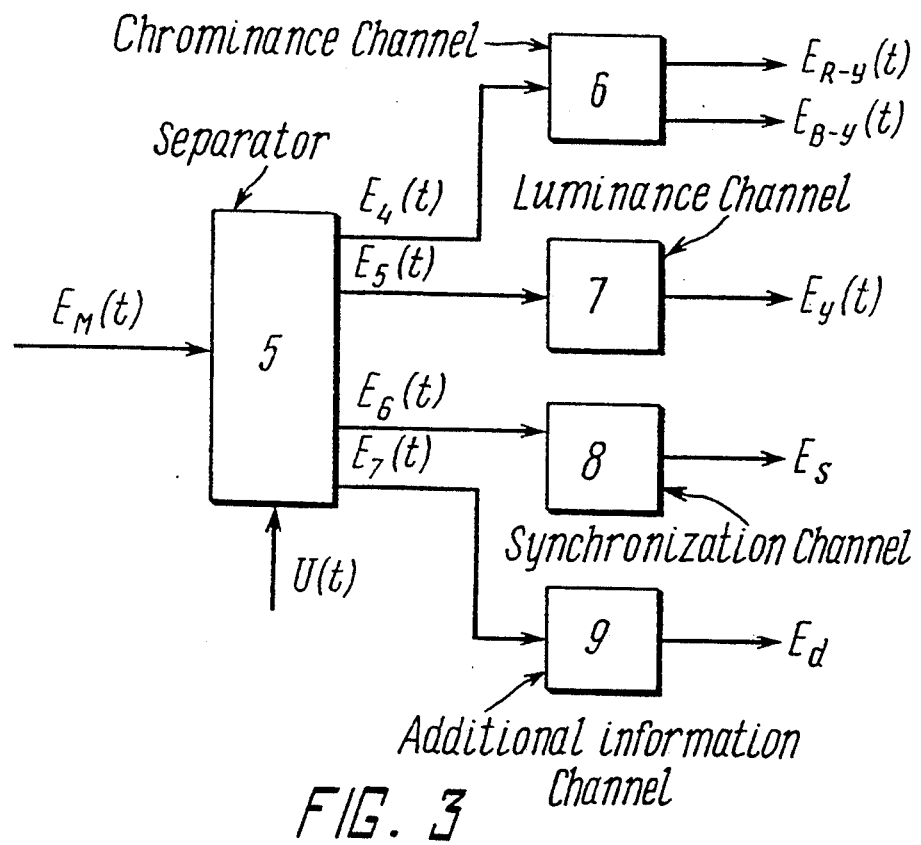
FIG. 3 shows a block diagram of the decoder of composite colour television signals in the television system of this invention.

At the receiving side a decoder, an embodiment of the functional diagram whereof is presented in FIG. 3, provides processing of the composite colour television signal $E_M(t)$.

One input of separator 5 receives the composite colour television signal $E_M(t)$, with the other input driven by a control signal U(t), and generate at its outputs: chrominance signal $E_4(t)$, luminance information containing signal $E_5(t)$, synchronization signal $E_6(t)$, and supplementary data signal $E_7(t)$, each passed to its appropriate processing channel. Channel 6 executes processing chrominance signals $E_4(t)$ to produce colour-difference signals $E_{R-Y}(t)$ and $E_{B-Y}(t)$ at its output; channel 7 provides luminance information containing signal $E_5(t)$ processing to generate a luminance signal $E_y(t)$ at its output; synchronization signals $E_s$ are produced at the output of channel 8, and supplementary data signals are produced at the output of channel 9. In cases when the inputs of channels 6 and 7 receive reflected modulated chrominance signals $E_4(t)$ and luminance information containing signals $E_5(t)$, respectively, of the $E_3^*(t)$ form shown in FIG. 1, the time scale whereof was modified at the transmitting side, processing channels 6 and 7 (FIG. 3) should comprise memories to perform a time scaling, inverse relative to that performed in memory 4 at the transmitting side. Difference-colour signals $E_{R-Y}(t)$ and $E_{B-Y}(t)$ separated in channel 6 and luminance signals $E_y(t)$ generated in channel 7, with equalized time scales, are then aligned in time.

Figure 4:
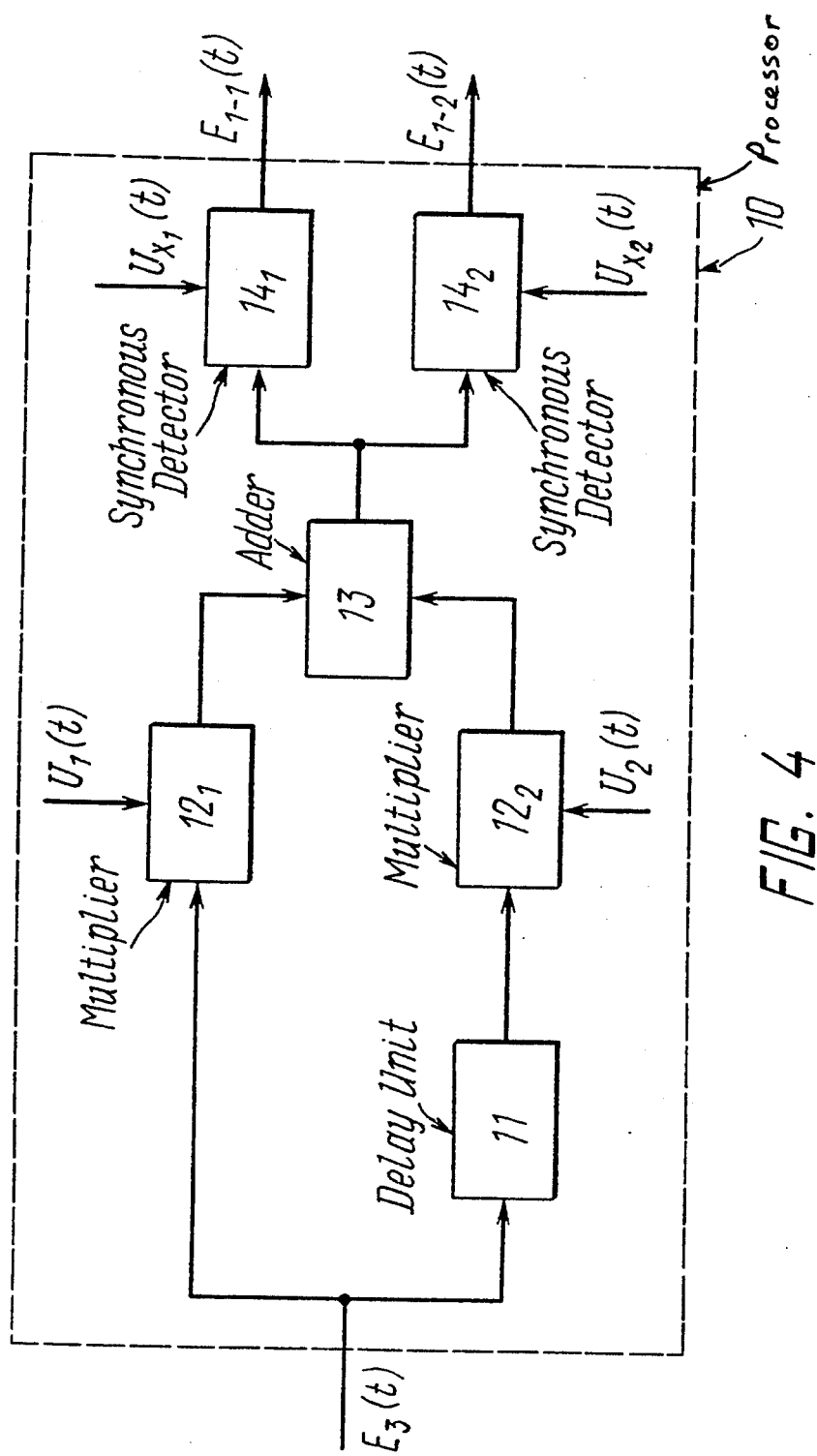
FIG. 4 shows a block diagram of the reflected modulated signal processor, with signal translation to a high carrier frequency, and modulating signals detection.
Figure 5:
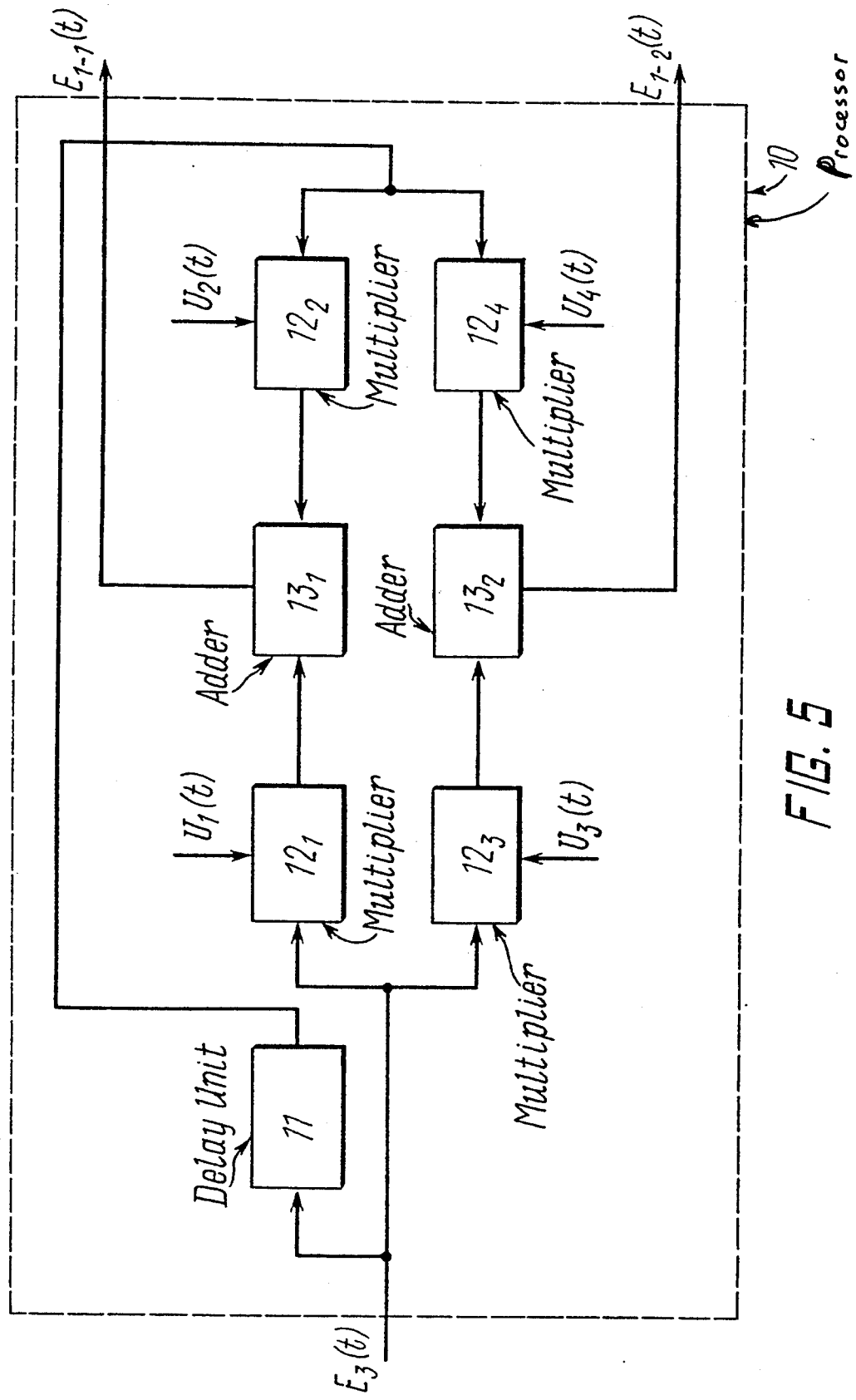
FIG. 5 shows a block diagram of the reflected modulated signal processor and modulating signal detection directly at the subcarrier frequency f.
Figure 6:
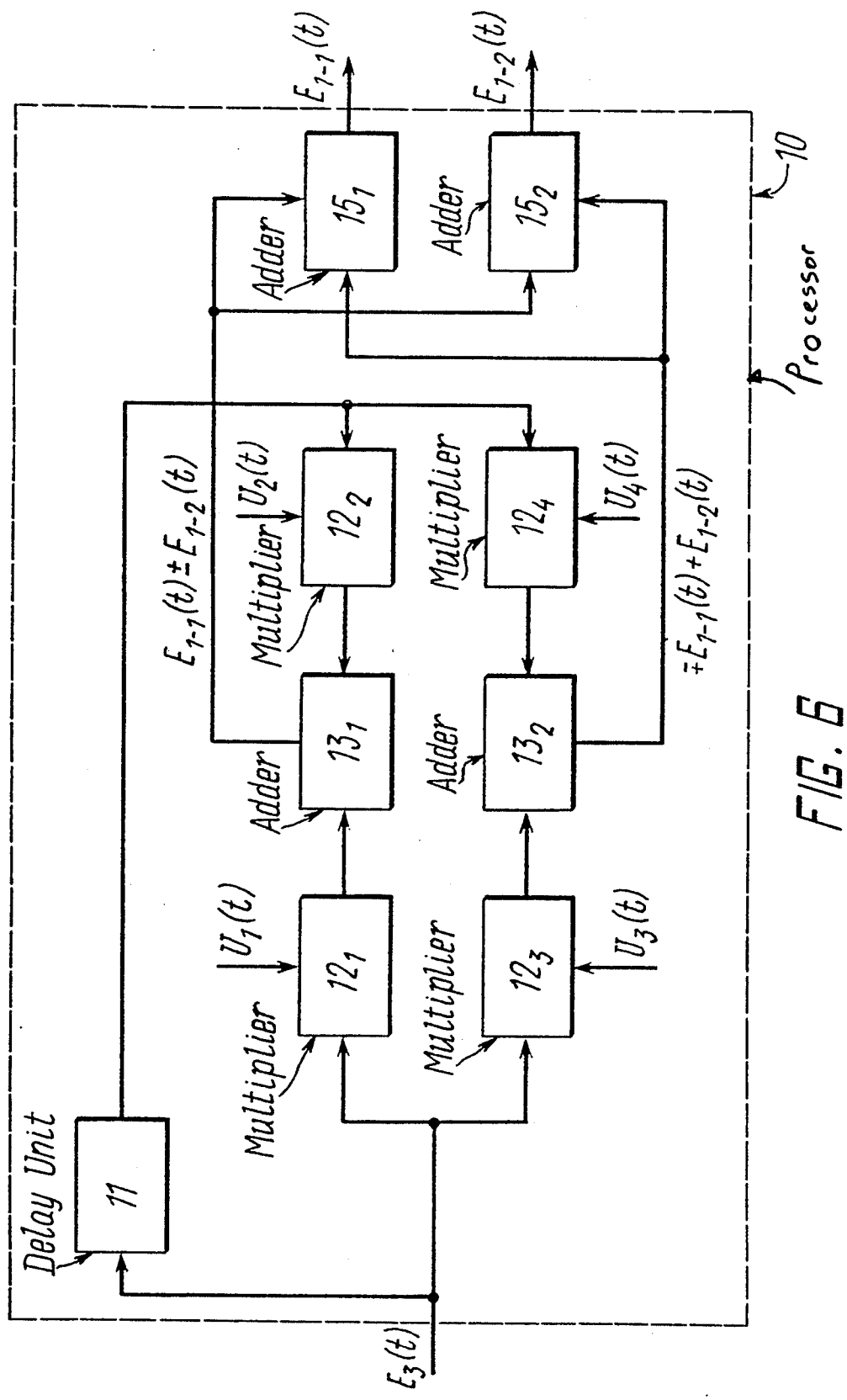
FIG. 6 shows a block diagram of reflected modulated signal processing and modulating signals detection directly at the subcarrier frequency f, with modulating signals separation by supplementary adders.

Channels 6 and 7 which receive reflected modulated signals at their inputs have to be equipped with processors of reflected modulated signals $E_3(t)$ to separate modulating video signals $E_{1-1}(t)$ and $E_{1-2}(t)$ therefrom. Embodiments of foldedband signal processors 10 are shown in FIGS. 4 and 5. Sometimes reflected modulated signal $E_3(t)$ processing in channel 6 (FIG. 3) may require modification of the functional design of processor 10, as shown in FIG. 6, such cases will be herein particularized.

FIG. 4 illustrates an embodiment of the functional diagram of reflected modulated signal $E_3(t)$ processor 10 with signal translation to a high carrier frequency and detection of modulating video signal $E_{1-1}(t)$ and $E_{1-2}(t)$. Here the undelayed reflected modulated signal $E_3(t)$ message is simultaneously passed to the input of delay unit 11 and to one input of multiplier $12_1$ $$E_3(t)=E_{1-1}(t)\cos\omega t + E_{1-2}(t)\sin\omega t, \tag{1}$$

where $\omega=2\pi f$, f is the subcarrier frequency. The other input of multiplier $12_1$ receives a harmonic voltage $U_1(t)=2\cos\omega_x t$, where $\omega_x=2\pi f_x$, $f_x$ is the harmonic signal frequency and is higher than the upper limiting frequency $f_{lim}$ in the folded-band signal $E_3(t)$ spectrum. The output voltage of multiplier $12_1$ will be equal to $$E_3(t)2\cos\omega_x t = E_{1-1}(t)[\cos(\omega_x-\omega)t+\cos(\omega_x+\omega)t]+E_{1-2}(t)[-\sin(\omega_x-\omega)t+\sin(\omega_x+\omega)t] \tag{2}$$

The input of multiplier $12_2$ receives a delayed reflected modulated signal $E_3(t-T)$ message from the output of delay unit 11. The time delay, T, is a multiple of the scan period, $T=q\tau_H$, where $\tau_H$ is the line duration and q is a natural number.

$$\begin{aligned}E_3(t-T)&=E_{1-1}(t)\cos\omega(t-T)+E_{1-2}(t)\sin\omega(t-T)\\&=E_{1-1}(t)\cos(\omega t-q\phi_H)+E_{1-2}(t)\sin(\omega t-q\phi_H),\end{aligned} \tag{3}$$

because $\omega\tau_H=\phi_H$ is the phase shift of the unmodulated subcarrier between adjacent lines of one frame. The other input of multiplier $12_2$ receives a harmonic voltage $U_2(t)=2\cos(\omega_x t+\pi+q\phi_H)$. The output signal of multiplier $12_2$ will therefore be:

$$E_3(t-T)2\cos(\omega_x t+\pi+q\phi_H)=E_{1-1}(t)[\cos(\omega_x t-\omega t+\pi+2q\phi_H)-\cos(\omega_x-\omega)t]+E_{1-2}(t)[-\sin(\omega_x t-\omega t+\pi+2q\phi_H)-\sin(\omega_x+\omega)t] \tag{4}$$

The output voltages of multipliers $12_1$ and $12_2$ are passed to adder 13 to generate at the output thereof:

$$2E_{1-1}(t)\cos[(\omega_x-\omega)t+(\pi/2)+q\phi_H]\cos((\pi/2)+q\phi_H)-2E_{1-2}(t)\sin[(\omega_x-\omega)t+(\pi/2)+q\phi_H]\cos((\pi/2)+q\phi_H) \tag{5}$$

which is a quadrature modulated signal with unfolded sidebands at a carrier frequency $f_x-f=(\omega_x-\omega)/2\pi$ that is higher than the limiting frequency $f_{lim}$ in the signal $E_3(t)$ spectrum.

The output signal of adder 13 is applied to the inputs of synchronous detectors $14_1$ and $14_2$, the other inputs whereof receive harmonic signals $$U_{x1}(t)=\frac{1}{\cos\left(\frac{\pi}{21}+q\phi_H\right)}\cos(\omega_x-\omega)t+\frac{\pi}{2}+q\phi_H)$$

and $$U_{x2}(t)=\frac{1}{\cos\left(\frac{\pi}{2}+q\phi_H\right)}\sin(\omega_x-\omega)t+\frac{\pi}{2}+q\phi_H),$$

respectively, and at the outputs whereof video signals $E_{1-1}(t)$ and $E_{1-2}(t)$ are generated.

The output voltage of adder 13 is at a maximum at $\cos(\pi/2+q\phi_H)=\pm 1$, i.e. at $q\phi_H=(\pi/2)(2x-1)$, where x is an integer.

At $q\phi_H=\pi x$ the output signal of adder 13 is zero. Variation of $q\phi_H$ from zero (or $\pi$) to $(\pi/2)$(or to $\pi+(\pi/2)$) will produce maximum value of the output signal of adder 13 from zero to maximum and therefore $q\phi_H=(\pi/2)(2x-1)$ will provide a maximal interference immunity of rejected modulated signal $E_3(t)$ processing in processor 10. Consequently, no cross-modulation distortions between signals $E_{1\text{-}1}(t)$ and $E_{1\text{-}2}(t)$ will be generated at any value of $\phi_H$, provided the phases of harmonic signals $U_{x1}(t)$ and $U_{x2}(t)$ are properly selected. This makes such a method of processing reflected modulated signals with signal translation to a high carrier frequency universal. However, it is not always convenient, for instance for processing digital $E_3(t)$ signals, and therefore an alternate method is offered for folded-band signal processing and detection therefrom the modulating $E_{1\text{-}1}(t)$ and $E_{1\text{-}2}(t)$ signals directly on the subcarrier frequency f.

FIGS. 5 and 6 illustrate embodiments of functional diagrams of processor 10 providing reflected modulated signal $E_3(t)$ processing and detection therefrom of the modulating video signals $E_{1\text{-}1}(t)$ and $E_{1\text{-}2}(t)$ directly at the subcarrier frequency f. The undelayed reflected modulated signal message is $$E_3(t) = E_{1\text{-}1}(t)\cos \Omega t + E_{1\text{-}2}(t)\sin \omega t \quad (7)$$

This message is passed to the inputs of delay unit 11 and multipliers $12_1$ and $12_3$. The second inputs of multipliers $12_1$ and $12_3$ receive harmonic signals $U_1(t)=2\cos \omega t$ and $U_3(t)=2\sin \omega t$, respectively. At the output of multiplier 12, the voltage will be:

$$E_3(t)\,2\cos \omega t = E_{1\text{-}2}(t)\sin 2\omega t + E_{1\text{-}1}(t)\cos 2\omega t \quad (6)$$

and the signal at multiplier $12_3$ output will constitute:

$$E_3(t)2\sin \omega t = E_{1\text{-}1}(t)\sin 2\omega t + E_{1\text{-}2}(t) - E_{1\text{-}2}(t)\cos 2\omega t \quad (7)$$

The delayed by time equal T reflected modulated signal message from the output of delay unit 11 is:

$$E_3(t-T) = E_{1\text{-}1}(t)\cos(\omega t - q\phi_H) + E_{1\text{-}2}(t)\sin(\omega t - q\phi_H) \quad (3)$$

and is passed to the inputs of multipliers $12_2$ and $12_4$, the second inputs whereof are driven by harmonic signals $U_2(t)=2\cos(\omega t+\pi+q\phi_H)$ and $U_4(t)=2\sin(\omega t+\pi+q\phi_H)$, respectively.

The output signal of multiplier $12_2$ is $$E_3(t-T)\,2\cos(\omega t+\pi+q\phi_H) = E_{1\text{-}1}(t)[\cos(\pi+2q\phi_H)-\cos 2\omega t] - E_{1\text{-}2}(t)[\sin(\pi+2q\phi_H)+\cos 2\omega t] \quad (8)$$

and the output signal of multiplier $12_4$ is $$E_3(t-T)2\sin(\omega t+\pi+q\phi_H) = E_{1\text{-}1}(t)[\sin(\pi+2q\phi_H)-\sin 2\omega t] + E_{1\text{-}2}(t)[\cos(\pi+2q\phi_H)+\cos 2\omega t] \quad (9)$$

the output signals of multipliers $12_1$ and $12_2$ drive adder $13_1$, to generate an output signal thereof:

$$E_{1\text{-}1}(t)(1-\cos 2q\phi_H) + E_{1\text{-}2}(t)\sin 2q\phi_H \quad (10)$$

The output signals of multipliers $12_3$ and $12_4$ drive the inputs of adder $13_2$ to generate at the output thereof a signal:

$$-E_{1\text{-}1}(t)\sin 2q\phi_H + E_{1\text{-}2}(t)(1-\cos 2q\phi_H) \quad (11)$$

At $q\phi_H=(\pi/2)(2x-1)$, where x is an integer, $\cos 2q\phi_H=-1$ and $\sin 2q\phi_H=0$, so that the output signal of adder $13_1$ is $2E_{1\text{-}1}(t)$, and the output voltage of adder $13_2$ is $2E_{1\text{-}2}(t)$. This is achieved by using processor 10, the functional diagram whereof is presented in FIG. 5, to process the reflected modulated signals $E_3(t)$. At $q\phi_H=\pi(2x-1)$, $\cos 2q\phi_H=1$ and $\sin 2q\phi_H=0$, so that the output signals of adders $13_1$ and $13_2$ are zero. At $q\phi_H=(\pi/4)(2x-1)$, $\cos 2q\phi_H=0$ and $\sin 2q\phi_H=\pm 1$, so that the output signal of adder $13_1$ is $E_{1\text{-}1}(t)\pm E_{1\text{-}2}(t)$ and the output signal of adder $13_2$ is $\pm E_{1\text{-}1}(t)+E_{1\text{-}2}(t)$.

Separation of $E_{1\text{-}1}(t)$ and $E_{1\text{-}2}(t)$ signals requires that processor 10 be further equipped with supplementary adders $15_1$ and $15_2$ (FIG. 6), wherein this separation is directly provided by algebraic summing.

It should be noted, that, as in reflected modulated signal $E_3(t)$ processing with signal translation to a high carrier frequency (FIG. 4), processing the $E_3(t)$ signal directly at the subcarrier frequency f (FIG. 6) and separation of the $E_{1\text{-}1}(t)$ and $E_{1\text{-}2}(t)$ video signals is achieved without cross-modulation interference between them at any value of $q\phi_H\neq(2x-1)$. To this end adder $15_1$ algebraically sums signals:

$$E_{1-1}(t)(1-\cos 2q\phi_H) + E_{1-2}(t)\sin 2q\phi_H \text{ and}$$

$$[E_{1-1}(t)\sin 2q\phi_H + E_{1-2}(t)(1-\cos 2q\phi_H)]\frac{-\sin 2q\phi_H}{1-\cos 2q\phi_H}$$

$$E_{1-1}(t)(1-\cos 2q\phi_H) + E_{1-1}(t)\frac{\sin^2 2q\phi_H}{1-\cos 2q\phi_H} +$$

$$+ E_{1-2}(t)\sin 2q\phi_H - E_{1-2}(t)\sin 2q\phi_H =$$

$$E_{1-1}(t)\frac{(1-\cos 2q\phi_H)^2 + \sin^2 2q\phi_H}{1-\cos 2q\phi_H} = 2E_{1-1}(t)$$

Adder $15_2$ provides algebraic summation of signals $$[E_{1-1}(t)(1-\cos 2q\phi_H) + E_{1-2}(t)\sin 2q\phi_H]\frac{\sin 2q\phi_H}{1-\cos 2q\phi_H}$$

and $$E_{1-1}(t)\sin 2q\phi_H + E_{1-2}(t)(1-\cos 2q\phi_H), \text{ this resulting in:}$$

$$E_{1-2}(t)\frac{(1-\cos 2q\phi_H) + \sin^2 q\phi_H}{1-\cos 2q\phi_H} = 2E_{1-2}(t).$$

Thus, maximal interference immunity is attained at $q\phi_H=(\pi/2)(2x-1)$ both with folded-band signal processing in processor 10 (FIG. 4) and in processor 10 (FIG. 6).

Figure 7:
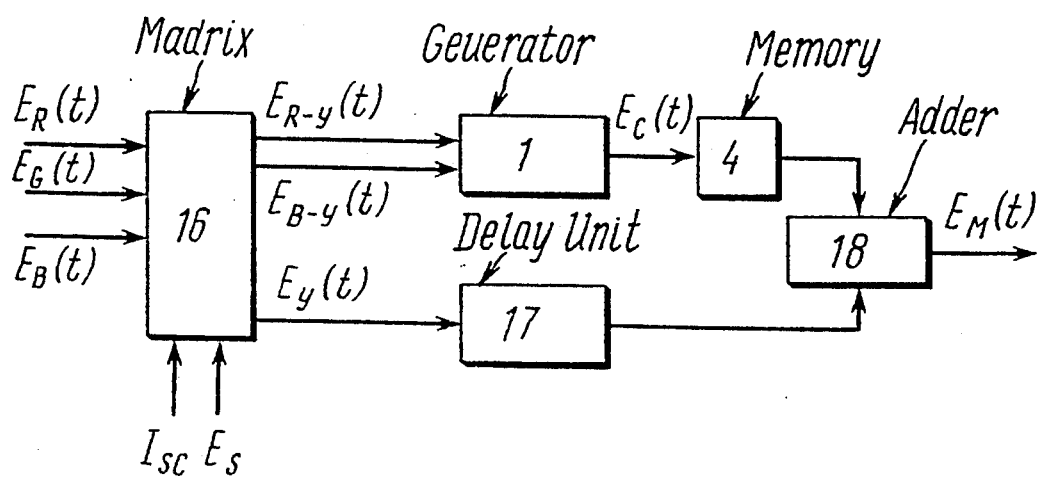
FIG. 7 shows a block diagram of the coder for generating the composite colour television signal in the television system of this invention.

In the television system of this invention with simultaneous transmission of colour-difference signals, generation of the composite colour television signal $E_M(t)$ at the transmitting side is provided with the aid of the generator, the function diagram whereof is shown in FIG. 7. Here and in the following sections of this description the chrominance signal prior to time compression is denoted as $E_c(t)$ and the time-compressed chrominance signal is denoted by $E_c^*(t)$.

Matrix 16 (FIG. 7) receives the color primary signals $E_R(t)$, $E_G(t)$, $E_B(t)$ from a picture source (not shown in FIG. 7), along with colour synchronization pulses $I_{sc}$ and synchronization signal $E_s$.

Colour synchronization pulses $I_{sc}$ are several rectangular pulses of a duration, equal to that of the active line and are allocated at the start of the vertical blanking interval.

At the outputs of matrix 16 the luminance signal $E_y(t)$ including the synchronization signal $E_s$, and the colour-difference signals $E_{R-Y}(t)$ and $E_{B-Y}(t)$ are generated, the latter two used as the modulating video signals $E_{1-1}(t)$ and $E_{1-2}(t)$.

The luminance signal $E_y(t)$ after a delay by $\tau_H$ in delay unit 17 (FIG. 7) is passed to an input of adder 18.

One of the colour-difference signals, for instance the $E_{B-Y}(t)$ signal, carries colour synchronization pulses $I_{sc}$. The colour-difference signals $E_{R-Y}(t)$ and $E_{B-Y}(t)$ arrive at the inputs of chrominance signal $E_c(t)$ generator 1; $E_c(t)$ is a reflected modulated signal of the $E_3(t)$ kind and is generated by reflected quadrature modulation of the chrominance subcarrier frequency $f_o$:

$$f_o = \frac{(2n-1)f_H \mp (2m-1)f_p}{4},$$

where $f_H$ is the line frequency, $f_p$ is the frame repetition frequency, n and m are natural numbers selected so as to provide a phase shift $\phi_o$ of the chrominance subcarriers between adjacent lines of one frame equal approximately to $\phi_{oH}=(\pi/2)(2n-1)$ and between identically numbered lines of adjacent frames approximately equal to $\phi_{op}=\pi(2i-1)$.

The chrominance signal $E_c(t)$ from the output of generator 1 is passed to the input of memory 4, wherein it is scaled in time by a scaling factor K and allocated to the horizontal blanking interval between the trailing edge of the horizontal synchronization pulse and the start of the active line. Factor K is equal to the ratio of (1) the upper limiting frequency in the rated bandwidth of composite colour television signal $E_M(t)$ to (2) the upper limiting frequency $f_{lim}$ of the chrominance signal $E_c(t)$ spectrum transmitted by one scan line prior to chrominance signal time compression. The time-compressed reflected modulated chrominance signal $E_c^*(t)$ is allocated to its proper position in the horizontal blanking interval during readout from memory 4. The time-compressed chrominance signal $E_c^*(t)$, containing the colour synchronization signal $E_{sc}$, is passed from the output of memory 4 to the other input of adder 18. The colour synchronization signal $E_{sc}$ is in the form of messages of the compressed in time by a factor of K reflected modulated chrominance-subcarrier signal at a reference phase. These messages are allocated to several lines of the vertical blanking interval. The duration of each $E_{sc}$ signal message in the lines of the vertical blanking interval is equal to the duration of the time-compressed chrominance signal $E_c^*(t)$ transmitted during one line of the active frame.

The composite colour television signal $E_M(t)$ is generated at the output of adder 18; the typical pattern of one scan line thereof is shown in FIG. 8. The composite colour television signal $E_M(t)$ contains messages of time-compressed chrominance signal $E_c^*(t)$.

The total duration of one line of the composite colour television signal $E_M(t)$ is equal to the interval from $t_{o-1}$ to $t_{o-2}$, horizontal synchronization signals (and in case of need, supplementary data signals) are transmitted during the time interval from $t_{o-1}$ to $t_1$. Chrominance signals $E_c^*$ are transmitted during the interval from $t_2$ to $t_3$ and the luminance signals are transmitted during the time interval from $t_4$ to $t_5$. Intervals from $t_1$ to $t_2$, $t_3$ to $t_4$, and $t_5$ to $t_{o-2}$ are guard spaces.

The chrominance signal $E_c^*(t)$ is allocated in the composite colour television signal $E_M(t)$ in time interval between the trailing edge of the horizontal synchronization pulse and the start of the active line and on the pedestal transmitted during the time interval from $t_2$ to $t_3$, the pedestal level set to half the peak-to-peak value (reference black to reference white) of the luminance signal $E_y(t)$.

As mentioned herein above, at the receiving side the composite colour television signal $E_M(t)$ arrives at the input of decoder 5 (FIG. 3), wherein the time-compressed chrominance signal $E_c^*(t)$ is separated and passed to processing channel 6. An embodiment of processing channel 6 for processing the time-compressed chrominance signal $E_c^*(t)$ in decoder 5 is presented in FIG. 9.

The separated messages of the time-compressed chrominance signal $E_c^*(t)$ are delayed by a frame duration $\tau_p$ in delay unit 19 and then passed to an input of adder 20 for algebraic summation with messages of chrominance signals $E_c^*(t)$ of identically numbered lines of undelayed picture signals applied to the other input of adder 20 from the output of separator 5 (FIG. 3). The output signal of adder 20 (FIG. 9) is the sum of chrominance signals $E_c^*(t)$ in identically numbered lines of adjacent frames and is passed to memory 21 for time scaling by $1/K$ times. Messages of summed chrominance signals $E_c(t)$ with a restored initial time scale are passed from the output of memory 21 to reflected modulated signal processor 10.

Further processing of $E_c(t)$ chrominance signals in processor 10 described herein above with reference to FIGS. 4, 5 and 6, may be carried out both with signal translation to a high carrier frequency (FIG. 4) and directly at the chrominance subcarrier frequency $f_o$ (FIGS. 5,6).

The additional time delay of chrominance signals $E_c(t)$ is $T=q\tau_H$, where q is a natural number and $\tau_H$ is the line duration, and is provided by delay unit 11 in processor 10 (FIG. 4).

As mentioned herein above, in processor 10 the undelayed $E_c(t)$ chrominance signal is multiplied by a harmonic signal $U_1(t)=2\cos\omega_x t$, $\omega_x=2\pi f_x$, $f_x > f_{lim}$, in multiplier $12_1$ and the delayed chrominance signal $E_c(t-T)$ messages are multiplied by a harmonic signal $U_2(t)=2\sin(\omega_x t + \pi + \Delta\phi_o)$ by multiplier $12_2$, where $\Delta\phi_o = \phi_{o1} - \phi_{o2}$, $\phi_{o1}$ and $\phi_{o2}$ are the chrominance subcarrier phase of the delayed messages of chrominance signals $E_c(t-T)$ and undelayed messages of chrominance signals $E_c(t)$. This phase shift $\Delta\phi_o$ is related to the time delay $T=q\tau_H$ by the relation:

$$\Delta\phi_o = \phi_{o1} - \phi_{o2} = \omega_o q \tau_H,$$

where $\omega_o = 2\pi f_o$.

The output signal of adder 13 is a quadrature modulated chrominance signal with unfolded sidebands at a high carrier frequency and after detection in synchronous detectors $14_1$ and $14_2$ yields the difference-colour signals $E_{R-Y}(t)$ and $E_{B-Y}(t)$, respectively. Another embodiment of the conjoint processing of delayed and undelayed messages of chrominance signals by processor 10 (FIGS. 5 and 6) involves multiplication of the undelayed chrominance signal $E_c(t)$ in multipliers $12_1$ and $12_3$ by $U_1(t)=2\cos\omega_o t$ and $U_3(t)=2\sin\omega_o t$, respectively, and multiplication of the delayed chrominance signal $E_c(t-T)$ by $U_2(t)=2\cos(\omega_o t + \pi + \Delta\phi_o)$ and $U_4(t)=2\sin(\omega_o t + \pi + \Delta\phi_o)$ in multipliers $12_2$ and $12_4$, respectively. Subsequent summing of the output voltages of multipliers $12_1$ and $12_2$ in the adder 13, directly yields one of the colour-difference signals, for instance $E_{R-Y}(t)$.

Adding the output voltages of multipliers $12_3$ and $12_4$ in adder $13_2$ directly separates the second colour-difference signal $E_{B-Y}(t)$.

Other embodiments of the conjoint processing of the undelayed and delayed by various delay times chrominance signal $E_c(t)$ messages are discussed herein below, both with signal translation to a high carrier frequency $f_x$ and directly at the chrominance subcarrier frequency $f_o$.

For instance, with an additional delay by a line duration $\tau_H$ of the message of algebraically summed chrominance signals $E_c(t)$ in identically numbered lines of adjacent frames, the phase shift $\phi_{oH}$ between the unmodulated subcarrier frequency $f_o$ of the delayed message $E_c(t-\tau_H)$ and undelayed message $E_c(t)$ will constitute:

$$\phi_{oH} = 2\pi f_o \tau_H = 2\pi \frac{f_o}{f_H} = 2\pi \left( \frac{2n-1}{4} + \frac{2m-1}{4z} \right) =$$

$$= \frac{\pi(2n-1)}{2} \pm \frac{\pi(2m-1)}{2z} =$$

$$\frac{\pi}{2}(2n-1) \pm \frac{\pi}{2z}(2m-1).$$

With reflected modulation, the chrominance subcarrier frequency $f_o$ is low and n and m values are practically several units. On the contrary, $z>1$, for instance in standard broadcasting systems $z=525$ and $z=625$ and is expected to be over 1000 in future HDTV systems. Consequently, with an accuracy to within fractions of a percent, the $(\pi/2z)(2m-1)$ term may be neglected, so that:

$$\Delta\phi_o = \phi_{oH} = 2\pi f_o \tau_H = (\pi/2)(2n-1).$$

Equations (1) to (5) can be used to described signal $E_c(t)$ processing in processor 10 (FIG. 4), resplacing $E_3(t)$ with $E_c(t)$ $E_{1-1}(t)$ with $E_{R-Y}(t)$, $E_{1-2}(t)$ with $E_{B-Y}(t)$, $\omega = \omega_o = 2\pi f_o$, $q = 1 q\phi_H = (\pi/2)(2n-1)$, and $T=\tau_H$. Then the signal arriving at the input of delay unit 11 and one input of multiplier 12, (Eq.(1)) will be $E_3(t-)=E_c(t)=E_{R-Y}(t) \cos \omega_o t + E_{B-Y}(t) \sin \omega_o t$.

The harmonic signal $U_1(t)$ driving the other input of multiplier $12_1$ will be $U_1(t)=2 \cos \omega_x t$, where $\omega_x = 2\pi f_x$, $f_x$ exceeds the upper limiting frequency $f_{lim}$ of the $E_c(t)$ signal spectrum.

The output voltage of delay unit 11 driving one input of multiplier $12_2$ (Eq.(3)) will be:

$$E_3(t-T) = E_c(t-\tau_H) = E_{R-Y}(t)\cos\left[\omega_o t - \frac{\pi}{2}(2n-1)\right] +$$

$$+ E_{B-Y}(t)\sin\left[\omega_o t - \frac{\pi}{2}(2n-1)\right].$$

Harmonic signal $U_2(t)$ driving the other input of multiplier $12_2$ is:

$$U_2(t) = 2\cos[\omega_x t + \pi \neq (\pi/2)(2n-1)] = 2\cos[\omega_x t + (\pi/2)(2n+1)].$$

Voltage signals from the outputs of multipliers $12_1$ and $12_2$ at the inputs of adder 13 (Eqs(2) and (4)) are:

$$E_3(t)U_1(t) = E_c(t)2\cos\omega_x t = E_{R-Y}(t)[\cos(\omega_x - \omega_o)t +$$

$$+ \cos(\omega_x + \omega_o)t] + E_{B-Y}(t)[-\sin(\omega_x - \omega_o)t + \sin(\omega_x + \omega_o)t]$$

and $$E_3(t-T)U_2(t) = E_c(t-\tau_H)2\cos\left[\omega_x t + \frac{\pi}{2}(2n+1)\right] =$$

$$= E_{R-Y}(t)[\cos(\omega_x - \omega_o)t - \cos(\omega_x + \omega_o)t] -$$

$$E_{B-Y}(t)[\sin(\omega_x - \omega_o)t + \sin(\omega_x + \omega_o)t].$$

The output voltage of adder 13 (Eq.(5)) will be:

$$E_3(t)U_1(t) + E_3(t-T)U_2(t) = 2E_{R-Y}(t)\cos(\omega_x - \omega_o)t + 2E_{B-Y}(t)\sin(\omega_x - \omega_o)t,$$

where $\omega_x - \omega_o = 2\pi(f_x - f_o)$, and $f_x - f_o$ is higher than the upper limiting frequency $f_{lim}$ in the $E_c(t)$ signal spectrum.

Harmonic signals driving synchronous detectors $14_1$ and $14_2$ are $U_{x1}(t) = \cos(\omega_x - \omega_o)t$ and $U_{x2}(t) = -\sin\times(\omega_x - \omega_o)t$. The colour-difference signals $E_{R-Y}(t)$ and $E_{B-Y}(t)$ are the output signals of the synchronous detectors $14_1$ and $14_2$.

In reflected modulated signal processor 10 (FIG. 5) the inputs of delay unit 11 and multipliers $12_1$ and $12_3$ receive signal $E_3(t) = E_c(t) = E_{R-Y}(t) \cos \omega_o t + E_{B-Y}(t)\times\sin \omega_o t$ according to Eq.(1), as demonstrated herein above. Harmonic signals driving the second inputs of multipliers $12_1$ and $12_3$ will, respectively, be $U_1(t) = 2\cos\omega_o t$ and $U_3(t) = 2\sin\omega_o t$. Multipliers $12_2$ and $12_4$ receive from the output of delay unit signals $E_3(t-T) = E_c(t-\tau_H) = E_{R-Y}(t)\cos[\omega_o t - (\pi/2)(2n-1)] + E_{B-Y}(t)\sin[\omega_o t - (\pi/2)(2n-1)]$ and their other inputs are driven by harmonic signals $U_2(t) = 2\cos[\omega_o t + (\pi/2)(2n+1)]$ and $U_4(t) = 2\sin[\omega_o t + (\pi/2)(2n+1)]$, respectively. Signal voltages arriving at adder $13_1$ from the outputs of multipliers $12_1$ and $12_2$ (Eqs. (6) and (8)) are:

$$E_3(t)U_1(t) = E_c(t)2\cos\omega_o t = E_{R-Y}(t) +$$

$$E_{R-Y}(t)\cos 2\omega_o t + E_{B-Y}(t)\sin 2\omega_o t$$

and $$E_3(t-T)U_2(t) = E_c(t-\tau_H)2\cos\left[\omega_o t + \frac{\pi}{2}(2n+1)\right] =$$

$$E_{R-Y}(t) - E_{R-Y}(t)\cos 2\omega_o t - E_{B-Y}(t)\sin 2\omega_o t,$$

so that adder $13_1$ output voltage is $2E_{R-Y}(t)$. Signals from the outputs of multipliers $12_3$ and $12_4$ (Eqs. (7) and (9)) driving adder $13_2$ are $$E_3(t)U_3(t) = E_c(t)2\sin\omega_o t = E_{R-Y}(t)\sin 2\omega_o t +$$

$$E_{B-Y}(t) - E_{B-Y}(t)\cos 2\omega_o t$$

and $$E_3(t-T)U_4(t) = E_c(t-\tau_H)2\sin\left[\omega_o t + \frac{\pi}{2}(2n-1)\right] =$$

-continued
$$E_{R-Y}(t)\sin 2\omega_o t + E_{B-Y}(t) + E_{B-Y}(t)\cos 2\omega_o(t),$$

so that the output voltage of adder $13_2$ is $2E_{B-Y}(t)$.

In a number of program production processes, for instance with some methods of generating combined pictures, the vertical chrominance definition has to be set to half the vertical luminance definition. In such cases the additional time delay of summed messages of chrominance signals $E_c(t)$ from identically numbered lines of adjacent frames should be about a field duration. Since, as stated herein above, the time delay should be an integer of lines (to avoid spatial displacement of the delayed and undelayed picture lines), in this case $q_1=(z+1)/2$ and $q_2=(z-1)/2$ and the phase shift $\Delta\phi$ between the unmodulated subcarrier of the delayed and undelayed chrominance signal $E_c(t)$ messages will constitute:

$$\Delta\phi_{o1} = 2\pi f_o q_1 \tau_H = 2\pi f_o T_1 = 2\pi f_o \frac{z+1}{2} \tau_H =$$

$$\pi\left(\frac{2n-1}{4} \pm \frac{2m-1}{4z}\right)(z+1)$$

or $$\Delta\phi_{o2} = 2\pi f_o q_2 \tau_H = 2\pi f_o T_2 = 2\pi f_o \frac{z-1}{2} \tau_H =$$

$$\pi\left(\frac{2n-1}{4} \pm \frac{2m-1}{4z}\right)(z-1),$$

where $T_1 = z + 1/2 \, \tau_H$ and $T_2 = z - 1/2 \, \tau_H$. The delay of the first and second fields of the frame may be equal, for instance $T_1$, or unequal, for instance $T_1$ in the first field and $T_2$ in the second, both these arrangements providing a vertical chrominance definition about half of the luminance definition, but with somewhat different spatial frequency response. In the general case, the phase shift at delays $T_1$ and $T_2$ can be presented as $$\Delta\phi_o = 2\pi f_o T = 2\pi f_o (z \pm 1)\tau_H/2 =$$

$$\left(\frac{2n-1}{4} \pm \frac{2m-1}{4z}\right)(z \pm 1),$$

this equation may be somewhat simplified, taking into account $z > 1$ (for instance, in standard television broadcasting $z = 525$ or $z = 625$ and in projected HDTV z is expected to exceed 1000), so that $(z\pm 1)/z$ can be assumed to be unity with an accuracy of 0.998 (error less than 0.2%) and the equation for $\Delta\phi_o$ may be presented in the form $\Delta\phi_o=(2n-1/4)$ $(z\pm 1)\pm(\pi/4)$ $(2m-1)$. Processing of the $E_c(t)$ chrominance signal in processor 10 (FIG. 4) may be described by Eqs. (1) to (5) for reflected modulated signal $E_3(t)$ processing by replacing $E_3(t)$ with $E_c(t)$, $E_{1-1}(t)$ with $E_{R-Y}(t)$, $E_{1-2}(t)$ with $E_{B-Y}(t)$, $\phi = \phi_o = 2\pi f_o$, as in the preceeding case of signal $E_c(t)$ delay by $\tau_H$, and setting $q=(z\pm 1)/2$, $T=(z\pm 1)\tau_H/2$ and $q\tau_H = \Delta\phi_o$.

In this case the signal arriving at the input of delay unit 11 and at one input of multiplier $12_1$ (Eq.(1)) is $E_3(t)=E_c(t)=E_{R-Y}(t) \cos \omega_o t + E_{B-Y}(t) \sin \omega_o t$, the other input of multiplier $12_1$ receiving a harmonic signal $U_1(t)=2 \cos \omega_x t$, where $\omega_x=2\pi f_x$, $f_x$ higher than the upper limiting frequency $f_{lim}$ in the $E_c(t)$ signal spectrum.

The voltage from delay unit 11 passed to an input of multiplier $12_2$ (Eq.(2)) is $$E_3(t-T) = E_c\left(t - \frac{z\pm 1}{2}\tau_H\right) =$$

$$E_{R-Y}(t)\cos(\omega_o t - \Delta\phi_o) + E_{B-Y}(t)\sin(\omega_o t - \Delta\phi_o).$$

Harmonic signal $U_2(t)$ driving the second input of multiplier $12_2$ is $U_2(t)=2 \cos (\omega_x t+\pi+\Delta\phi_o)$. The output voltages of multipliers $12_1$ and $12_2$, passed to adder 13 (Eqs (2) and (4)), are $$E_3(t) \cdot U_1(t) = E_c(t) \cdot 2\cos\omega_x t =$$

$$E_{R-Y}(t)[\cos(\omega_x - \omega_o)t + \cos(\omega_x + \omega_o)t] +$$

$$E_{B-Y}(t)[-\sin(\omega_x - \omega_o)t + \sin(\omega_x + \omega_o)t]$$

$$E_3(t - T) \cdot U_2(t) = E_c\left(t - \frac{z\pm 1}{2}\tau_H\right) \cdot$$

$$2\cos(\omega_x t + \pi - \Delta\phi_o) = E_{R-Y}(t)[\cos(\omega_x t - \omega_o t + \pi - 2\Delta\phi_o) -$$

$$\cos(\omega_x + \omega_o)t] - E_{B-Y}(t)[\sin(\omega_x t - \omega_o t + \pi + 2\Delta\phi_o) +$$

$$\sin(\omega_x + \omega_o)t]$$

The output voltage of adder 13 (Eq.(5)) is:

$$E_3(t) \cdot U_1(t) + E_3(t - T)U_2(t) = E_{R-Y}(t)\cos(\omega_x - \omega_o)t +$$

$$E_{R-Y}(t)\cos[(\omega_x - \omega_o)t + \pi + 2\Delta\phi_o] - E_{B-Y}(t)\cos(\omega_x - \omega_o)t -$$

$$E_{B-Y}(t)\sin[(\omega_x - \omega_o)t + \pi + 2\Delta\phi_o].$$

$$\cos[(\omega_x - \omega_o)t + \pi + 2\Delta\phi_o] =$$

$$\cos\left[(\omega_x - \omega_o)t + \pi + 2\pi(2n-1)\frac{z\pm 1}{4} \pm \frac{\pi}{2}(2m-1)\right] =$$

$$\cos\left[(\omega_x - \omega_o)t + \pi + 2\pi \cdot 2n\frac{z\pm 1}{4} -\right.$$

$$\left. 2\pi\frac{z\pm 1}{4} \pm \frac{\pi}{2}(2m-1)\right].$$

Since with interlaced scanning the number of lines is always odd (for instance, as mentioned herein above $z=625$ or $z=525$), $(z\pm 1)/2$ is always an integer and the $2\pi n(z\pm 1/2)$ term inside the brackets of the cosine term argument can be excluded as an integer number of periods.

The term $2\pi z \pm 1/4$ can be represented by the sum of two summands $2\pi z - \Delta z/4$, can $2\pi \Delta z \pm 1/4$, where $\Delta z$ is the number of lines to be subtracted from z to make $(z-\Delta z)/4$ a natural number. In this case $2\pi z - \Delta z/4$ will be an integer number of periods and $$\cos[(\omega_x - \omega_o) + \pi - 2\Delta\phi_o] =$$

$$\cos\left[(\omega_x - \omega_o)t + \pi + 2\pi\frac{\Delta z + 1}{4} \pm \frac{\pi}{2}(2m - 1)\right].$$

For specific z values, for instance $z=525$ and $z=625$ $$\frac{525 \pm 1}{4} = \frac{524 + 1 \pm 1}{4} = 131 + \frac{1 \pm 1}{4}, z = 1$$

$$\frac{625 \pm 1}{4} = \frac{624 + 1 \pm 1}{4} = 156 + \frac{1 \pm 1}{4}, z = 1.$$

Thus, $$\cos[(\omega_x - \omega_o)t + \pi - 2\Delta\phi_o)] =$$

$$\cos\left[(\omega_x - \omega_o)t + \pi - 2\pi\frac{1 \pm 1}{4} \pm \frac{\pi}{2}(2m - 1)\right].$$

At a delay $T = T_1 = (z+1/2)\tau_H$ $$\cos[(\omega_x - \omega_o)t + \pi - 2\Delta\phi_{o1}] =$$

$$\cos\left[(\omega_x - \omega_o)t + \pi - 2\pi\frac{1}{2} \pm \frac{\pi}{2}(2m - 1)\right] =$$

$$\cos\left[(\omega_x - \omega_o)t \mp \frac{\pi}{2}(2m - 1)\right].$$

At a delay $T = T_2 = (z-1/2)\tau_H \cos[(\omega_X - \omega_o)t + \pi + 2 - \Delta\phi_{o2}] = \cos[(\omega_X - \omega_o)t + \tau + \pi/2)(2m-1)]$. The voltage at adder 13 output will constitute: at a delay $T_1 = (z+1/2)\tau_H$:

$$E_{R-Y}(t)\cos\left[(\omega_x - \omega_o)t \pm \frac{\pi}{4}(2m - 1)\right]\cos\frac{\pi}{4}(2m - 1) -$$

$$E_{B-Y}(t)\sin\left[(\omega_x - \omega_o)t \pm \frac{\pi}{4}(2m - 1)\right]\cos\frac{\pi}{4}(2m - 1);$$

at a delay $T_2 = \frac{z-1}{2}\tau_H$:

$$E_{R-Y}(t)\cos\left[(\omega_x - \omega_o)t + \frac{\pi}{2} \pm\right.$$

$$\left.\frac{\pi}{4}(2m - 1)\right]\cos\left[\frac{\pi}{2} \pm \frac{\pi}{4}(2m - 1)\right] -$$

$$E_{B-Y}(t)\sin\left[(\omega_x - \omega_o)t + \frac{\pi}{2} \pm\right.$$

$$\left.\frac{\pi}{4}(2m - 1)\right]\cos\left[\frac{\pi}{2} \pm \frac{\pi}{4}(2m - 1)\right] =$$

$$\pm E_{R-Y}(t)\sin\left[(\omega_x - \omega_o)t \pm \frac{\pi}{4}(2m - 1)\right]\sin\frac{\pi}{4}(2m - 1) \pm$$

$$E_{B-Y}(t)\cos\left[(\omega_x - \omega_o)t \pm \frac{\pi}{4}(2m - 1)\right]\sin\frac{\pi}{4}(2m - 1).$$

The output signals of synchronous detectors $14_1$ and $14_2$, the second inputs whereof receive harmonic signals of the frequency $f_x-f_o=(\omega_x-107_x)/2\pi$ with an appropriate phase, are the colour-difference signals $E_{R-Y}(t)$ and $E_{B-Y}(t)$.

Chrominance signal $E_c(t)$ processing and separation of colour-difference signals $E_{R-Y}(t)$ and $E_{B-Y}(t)$ directly at the chrominance subcarrier frequency $f_o$ is executed by reflected modulated signal $E_3(t)$ processor 10, the functional diagram whereof is presented in FIG. 6.

Substitutions in Eqs. (1), (3) and (6) to (11), used to described reflected modulated signal $E_3(t)$ processing directly at the subcarrier frequency f in processor 10 (FIG. 6), are the same as used to describe signal $E_c(t)$ processing in the processor of FIG. 4 and enumerated herein above, namely:

$$E_3(t) = E_c(t); E_{1-1}(t) = E_{R-Y}(t);$$

$$E_{1-2}(t) = E_{B-Y}(t); \omega = \omega_o = 2\pi f_o;$$

$$q = \frac{z \pm 1}{2}; q_1 = \frac{z+1}{2}; q_2 = \frac{z-1}{2};$$

$$T = \frac{z \pm 1}{2}\tau_H; T_1 = \frac{z+1}{2}\tau_H; T_2 = \frac{z-1}{2}\tau_H;$$

$$q\phi_H = \Delta\phi_o; \Delta\phi_{o1} = 2\pi f_o T_1; \Delta\phi_{o2} = 2\pi f_o T_2.$$

The delayed and undelayed $E_c(t)$ messages are the same, as described herein above for the case of $E_c(t)$ processing in processor 10 (FIG. 4); in processor 10 (FIG. 6) these messages are passed to the inputs of multipliers $12_2$ and $12_4$ (delayed message, Eq. (3)) and to the inputs of delay unit 11 and multipliers $12_1$ and $12_3$ (undelayed message, Eq. (1)). Here $E_3(t)=E_c(t)=E_{R-Y}(t) \cos\omega_o t+E_{B-Y}(t) \sin \omega_o t; E_3(t-T)=E_c(t-T)=E_{R-Y}(t)\cos(\omega_o t-\Delta\phi_o)=E_{B-Y}(t)\sin(\omega_o t-\Delta\phi_o)$. Harmonic signals applied to the second inputs of multipliers $12_1$ to $12_4$ are:

to multiplier $12_1$ $U_1(t)=2 \cos \omega_o t$,
to multiplier $12_2$ $U_2(t)=2 \cos (\omega_o t+\pi+\Delta\phi_o)$,
to multiplier $12_3$ $U_3(t)=2 \sin \omega_o t$,
to multiplier $12_4$ $U_4(t)=2 \sin (\omega_o t+\pi+\Delta\phi_o)$.

The output signal of multiplier $12_1$, passed to adder 13 (Eq. (6)) is $E_3(t)U_1(t)=E_c(t)2 \cos \omega_o t=E_{R-Y}(t)+E_{R-Y}(t) \cos 2\omega+E_{B-Y}(t) \sin 2\omega_o t.$ The output signal of multiplier $12_3$, passed to adder $13_2$, (Eq. (7)) is: $E_3(t)U_3(t)=E_c(t)2 \sin \omega_o t=E_{R-Y}(t) \sin 2\omega_o t+E_{B-Y}(t)-E_{B-Y}(t) \cos 2\omega_o t.$ The output signal of multiplier $12_2$, passed to adder $13_1$, (Eq. (8)) is: $E_3(t)U_2(t)=E_c[t-(z\pm 1)\tau_H/2] 2 \cos(\omega_o t+\pi+\Delta\phi_o)=E_{R-Y}(t) \cos(\pi+2\Delta\phi_o)-E_{R-Y}(t) \cos 2\omega_o t-E_{B-Y}(t) \sin ^x(\pi+2\Delta\phi_o)-E_{B-Y}(t) \sin 2\omega_o t.$ The output signal of adder $13_1$ (Eq. 10) is: $E_{R-Y}(t)[1-\cos 2\Delta\phi_o]+E_{B-Y}(t) \sin 2\Delta\phi_o.$ The output signal of adder $13_2$ (Eq. (11)) is:

$$-E_{R-Y}(t)\sin 2\Delta\phi_o + E_{B-Y}(t)[1 - \cos 2\Delta\phi_o] \cdot$$

$$\cos 2\Delta\phi_o = \cos\left[2\pi(2n - 1)\frac{z \pm 1}{4} \pm \frac{\pi}{2}(2m - 1)\right] =$$

$$\cos\left[2\pi n\frac{z \pm 1}{2} - \pi\frac{z \pm 1}{2} \pm \frac{\pi}{2}(2m - 1)\right].$$

As mentioned herein above, with interlaced scanning z is always an odd number, so that $z\pm 1$ is always an even number and therefore $(z\pm 1)/2$ is an integer; consequently, $$\cos\left[2\pi n\frac{z \pm 1}{2} - \pi\frac{z \pm 1}{2} \pm \frac{\pi}{2}(2m - 1)\right] =$$

-continued $$\cos\left[-\pi\frac{z\pm 1}{2} \pm \frac{\pi}{2}(2m-1)\right] = 0.$$

$$\left[-\pi\frac{z\pm 1}{2} \pm \frac{\pi}{2}(2m-1)\right]$$

is always unity, with the sign "plus" or "minus" preceeding 1 depending on a number of factors, including the specific value of z, the delay $T_1=z+1/2\tau_H$ or $T_2=z-1/2\tau_H$, the sign at the term $\pi/2(2m-1)$, the value of m. In the particular cases of z=525 and z=625, at a delay.

$$T_1 = \frac{z+1}{2}\tau_H, \pi\frac{z+1}{2} = \pi\frac{525+1}{2} = 263\pi = 2\pi \cdot$$

$$131 + \pi \text{ and } \pi\frac{z+1}{2} = \pi\frac{625+1}{2} = 313\pi = 2\pi \cdot 156 + \pi.$$

In both cases (z=525 and z=625), at $T_1=(z+1/2)\tau_H$:

$$\sin\left[-\pi\frac{z+1}{2} \pm \frac{\pi}{2}(2m-1)\right] =$$

$$\sin\left[-\pi \pm \frac{\pi}{2}(2m-1)\right] = -\sin\left[\pm\frac{\pi}{2}(2m-1)\right] =$$

$$\pm\sin\frac{\pi}{2}(2m-1).$$

With z=525 and z=625, at $T_2=(z-1/2)\tau_H$:

$$\frac{524}{2} = 2\pi \cdot 131 \text{ and } \frac{624}{2} = 2\pi \cdot 156;$$

$$\sin\left[-\pi\frac{z-1}{2} \pm \frac{\pi}{2}(2m-1)\right] = \pm\sin\frac{\pi}{2}(2m-1).$$

Correspondingly, the output voltage of adder $13_1$ at a delay $T_1=(z+1/2)\tau_H$ and at z=525 and z=625 is:

$$E_{R-Y}(t) \pm E_{B-Y}(t) \sin(\pi/2)(2m-1).$$

Under the same conditions, the output signal of adder $13_2$ is:

$$\pm E_{R-Y}(t) \sin(\pi/2)(2m-1) + E_{B-Y}(t).$$

As mentioned herein above, at any integer value of m the modulus of $\sin(\pi/2)(2m-1)$ is unity, with variations of m causing only changes in the sign at the unity. At m values, corresponding to $\sin(\pi/2)(2m-1)=-1$, the output signals of adders $13_1$ and $13_2$, are respectively $E_{R-Y}(t) \pm E_{B-Y}(t)$ and $\pm E_{R-Y}(t) + E_{R-Y}(t)$. At m values corresponding to $\sin(\pi/2)(2m-1)=+1$, the output signals of adders $13_1$ and $13_2$, respectively, are $E_{R-Y}(t) \pm E_{B-Y}(t)$ and $\pm E_{R-Y}(t) + E_{B-Y}(t)$; i.e., at an $E_{R-Y}(t) - E_{B-Y}(t)$ signal at the output of adder $13_1$, the output signal of adder $13_2$ is $E_{R-Y}(t) + E_{B-Y}(t)$ and, vice versa, at an $E_{R-Y}(t) + E_{B-Y}(t)$ signal at the adder $13_1$ output the output signal of adder $13_2$ is $-E_{R-Y}(t) + E_{B-Y}(t)$.

Consequently, algebraic summing of these voltages in adders $15_1$ and $15_2$ always yields the colour-difference signals $E_{R-Y}(t)$ and $E_{B-Y}(t)$.

Here and in the following: (1) $E_y(t)$ denotes the luminance signal (as earlier) of luminance video signals; $E_{yQ}(t)$ denotes a reflected modulated luminance signals (2) (as in the preceeding description) for signals generated by quadrature reflected modulation of the luminance subcarrier frequency by two luminance video signals, $E_{yQ}(t)=E_3(t)$; (3) $E_M(t)$ is the composite colour television signal (as in the preceeding description), including luminance signals $E_y(t)$; (4) $E_{MQ}(t)$ is the composite colour television signal, including $E_{yQ}(t)$ luminance signals; (5) $E'_{MQ}(t)$ is the colour television signal $E_{MQ}(t)$ which does not include the synchronization signal $E_{sc}$ and (6); $E_{MQ1-2}(t)$ is the composite colour television signal containing information on two television pictures.

The television system with simultaneous transmission of both colour-difference signals $E_{R-Y}(t)$ and $E_{B-Y}(t)$ during the blanking intervals, may be modified so as to transmit the information of two colour television pictures by its composite colour television signal, with both television pictures transmitted in real time and in an aligned bandwidth, allocated as the rated bandwidth for transmitting a single picture of the same vertical and horizontal definition.

In the composite colour television signal $E_{MQ1-2}(t)$ of this television system, signals of the first and second pictures are transmitted alternately, on interlaced lines.

The duration of one line is used to transmit reflected modulated signals containing the information on the luminance and chrominance of two spatially adjacent lines of one picture. This is achieved by storing at the transmitting side luminance signals $E_y(t)$ and chrominance signals $E_c^*(t)$ of two fields of a frame, separately for the first and second pictures, by sequentially positioning spatially adjacent lines of each picture from its first and second fields into the record lines of this picture. This positioning provides storing in record line (2S−1) the luminance and chrominance data of the (2S−1) picture line from the first field, with the luminance and chrominance data of the (2S−1+(z+1/2)) line of the second field stored in the 2S record line, where S is a natural number.

Signals stored in record lines (2S−1) and 2S of the first picture are converted into signals of one line of the first picture. Signals stored in record lines (2S−1) and 2S of the second picture are converted into a single picture line of the second picture. Conversion of these signals of the first and second pictures is performed separately and with the use of identical techniques.

Figure 10:
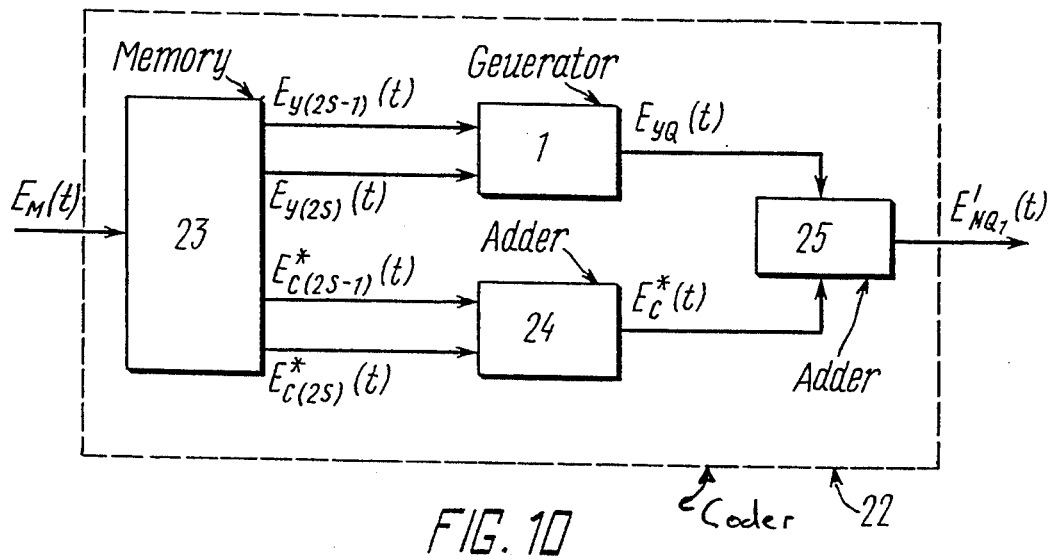
FIG. 10 shows a block diagram of the coder generating the composite colour television signal, wherein reflected modulated signals, containing information about the luminance and chrominance of two spatially adjacent lines, are transmitted during the duration of a single scan line.

Generation of picture line signals of one transmission in the $E_{MQ1-2}(t)$ composite colour television signal can be accomplished with the use of coder 22, an embodiment of the functional diagram whereof is presented in FIG. 10.

The composite colour television signal $E_M(t)$ of one picture, generated as described herein above with reference to FIG. 7, is passed to the input of memory 23 in coder 22 (FIG. 10). During storing of the luminance signals $E_y(t)$ and chrominance signals $E_c(t)$ of one frame of this picture, the signals of spatially adjacent picture lines, i.e. signals of the (2S−1) line of the first field and signals of the (2S−1+(z+1/2)) line of the second field of the picture being handled, are entered into record lines (2S−1) and 2S of memory 23.

Time-compressed chrominance signals $E_c^*_{(2S-1)}(t)$ and $E_c^*_{(2S)}(t)$ are read out simultaneously from record lines (2S−1) and 2S, respectively, of memory 23 and algebraically summed in adder 24 of coder 22, thus generating a common for record lines (2S−1) and 2S of this picture time-compressed chrominance signal $E_c^*(t)$ with a subcarrier frequency retained at its previous value $f_o$. The phase shift of the unmodulated chrominance subcarrier between transmission lines, generated from record lines (2S−1) and 2S and generated from record lines (2S+1) and (2S+2) of the same picture, constitutes approximately $\phi_{oH}=(\pi/4)(2n-1)$.

Luminance signals $E_{y(2S-1)}(t)$ and $E_{y(2S)}(t)$, read out simultaneously from record lines (2S−1) and 2S of memory 23, are used to modulate the luminance subcarrier frequency $f_y$ and thus generate a reflected modulated luminance signal $E_{yQ}(t)$, which constitutes the reflected modulated signal $E_3(t)$.

The luminance subcarrier frequency $f_y$ is selected to be an odd harmonic of a quarter of the horizontal frequency $f_H$, i.e. $f_y=(2d-1/4) f_H$. In the generated reflected modulated luminance signal $E_{yQ}(t)$ the phase shift of the subcarrier between identically numbered lines of adjacent frames will constitute $\phi_{yp}=+(\pi/2)(2d+1)$ where d is a natural number.

The reflected modulated luminance signal $E_{yQ}(t)$ from the output of coder 1 is passed to an input of adder 25, the other input whereof receives the time-compressed chrominance signal $E_c^*(t)$, so that at the output thereof a color television signal $E_{MQ1}'(t)$ is generated, representing the transmission line signal of one picture without the synchronization signal $E_{sc}$ and containing the luminance and chrominance data stored in record lines (2S−1) and 2S of the first picture, transmitted in the (2S−1) line of the composite colour television signal $E_{MQ1-2}(t)$. The colour television signal $E_{MQ2}'$ containing the luminance and chrominance data stored in record lines (2S−1) and 2S of the second is transmitted in picture line 2S of the composite colour television signal $E_{MQ1-2}(t)$, i.e. signals $E_{MQ1}'(t)$ and $E_{MQ2}'(t)$ are transmitted on alternate lines.

Chrominance signals of the first and second pictures are transmitted during the corresponding blanking intervals and the reflected modulated luminance signals of the first and second pictures are transmitted without any time-scaling in the active lines of the composite colour television signal $E_{MQ1-2}(t)$. Identically numbered lines of adjacent frames carry signals of one and the same of the two pictures.

Figure 11:
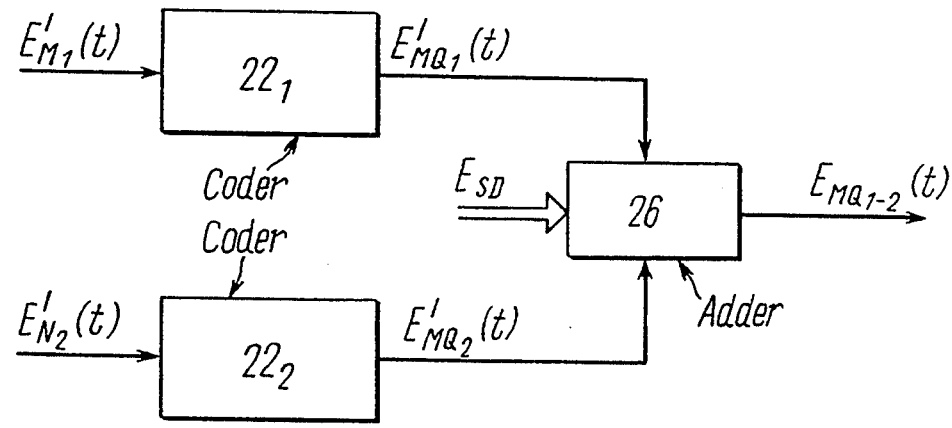
FIG. 11 shows a block diagram of the coder generating the composite colour television signal containing signals of transmission lines of the first and second pictures.

The composite colour television signal $E_{MQ1-2}(t)$ containing transmission line signal of the first and second pictures is generated by a coder, the embodiment of a functional diagram whereof is shown in FIG. 11. Here, the signals $E_{MQ1}'(t)$ and $E_{MQ2}'(t)$, from coders $22_1$ and $22_2$, designed like coder 22, described herein above with reference to FIG. 10, are summed in adder 26 (FIG. 11), which also receives synchronization signals $E_{sc}$ and additional data signals for mixing into composite colour television signal $E_{MQ1-2}(t)$.

Figure 12:
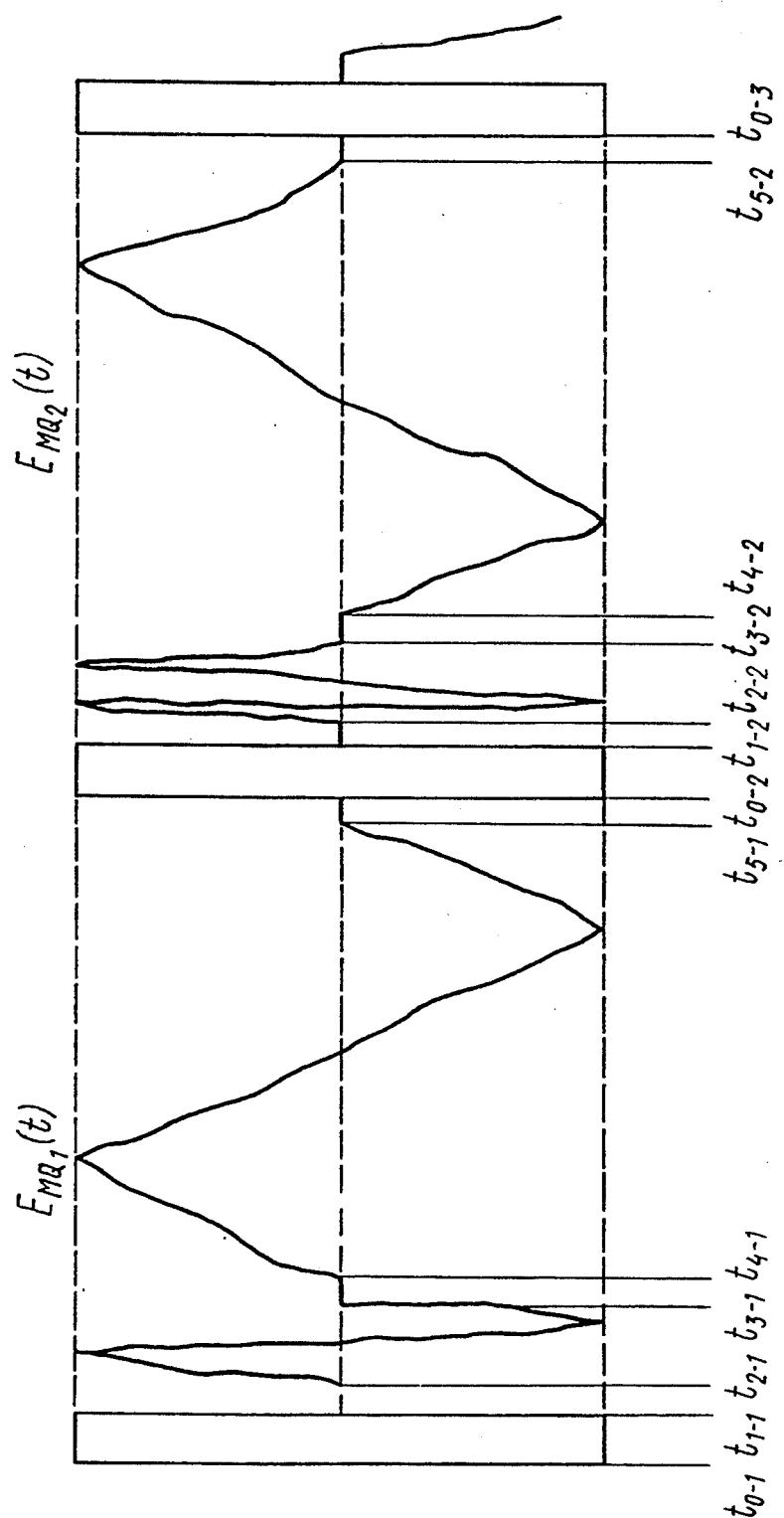
FIG. 12 shows the approximate pattern of two scan lines of the composite television signal containing information about two colour pictures.

The pattern of two cosecutive lines of the composite colour television signal $E_{MQ1-2}(t)$ is illustrated in FIG. 12.

With a picture line duration from $t_{o-1}$ to $t_{o-2}$ for the first picture and from $t_{o-2}$ to $t_{o-3}$ for the second picture (these line duration being equal), the synchronization signals are transmitted in the $t_{o-1}$ to $1_{-1}$ and the $t_{o-2}$ to $t_{1-2}$ intervals, the chrominance signals $E_c^*(t)$ are transmitted in the $t_{2-1}$ to $t_{3-1}$ and in the $t_{2-2}$ to $t_{3-2}$ intervals, the reflected modulated luminance signals $E_{yQ}(t)$ are transmitted in the $t_{4-1}$ to $t_{5-1}$ and in the $t_{4-2}$ to $t_{5-2}$ interval; the $t_{1-1}$ to $t_{2-1}$, $t_{1-2}$ to $t_{2-2}$, $t_{3-1}$ to $t_{4-1}$, $t_{3-2}$ to $t_{4-2}$, $t_{5-1}$ to $o_{-2}$, $t_{5-2}$ to $t_{o-3}$ intervals are guard gaps.

Figure 13:
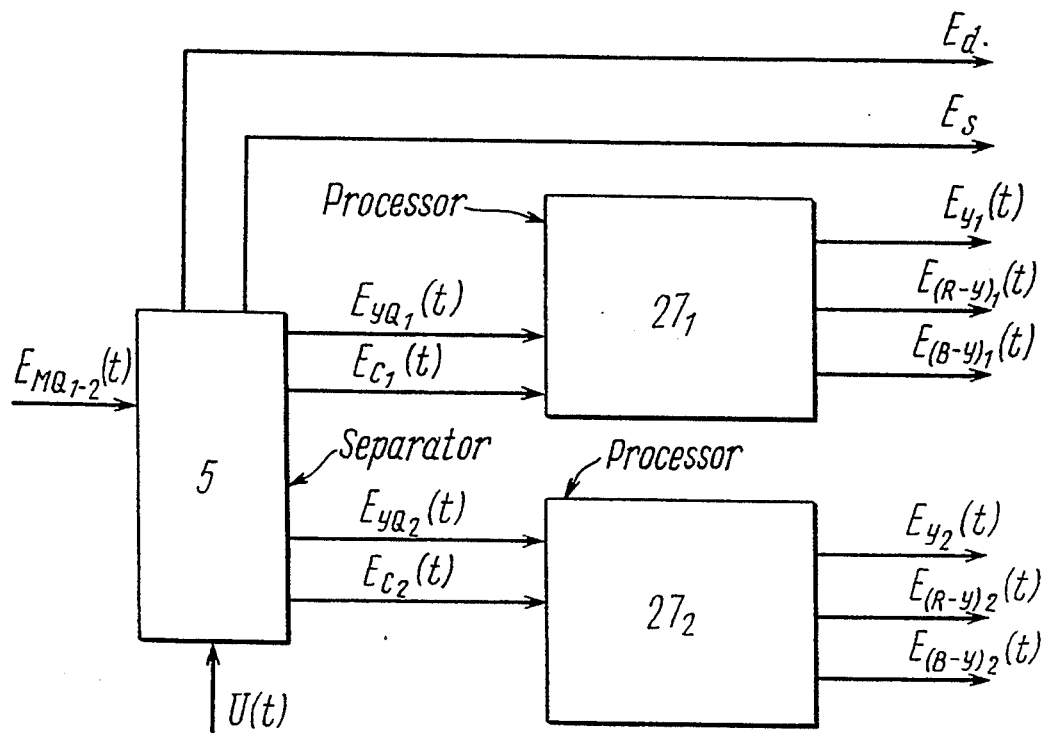
FIG. 13 shows a block diagram of the processor of composite colour television signals carrying information about two colour pictures.

At the receiving side the chrominance signals $E_c^*(t)$ and the reflected modulated luminance signals $E_{yQ}(t)$ of the first and second pictures are separated out of the composite colour television signal $E_{MQ1-2}(t)$. These signals are processed by like techniques in processors $27_1$ and $27_2$. An embodiment of the functional diagram for processing the composite colour television signal $E_{MQ1-2}$ is shown in FIG. 13.

Separation of composite colour television signals of the first picture from the second and separation of the chrominance signal $E_c^*(t)$ and reflected modulated luminance signal $E_{yQ}(t)$ from each composite colour television signal is achieved with the aid of signal separator 5, also providing separation of synchronization and additional data signals, $E_s$ and $E_d$.

Figure 14:
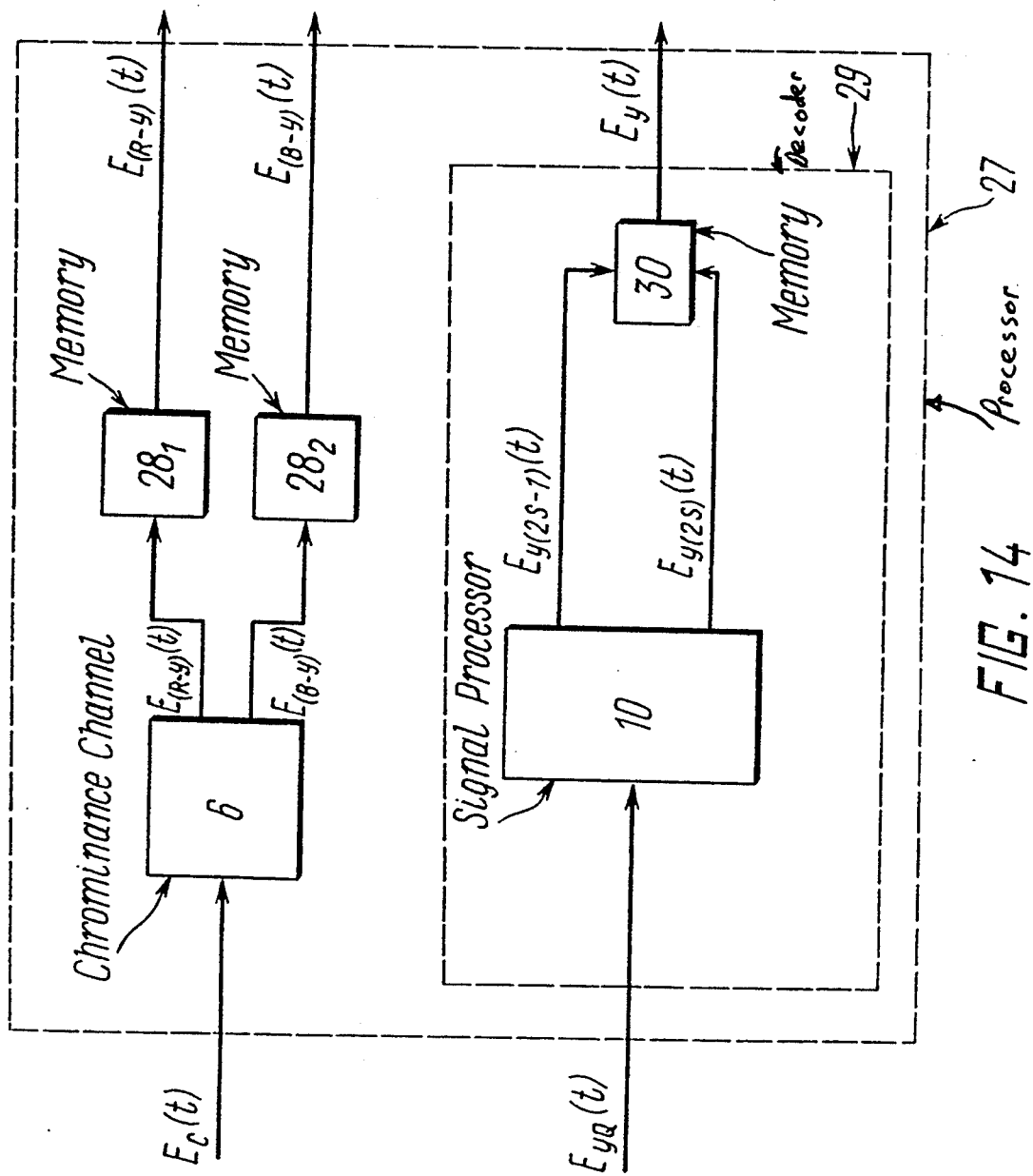
FIG. 14 shows a block diagram of a decoder processing reflected modulated luminance signals and chrominance signals, separated out of the composite colour television signal carrying information about two colour pictures.

Decoders $27_1$ and $27_2$, providing processing of the signals of the first and second pictures, generate at their outputs, respectively, the luminance signal $E_{y1}(t)$ and colour-difference signals $E_{(B-Y)1}(t)$ and $E_{(R-Y)1}(t)$ the first picture and the luminance signal $E_{y2}(t)$ and colour-difference signals $E_{(B-Y)2}(t)$ and $E_{(R-Y)2}(t)$ of the second picture. Because of the similarity of these processes, FIG. 14 shows an embodiment of the functional diagram of processing one of these picture signals by processor 27.

Figure 9:
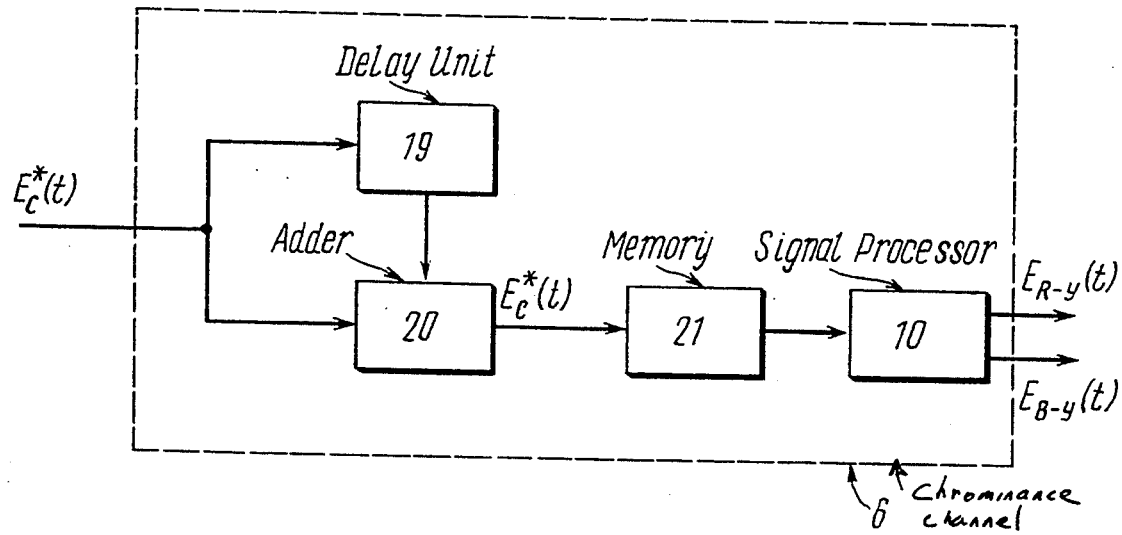
FIG. 9 shows a block diagram of the channel for chrominance signal processing in the television system of this invention.

Transmission light chrominance, separated out of the composite colour television signal, are passed from the output of separator 5 (FIG. 13) to the input of chrominance signal processing channel 6, described herein above with reference to FIG. 9. The phase difference $\Delta\phi_o$ between harmonic signals, by which the delayed and undelayed chrominance signal $E_c^*(t)$ messages are multiplied in processor 10 in chrominance signal processing channel 6, is selected equal to $\tau+\Delta\phi_o=\tau/2(2n+1)$.

The colour-difference signals $E_{R-Y}(t)$ and $E_{B-Y}(t)$, generated at the outputs of channel 6, are used to reproduce the chrominance data stored in record lines (2S-1) and 2S of the given picture, and are entered into memories $28_1$ and $28_2$ (FIG. 14), respectively.

Colour-difference $E_{R-Y}(t)$ signal readout from record line (2S-1) is performed in the first field during reproduction of picture line (2S-1).

Readout of the $E_{R-Y}$ colour-difference signal from record line 2S is performed after a time interval of $T_1=(+1/2) \tau_H$ during reproduction of the $(2S-1+(z+1/2)$ picture line in the second field.

Writing and readout of the colour-difference signal $E_{B-Y}(t)$ into and from the respective (2S−1) and 2S lines of memory $28_2$ are identical to that described herein above.

Processing of the reflected modulated luminance signal $E_{yQ}(t)$, separated out of the transmission lines of the composite colour television signal by separator 5 (FIG. 13), is accomplished by means of processor (decoder) 29 (FIG. 14).

The reflected modulated luminance signal $E_{yQ}(t)$ of one picture is passed to the input of processor 10 of reflected modulated signals of the form of $E_3(t)$, described herein above with reference to FIGS. 4 and 5. Further processing of the reflected modulated luminance signal $E_{yQ}(t)$ may be carried out both with signal translation to a high carrier frequency, as in FIG. 4, and directly at the luminance subcarrier frequency $f_y$. Reflected modulated luminance signals $E_{yQ}(t)$ are delayed by a frame duration, $\tau_p = z\tau_H$, where $\tau_H$ is the line duration, $\tau_H = 1/f_H$.

In processor 10 (FIG. 4) the undelayed $E_{yQ}(t)$ signal message is applied to the inputs of delay unit 11 and multiplier $12_1$. In multiplier $12_1$ the $E_{yQ}(t)$ signal is multiplied by a harmonic signal $U_1 = 2 \cos \omega_{xy}(t)$, where $\omega_{xy} = 2\pi f_{xy}$, $f_{xy}$ is the harmonic signal frequency and is higher than the upper limiting frequency $f_{max}$ in the spectrum of the reflected modulated luminance signal $E_{yQ}(t)$.

The delayed $E_{yQ}(t - \tau_p)$ signal is multiplied in multiplier $12_2$ by a harmonic signal $U_2(t) = 2 \cos [\omega_{xy}t + (\pi/2)(2n-)]$.

The output voltages of multipliers $12_1$ and $12_2$ are passed to adder 13, thus producing a signal with unfolded sidebands at a carrier frequency $f_{xy} \pm f_y$ higher than upper limiting frequency $f_{max}$ in the spectrum of the luminance signal $E_{yQ}(t)$.

After detection of this signal in synchronous detectors $14_1$ and $14_2$, $E_y(2S-1)(t)$ luminance signal of the $(2S-1)$ line of the first field and the $E_{y(2S)}(t)$ luminance signal of the $(2S-1+(z+1/2))$ line of the second field of the same picture are picked off the outputs of synchronous detectors $14_1$ and $14_2$.

Reflected modulated luminance signal $E_{yQ}(t)$ may be processed directly at the luminance subcarrier frequency $f_y$ by means of processor 10 (FIG. 5) as follows. The undelayed signal $E_{yQ}(t)$ is multiplied by a harmonic signal $U_1(t) = 2 \cos \omega_y t$ in multiplier $12_1$, the delayed signal is multiplied by a harmonic signal $U_2(t) = 2 \sin [\omega_y t + (\pi/2)(2d+1)]$ in multiplier $12_2$, and the products of these multiplications are passed to adder $13_1$ for algebraic summing.

The algebraic sum thus obtained at the output of adder $13_1$ is the $E_{y(2S-1)}(t)$ luminance signal of the $(2S-1)$ picture line of the first field.

The undelayed signal $E_{yQ}(t)$ is also applied to multiplier $12_3$ for multiplication by a harmonic signal $U_3(t) = 2 \sin \omega_y t$ and the delayed signal is passed to multiplier $12_4$ for multiplication by a harmonic signal $U_4(t) = 2 \sin [\omega_y t + (\pi/2)(2d+1)]$. Algebraic summing of the products in adder $13_2$ directly yields the $E_{y(2S)}(t)$ luminance signal of the $(2S-1+(z+1/2))$ line of the second field.

The luminance signals $E_{y(2S-1)}(t)$ and $E_{y(2S)}(t)$ are entered into record lines $(2S-1)$ and $2S$ in memory 30 (FIG. 14).

Signal $E_y(t)$ readout from record line $(2S-1)$ is performed during reproduction of the $(2S-1)$ picture line in the first field and readout of the $E_y(t)$ luminance signal from record line $2S$ is performed with a delay of $T_1 = (z+1/2)\tau_H$ during reproduction of the $(2S-1+(z+1/2))$ picture line in the second field.

Thus, the interlaced scanning signals are restored at the output of decoder 27 of single picture signals.

The herein above described processing of the composite colour television signal $E_{MQ1-2}(t)$ of two pictures is applicable to reproduction of stereo colour pictures, and also to transmissions of two independent programs with subsequent transcoding at the receiving side to signals of standard or other television systems.

Transmission of two independent programs may require their separation at an intermediate station, with each program thereafter transmitted by a composite colour television signal $E_M(t)$ (FIG. 8) of the television system of this invention.

In this case processing of the composite colour television signal $E_{MQ1-2}(t)$ and separation of the reflected modulated luminance signal $E_{yQ}(t)$ is performed at the intermediate station, without decoding the chrominance signals $E_c^*(t)$, which is executed at the receiving side, for instance directly in television sets, identically to the herein above described with reference to FIG. 9.

At the intermediate station chrominance signals $E_c^*(t)$ of the first and second pictures are separated out of the line signals of the corresponding picture in the composite colour television signal $E_{MQ1-2}(t)$. The chrominance signals $E_c^*(t)$, separated in the processing channel of each picture are repeated by delaying by an interval of $T_1 = (z+1/2)\tau_H$. The undelayed message is allocated to the horizontal blanking interval in the restored luminance signal $E_{y(2S-1)}(t)$ of the $(2S-1)$ picture line of the given picture, whereas the delayed $E_c^*(t)$ chrominance signal message is allocated to the horizontal blanking interval of the restored luminance signal $E_{y(2S)}(t)$ of the $(2S-1+(z+1/2))$ picture line of the same picture.

Figure 15:
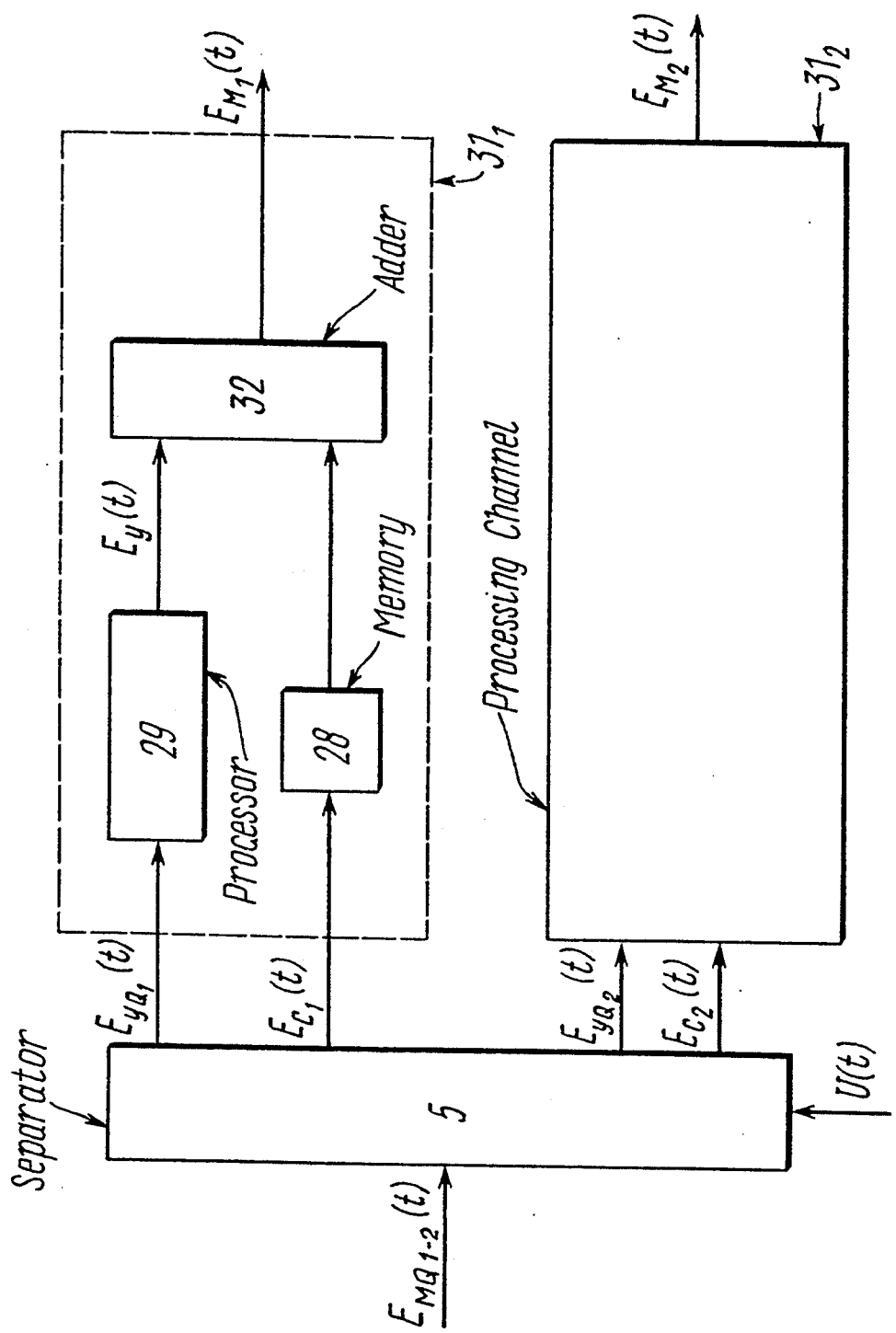
FIG. 15 shows a block diagram for generating composite colour television signals of the first and second program at an intermediate receiving station from the composite colour television signal containing information about two colour pictures.

Generation of two programs of composite colour television signals $E_{M1}(t)$ and $E_{M2}(t)$ from the composite colour television signal $E_{MQ1-2}(t)$ may be accomplished with a design configuration, an embodiment of the functional diagram whereof is shown in FIG. 15.

Reflected modulated luminance signals $E_{yQ}(t)$ and chrominance signals $E_c^*(t)$ of each picture, separated out of the received $E_{MQ1-2}(t)$ signal by separator 5, are passed to their respective processing channels $31_1$ and $31_2$, wherein they are identically processed, so that only channel $31_1$ need be described herein.

Reflected modulated luminance signals $E_{yQ}(t)$ are processed in decoder 29, as described herein above with reference to FIG. 14.

Chrominance signals $E_c^*(t)$ are simultaneously written into memory 28 (FIG. 15) record lines $(2S-1)$ and $2S$. The chrominance signal $E_c^*(t)$ read out from record line $(2S-1)$ is allocated to the horizontal blanking interval of the $(2S-1)$ line of the luminance signal $E_y(t)$ in adder 32.

The chrominance signal $E_c^*(t)$ readout from the $2S$ record line is delayed by $T_1 = (z+1/2) \tau_H$ to allocate this signal to the horizontal blanking interval of the $(2S-1+(z+1/2))$ line of the $E_y(t)$ luminance signal by means of adder 32.

Colour television signals $E_{M1}(t)$ and $E_{M2}(t)$ of the interlaced scanned pictures of the first and second programs, respectively, are generated at the outputs of processing channels $31_1$ and $31_2$.

Herein below embodiments of single picture signals generation at the transmitting side and signal processing at the receiving side are described.

The chrominance signal $E_c^*(2S-1)(t)$ of one picture in the line $(2S-1)$ of the first field is: $E^*_{R-Y}(t) \cos k \omega_o [t+(2S-1) \tau_H] + E_{B-Y}^*(t) \sin k \omega_o [t+(2S-1)\tau_H]$, where k is the time compression factor of the $E_c^*(t)$ chrominance signal and $\omega_o = 2\pi f_o$. This signal is written into the corresponding record line of memory 23 (FIG. 10).

The $E_c^*(2S-1)(t+(z+1/2)\tau_H)$ chrominance signal of the same picture is entered into record line $2S$ of memory 23 and corresponds to the $(2S-1+(z+1/2))$ picture line of the second field:

$E_{R-Y}^*(t) \cos k \omega_o[t+(2S-1+(z+1/2))\tau_H] + E_{B-Y}(t) \sin k \omega_o[t+(2S-1+(z+1/2))\tau_H]$.

Summing these voltages in adder 24 provides a phase of the unmodulated chrominance subcarrier in the summed chrominance signal $E_c^*(t)$ equal to k $\omega_o$ $(2S-1+(z+1/2))$ $\tau_H$. Summing of the chrominance signal $E_c^*{}_{(2S)}(t)$ of picture line 2S of the first field of this same picture and the chrominance signal $E_c^*{}_{(2S)}(t+(z+1/2)\tau_H)$ of the $(2S+(z+1/2))$ line of the second field in adder 24 produces a signal $E_c(t+2\tau_H)$ with an unmodulated subcarrier phase of k $\omega_o(2S+(z+1/2))$ $\tau_H$, because these signals were entered into memory 23, respectively, into record lines $(2S-1)$ and $(2S+1)$, and into record lines $(2S)$ and $(2S+2)$ with an interval of $\tau_H$ in the first field, and with a delay of $\tau_H$ in the second field, and are readout from memory 23 with a delay of 2 $\tau_H$. The phase shift of the unmodulated subcarrier of one and the same picture during a 2 $\tau_H$ interval between signals $E_c^*(t)$ and $E_c^*(t+2\tau_H)$ is k $\omega_o \tau_H =$ k $\phi_{oH}$. This phase shift is transformed to $\Delta\phi_o=\phi_{oH}=2\pi f_o \tau_H$ or about $(\pi/2)(2n-1)$ after time stretching by a factor of 1/k at the receiving side. Processing of $E_c(t)$ chrominance signal with such a phase shift between the delayed and undelayed signal messages in reflected modulated signal processors 10 handling $E_3(t)$ signals (FIGS. 4 and 5) is treated in detail in the description of a television system with simultaneous transmission of colour-difference signals during the blanking interval. The only difference is in that signal $E_c(t)$ is delayed by 2 $\tau_H$ in delay unit 11 of processor 10, as demonstrated herein above.

Since the phase shift is a relative magnitude, $\omega_o(2S-1+(z+1/4))$ $\tau_H = 0$ (reference phase), so that $\omega_o(2S+(z+1/4))$ $\tau_H = \phi_{oH} = (\pi/2)(2n-1)$.

The results will remain unchanged, if $\omega_o(2S-1+=(z+1/4))\tau_H=\phi_{oH1}$ is introduced in Eqs. (1) and (2), at the same time introducing $\phi_{oH1}$ into equations for $U_1(t)$ and $U_2(t)$ in the description of processor 10 of FIG. 4 and into equations for $U_1(t)$, $U_2(t)$, $U_3(t)$, $U_4(t)$ in the description of processor 10 functioning with reference to FIG. 5. In this case the phase of the subcarrier in the delayed $E_c(t)$ signal message, $\omega_o(2S+(z+1/2))\tau_H$, should be denoted as $\phi_{oH1}+\phi_{oH}=\phi_{oH1}+(\pi/2)(2n-1)$.

Processing of reflected modulated luminance signals $E_{yQ}(t)$ in channel 7 (FIG. 3) is also achieved by means of processor 10 of $E_3(t)$ reflected modulated signals, embodiments of the functional diagram whereof are presented in FIGS. 4 and 5.

Generation of the reflected modulated luminance signal $E_{yQ}(t)$ of one of the pictures involves modulation of the luminance subcarrier frequency $f_y$ by signals read out from record lines $(2S-1)$ and $2S$ of memory 23 (FIG. 10) luminance signal $E_{y(2S-1)}$ of the $(2S-1)$ picture line of the first field and luminance signal $E_{y(2S)}(t)$ of the $(2S-1+(z+1/2))$ picture line of the second field, so that:

$$E_{yQ}(t) = E_{y(2S-1)}(t) \cos\omega_y t + E_{y(2S)}(t)\sin\omega_y t,$$

where $$\omega_x = 2\pi f_y.$$

Since the luminance subcarrier frequency $f_y$ is equal to $(2d-1/4)f_H$, the phase difference $\phi_{yp}$ of the unmodulated luminance subcarrier in identically numbered lines of adjacent frames is:

$$\phi_{yp}=2\pi f_y z\tau_H=2\pi(2d-1/4)z=2\pi(2d-1)(z/4).$$

In each four picture lines, therefore, the phase shift of the unmodulated luminance subcarrier is equal to $2\pi(2d-1)$, i.e. an integer of periods, so that the equation for $\phi_{yp}$ may be written as:

$$\phi_{yp} = 2\pi(2d-1)\frac{z-\Delta z + \Delta z}{4} =$$

$$2\pi(2d-1)\frac{z-\Delta z}{4} + 2\pi(2d-1)\frac{\Delta z}{4},$$

where $\Delta z$ is the minimum number of lines to be algebraically subtracted from the number of frame lines z to obtain a natural $(z-\Delta z/4)$ number. Then $$\cos\left[\omega_y t + 2\pi(2d-1)\frac{z-\Delta z}{4} + 2\pi(2d-1)\frac{\Delta z}{4}\right] =$$

$$\cos\left[\omega_y t + \frac{\pi}{2}(2d-1)\Delta z\right].$$

With interlaced scanning z is always an odd number, whereas $z-\Delta z$, a quarter whereof is an integer, is always an even number and consequently, $\Delta z$ is always odd, and it can be shown that for any odd $z>1$, the value of $\Delta z$ will always constitute either $+1$ or $-1$. In this case $\cos(\omega_y t + \phi_{yp})=\cos[\omega_y t \pm (\pi/2)(2d-1)]$. Eqs. (1) to (5) may be used to describe reflected modulated luminance signal $E_{yQ}(t)$ processing in processor 10 (FIG. 4), introducing thereto the following substitutions:

$$E_3(t) = E_{yQ}(t); E_{1-1}(t) = E_{y(2S-1)}(t); E_{1-2}(t) = E_{y(2S)}(t);$$

$$\omega = \omega_y = 2\pi f_y; q = z; q\phi_H = \pm\frac{\pi}{2}(2d-1); T = z\tau_H.$$

Thus, the signal arriving at the input of delay unit 11 and one of the inputs of multiplier $12_1$ (Eq.(1)), will be: $E_3(t)=E_{yQ}(t)=E_{y(2S-1)}(t) \cos \omega_y t + E_{y(2S)}(t)$, sin $\omega_y$. The harmonic signal arriving at the second input of multiplier $12_1$ will be $U_1(t)=2 \cos \omega_{xy}t$, where $\omega_{xy}=2\pi f_{xy}$ and $f_{xy}$ is higher than the upper limiting frequency $f_{max}$ in the reflected modulated luminance signal $E_{yQ}(t)$ spectrum.

The voltage arriving from the output of delay unit 11 at one of the inputs of multiplier $12_2$ (Eq.(2)) is:

$$E_3(t-T) = E_{yQ}(t-z\tau_H) =$$

$$E_{y(2S-1)}(t)\cos\left[\omega_y t + \frac{\pi}{2}(2d-1)\right] +$$

$$E_{y(2S)}(t)\sin\left[\omega_y t + \frac{\pi}{2}(2d-1)\right].$$

The second input of multiplier $12_2$ receives a harmonic signal $U_2(t)=2 \cos[\omega_{xy}t+\pi\pm(\pi/2)(2d-1)]$. The output signal voltages from multipliers $12_1$ and $12_2$, passed to adder 13, (Eqs. (2) and (4)), are:

$$E_3(t) \cdot U_1(t) = E_{yQ}(t) \cdot 2\cos\omega_{xy}t = E_{y(2S-1)}(t) [\cos(\omega_{xy} - \omega_y)t +$$

$$\cos(\omega_{xy} + \omega_y)t] + E_{y(2S)}(t)[-\sin(\omega_{xy} - \omega_y)t + \sin(\omega_{xy} + \omega_y)t]$$

and $$E_3(t-T) \cdot U_2(t) = E_{yQ}(t-z\tau_H) \cdot$$

$$2\cos\left[\omega_{xy}t + \pi - \frac{\pi}{2}(2d-1)\right] = E_{y(2S-1)}(t)\left[\cos\left(\omega_{xy}t - \omega_y t + \pi \mp 2\pi\frac{2d-1}{2}\right) - \cos(\omega_{xy} + \omega_y)t\right] -$$

$$E_{y(2S)}(t)\left[\sin\left(\omega_{xy}t - \omega_y t + \pi \mp 2\pi\frac{2d-1}{2}\right) + \sin(\omega_{xy} + \omega_y)t\right] = E_{y(2S-1)}(t)[\cos(\omega_{xy} - \omega_y)t - \cos(\omega_{xy} + \omega_y)t] - E_{y(2S)}(t)[\sin(\omega_{xy} - \omega_y)t + \sin(\omega_{xy} + \omega_y)t],$$

because $\pi + 2\pi(2d-1/2) = 2\pi d$ and $\pi - 2\pi(2d-1/2) = -2\pi(d-2)$. The output signal of adder 13 (Eq.(5)) is:

$$E_3(t)U_1(t) + E_3(t - T)U_2(t) = 2E_{y(2S-1)}(t)\cos(\omega_{xy} - \omega_y)t) - 2E_{y(2S)}(t)\sin(\omega_{xy} - \omega_y)t,$$

where $\omega_{xy} - \omega_y = 2\pi(f_{xy} - f_y)$, $f_{xy} - f_y > f_{max}$. Synchronous detectors $14_1$ and $14_2$ receive harmonic signals $U_{x1}(t) = \cos(\omega_{xy} - \omega_y)t$ and $U_{x2}(t) = -\sin(\omega_{xy} - \omega_y)t$, respectively, and therefore generate at their outputs luminance signals $E_{y(2S-1)}(t)$ of the (2S-1) picture line of the first field and $E_{y(2S)}(t)$ of the $(2S-1+(z+1/2))$ picture line of the second field, of one of the pictures.

The reflected modulated luminance signal $E_{yQ}(t)$ can be processed directly at the luminance subcarrier frequency $f_y$ in processor 10, the functional diagram whereof is presented in FIG. 5. This process is describes by Eqs (1) and (3) and (6) to (9), with the following substitutions thereto:

$$E_3(t) = E_{yQ}(t); E_{1-1}(t) = E_{y(2S-1)}(t); E_{1-2}(t) = E_{y(2S)}(t);$$

$$\omega = \omega_y = 2\pi f_y; q = z; q\phi_H = \pm\frac{\pi}{2}(2d-1); T = z\tau_H.$$

The undelayed signal message arriving at the inputs of delay unit 11 and multipliers $12_1$ and $12_3$ (Eq. (1)) is $E_3(t) = E_{yQ}(t) = E_{y(2S-1)}(t)\cos\omega_y t + E_{y(2S)}(t)\sin\omega_y t$. Harmonic signals received by the other inputs of multipliers $12_1$ and $12_3$ are, respectively, $U_1(t) = 2\cos\omega_y t$ and $U_3(t) = 2\sin\omega_y t$. The inputs of multipliers $12_2$ and $12_4$ are driven by the output signal of delay unit 11 (Eq.(3)).

$$E_3(t - T) = E_{yQ}(t - z\tau_H) = E_{y(2S-1)}(t)\cos\left[\omega_y t \pm \frac{\pi}{2}(2d-1)\right] + E_{y(2S)}(t)\sin\left[\omega_y t \pm \frac{\pi}{2}(2d-1)\right].$$

Harmonic signals $U_2(t)$ and $U_4(t)$ driving the second inputs of multipliers $12_2$ and $12_4$, respectively, are $$U_2(t) = 2\cos\left[\omega_y t + \pi \pm \frac{\pi}{2}(2d-1)\right]$$

and $$U_4(t) = 2\sin\left[\omega_y t + \pi \mp \frac{\pi}{2}(2d-1)\right].$$

Therefore, signals arriving at adder $13_1$ from the outputs of multipliers $12_1$ and $12_2$ (Eqs. (6) and (8)), constitute:

$$E_3(t) \cdot U_1(t) = E_{yQ} \cdot 2\cos\omega_y t = E_{y(2S-1)}(t) + E_{y(2S)}(t)\cos2\omega_y t + E_{y(2S)}(t)\sin2\omega_y t,$$

$$E_3(t - T) \cdot U_3(t) = E_{yQ}(t - z\tau_H) \cdot 2\cos\left[\omega_y t + \pi \mp \frac{\pi}{2}(2d-1)\right] = $$

$$E_{y(2S-1)}(t)\cos[\pi \mp \pi(2d-1)] - E_{y(2S-1)}(t)\cos2\omega_y t + E_{y(2S)}(t)\sin[\pi \mp \pi(2d-1)] - E_{y(2S)}(t)\sin2\omega_y t =$$

$$E_{y(2S-1)}(t) - E_{y(2S-1)}(t)\cos2\omega_y t - E_{y(2S)}(t)\sin2\omega_y t,$$

since $\cos[\pi \pm \pi(2d-1)] = 1$ and $\sin[\pi \pm \pi(2d-1)] = 0$. Thus, the $E_{y(2S-1)}(t)$ luminance signal of the (2S-1) picture line of the first field is generated at the output of adder $13_1$.

Signal voltages applied to adder $13_2$ from the outputs of multipliers $12_2$ and $12_4$ (Eqs (7) and (9)), are:

$$E_3(t)U_3(t) = E_{yQ}(t)2\sin\omega_y t = E_{y(2S-1)}(t)\sin2\omega_y t + E_{y(2S)}(t) - E_{y(2S)}(t)\cos2\omega_y t$$

and $$E_3(t)U_4(t) = E_{yQ}(t - z\tau_H)2\sin\left[\omega_y t + \pi \mp \frac{\pi}{2}(2d-1)\right] = $$

$$E_{y(2S-1)}(t)\sin\omega_y t + E_{y(2S)}(t) + E_{y(2S)}(t)\cos2\omega_y t.$$

Thus, the luminance signal $E_{y(2S)}(t)$ of the (2S-1+(z+1/2)) picture line of the second field is picked off the output of adder $13_2$.

Here and in the following the composite colour television signal shall be denoted by $E_{MQexp}(t)$.

The television system, according to this invention (with simultaneous transmission of colour-difference signals during blanking intervals), may be modified to transmit, in its composite colour television signal, a television picture (with a specific horizontal and vertical definition and a specific frame repetition frequency) in half the bandwidth required to transmit equivalent television pictures by means of other techniques.

In this television system, during two frames the composite colour television signal $E_{MQexp}(t)$ transmits time-stretched reflected modulated signals containing information about the luminance and chrominance of two spatially adjacent picture lines. To this end reflected modulated luminance signals $E_{yQ}(t)$ and time-compressed chrominance signals by a factor of two and one transmission line (with a 2 $\tau_H$ duration) of the composite color television signals is generated from the simultaneously transmitted (with a 2 $\tau_H$ duration) from the simultaneously transmitted spatially adjacent lines.

Thus, information about the luminance and chrominance of one line of the initial picture is transmitted approximately during the duration of two lines, transmission of the same data about two lines taking the same time interval. Spatially adjacent lines are combined into pairs, for instance the first and second lines, the third and fourth lines, the fifth and sixth lines, and so on. Consequently, the number of picture lines is reduced twofold as compared to the number of lines in the initial composite colour television signal $E_M(t)$, while the frame duration is retained. Therefore, despite a twice narrower bandwidth of the composite colour television signal $E_{MQexp}(t)$, achieved by increasing the time to transmit the signal of each picture line, and by simultaneous transmission of the signals of two picture lines, during 2 $\tau_H$, the number of independent pixels, for instance luminance pixels, in each frame and per second remains the same as in the initial composite colour television signal $E_M(t)$ of this picture.

Figure 16:
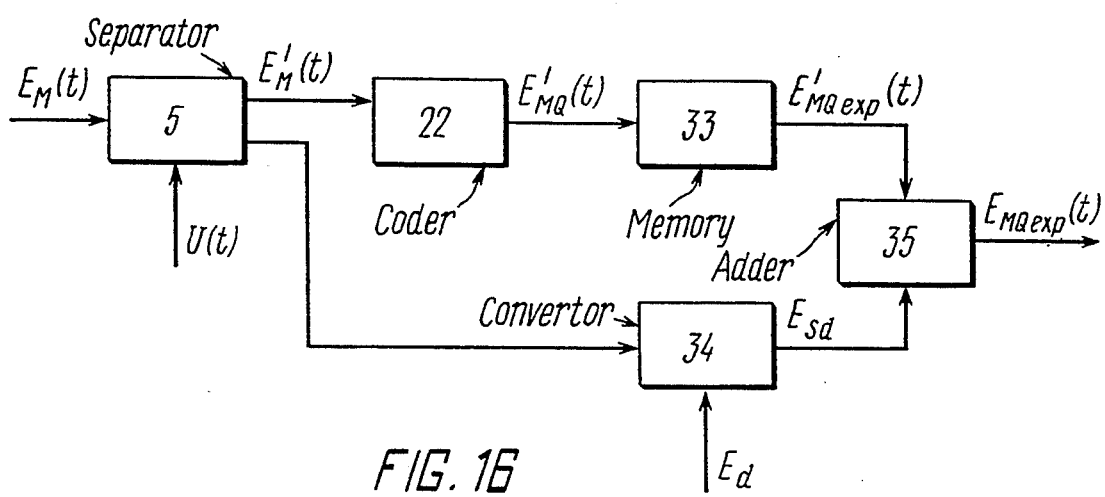
FIG. 16 shows a block diagram for generating a composite colour television signal in the television system of this invention, providing picture transmission in a reduced bandwidth.

At the transmitting side the composite colour television signal $E_{MQexp}(t)$ may be generated in an example of the design configuration, the functional diagram whereof is shown in FIG. 16.

The colour television signal $E_M'(t)$ from separator 5 is passed to coder 22, the process of generating the $E'_{MQ}(t)$ signal wherein is identical to that described herein above with reference to FIG. 10.

Luminance signals $E_y(t)$ and chrominance signals $E_c^*(t)$ of two fields of a frame are entered into memory 23 (FIG. 10) and the signals of spatially adjacent picture lines of the first and second field are sequentially written into the record lines so that record line (2S−1) contains information on the luminance and chrominance of the (2S−1) picture line of the first field and the 2S record line contains information about the luminance and chrominance of the (2S−1+(z+1/2)) picture line of the second field. Chrominance signals $E_c^*{}_{(2S-1)}(t)$ and $E_c^*{}_{(2S)}(t)$ are read out simultaneously from record lines (2S−1) and 2S and algebraically summed by adder 24, thus generating a common to record lines (2S−1) and 2S chrominance signal $E_c^*(t)$ with a subcarrier frequency $f_o$. The phase shift of the unmodulated chrominance subcarrier between chrominance signals from record lines (2S−1) and 2S and from record lines (2S+1) and (2S+2) constitutes approximately $\phi_{oH}=(\tau/2)(2n-1)$, as in the preceeding case described herein above with reference to FIG. 10.

Luminance signals $E_{y(2S-1)}(t)$ and $E_{y(2S)}(t)$ are simultaneously read from record lines (2S−1) and 2S of memory 23 and used to quadrature modulate the luminance subcarrier in generator 1 which is a generator of reflected modulated signals at the output, the $E_{yQ}(t)$ signal is generated, as in the preceeding case described herein above with reference to FIG. 10. An odd harmonic of a quarter of the horizontal frequency is used as the luminance subcarrier: $f_y=(2d-1/4)f_H$.

The reflected modulated $E_{yQ}(t)$ luminance signal features a phase shift of the unmodulated luminance subcarrier between identically numbered lines of adjacent frames equal to $\phi_{yp}=+(\pi/2)(2d-1)$.

The inputs of adder 25 receive signals $E_c^*(t)$ and $E_{yQ}(t)$ to generate at the output thereof a colour television signal $E_{MQ}'(t)$.

This colour television signal $E_{MQ}'(t)$ thus generated by coder 22 (FIG. 16) is then expanded in time to a double duration by means of memory 33, thus making its frequency spectrum twice narrower, and also lowering the subcarrier frequencies of time-expanded chrominance signal $E_c^*(t)$ and reflected modulated luminance signal $E_{yQ}(t)$ to $f_o/2$ and $f_y/2$, respectively. These time-expanded chrominance signals $E_c^*(t)$ are transmitted during blanking intervals, and the reflected modulated luminance signals $E_{yQ}(t)$ are transmitted on active lines of the composite colour television signal $E_{MQexp}(t)$, wherein the duration of each line is $2\tau_H$, the horizontal frequency is $f_H/2$ and the number of picture lines per frame is $z_2=(z_1/2)=(f_H/2f_p)=\frac{1}{2}Hf_p$, where $z_1$ is the number of picture lines in the initial signal $E_{MQ}'(t)$.

The synchronization signal, separated by separator 5, is passed to converter 34, from the output whereof synchronization signals $E_s$ with a repetition rate of $f_H/2$ are picked off. Converter 34 may also receive, for instance, additional data signals $E_d$ to be mixed to synchronization signals $E_s$ and constitute thus a $E_{sd}$ signal.

Figure 2:
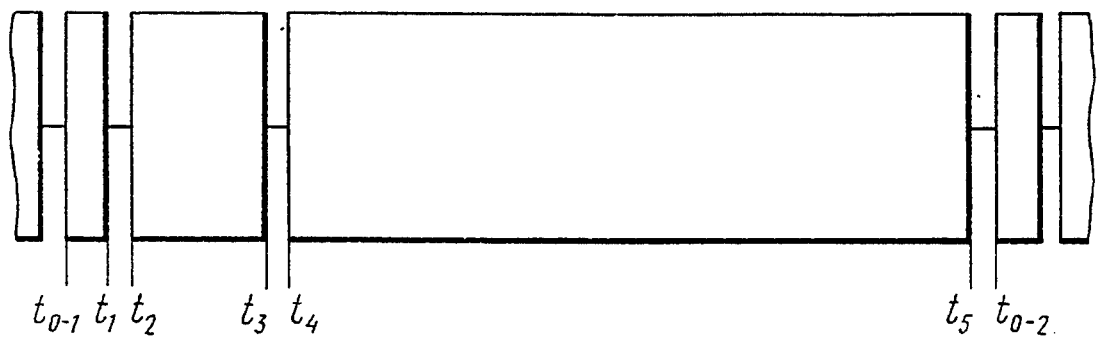
FIG. 2 shows the approximate pattern of a line of the composite colour television signal $E_M(t)$ of a television system with time-division multiplexed luminance and chrominance signals, according to the invention.

In adder 35 the expanded in time colour television signal $E'_{MQexp}(t)$ is combined with the $E_{sd}$ signal to form a composite colour television signal $E_{MQexp}(t)$, the pattern whereof is like that of signal $E_M(t)$ shown in FIG. 2. In this case the time interval from $t_{o-1}$ to $t_{o-2}$ is $2\tau_H$.

At the receiving side the duration of lines in the received composite colour television signal $E_{MQexp}(t)$ is compressed to $\tau_H$, while retaining the frame duration $\tau_p$, this restoring the initial time durations of chrominance signals $E_c^*(t)$ in blanking intervals and reflected modulated luminance signals $E_{yQ}(t)$ in active lines. Correspondingly, the width of their frequency spectra and their rated subcarrier frequencies $f_o$ and $f_y$ are restored.

Figure 17:
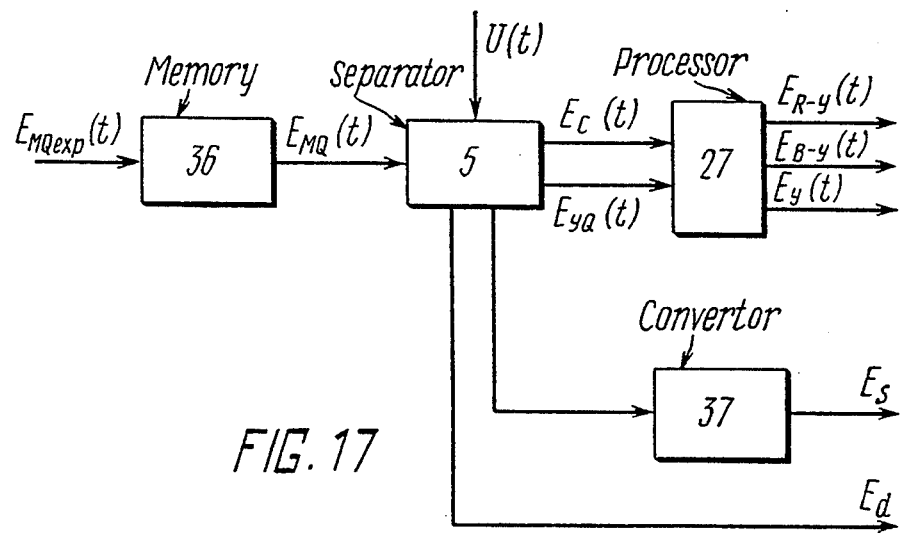
FIG. 17 shows a block diagram for processing at the receiving side the composite colour television signal in the television system of this invention to transmit pictures within a reduced bandwidth.

An embodiment of the functional diagram to process the composite colour television signal $E_{MQexp}(t)$ is presented in FIG. 17.

Memory 36 provides a twofold compression of the duration of picture lines of the received composite colour television signal $E_{MQexp}(t)$ arriving at its input while retaining the frame duration $\tau_p$. This is achieved by setting the ratio of write and readout rates equal to 1:2 in memory 36.

Figure 18:
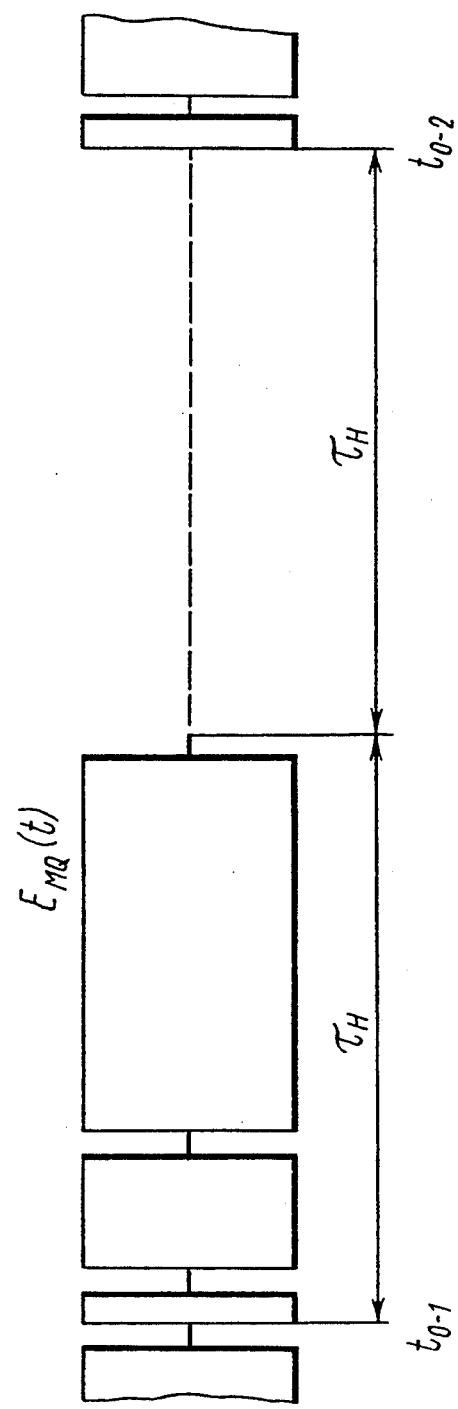
FIG. 18 shows the approximate pattern of the composite colour television signal in the television system providing picture transmission in a reduced bandwidth.

Readout is cycled, with a readout cycle of two $\tau_H$ intervals. In the first interval readout from memory 36 is performed, with readout interval start coincided with input signal values corresponding to the instants of time $t_{o-1}$, $t_{o-2}$ (FIG. 18) and so on. Thereafter, readout is stopped for an interval of $\tau_H$, this resulting in a composite colour television signals $E_{MQ}(t)$ at the output of memory 36; the pattern of this signal is shown in FIG. 18. This signal is then passed to the input of separator 5 (FIG. 17).

The chrominance signal $E_c^*(t)$ and the reflected modulated luminance signal $E_{yQ}(t)$ from the output of separator 5 arrive at processor 27. The functioning of processor 27 was described herein above with reference to FIG. 14. Its outputs are the luminance signal $E_y(t)$ and the colour-difference signals $E_{R-y}(t)$ and $E_{B-y}(t)$ with and $f_H$ horizontal frequency and line duration of $\tau_H$.

Synchronization signals $E_s$ separated by separator 5 (they can also be separated directly at the input of memory 36 prior to signal compression) are passed to converter 37 to produce therefrom synchronization signals of the $f_H$ frequency. Additional data signals $E_d$ are picked off from the other output of separator 5.

The separated luminance signals $E_y(t)$ and colour-difference signals $E_{R-y}(t)$ and $E_{B-y}(t)$ of the picture lines in the first and second fields are used during picture reproduction.

The television system of this invention with simultaneous transmission of colour-difference signals $E_{R-Y}(t)$ and $E_{B-Y}(t)$ in the composite colour television signal $E_{MQ}(t)$) can be modified to provide a $z_3$ number of picture lines at the receiving side to ensure visual perception of the specified vertical definition. The number of scan lines $z_3$ exceeds the number $z_1$ of decomposition lines of the luminance signal $E_y(t)$ and colour-difference signals $E_{R-Y}(t)$ and $E_{B-Y}(t)$ and used at the transmitting side to modulate, respectively, the luminance subcarrier frequency $f_y$ and the chrominance subcarrier frequency $f_o$ to generate the composite colour television signal $E_{MQ}(t)$.

Figure 19:
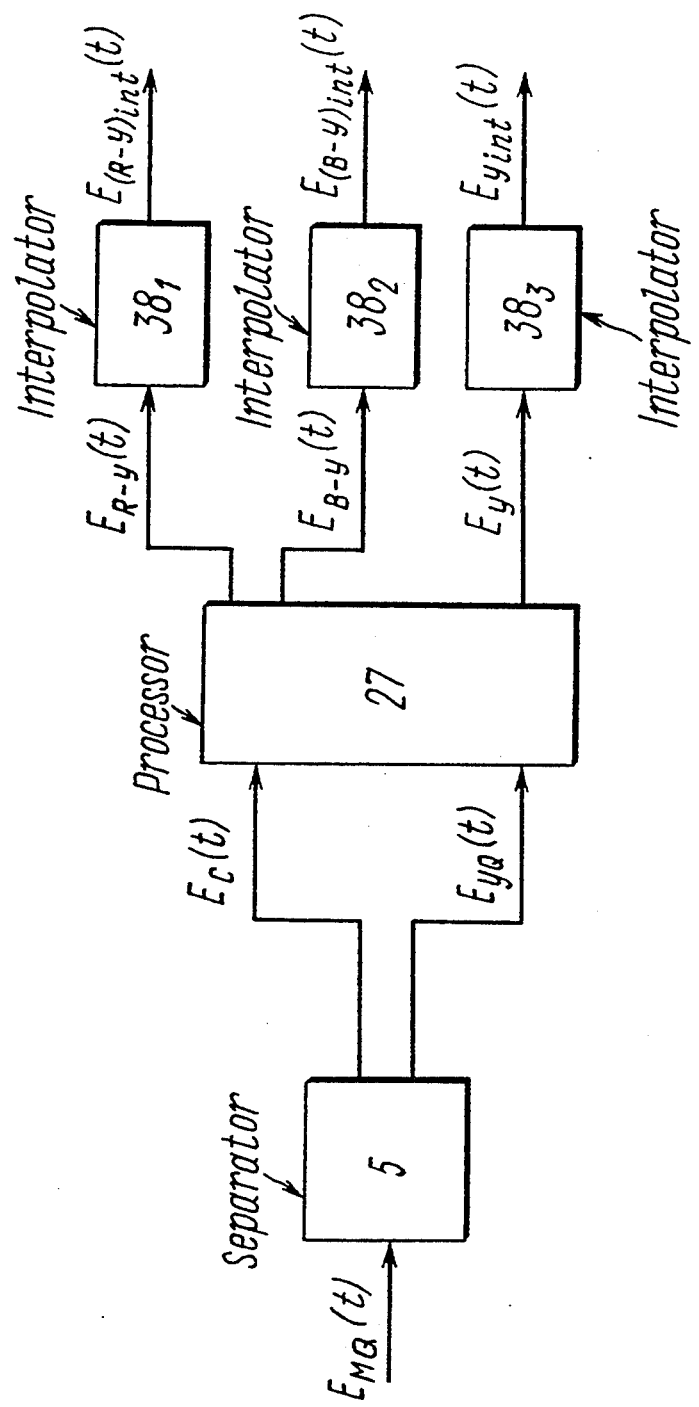
FIG. 19 shows a block diagram for generating, at the receiving side, luminance signals and colour-difference signals with a number of lines exceeding that of the decomposition lines.

Generation of luminance signals $E_y(t)$ and colour-difference signals $E_{R-Y}(t)$ and $E_{B-Y}(t)$ with a number $z_3$ of scan lines may be achieved with the aid of interpolators $38_1$, $38_2$, $38_3$ in the design configuration shown in FIG. 19.

The composite colour television signal $E_{MQ}(t)$ is applied to separator 5, from the output whereof chrominance signals $E_c^*(t)$ are passed to processor 27 (FIG. 14), the functional diagram whereof was described herein above with reference to FIG. 14.

The luminance signal $E_y(t)$ and colour-difference signals $E_{R-Y}(t)$ and $E_{B-Y}(t)$ from the outputs of separators 5 are passed to the inputs of interpolators $38_1$, $38_2$, $38_3$, respectively, wherein interpolation techniques are used to obtain a $z_3$ number of reproduction lines of the $E_y(t)$ luminance signal and the $E_{R-Y}(t)$ and $E_{B-Y}(t)$ colour-difference signals from $z_1$ decomposition lines of these signals. Interpolation of each scan line of the television picture at the receiving side uses l decomposition lines received from the transmission side, wherein half of the l lines are leading and the other half are lagging relative to the interpolated for reproduction on the screen picture line.

Digital filters are used as interpolators $38_1$, $38_2$, $38_3$.

At the transmitting side the number $z_1$ of picture decomposition lines is selected according to the features of the interpolation method to produce $z_3$ reproduction lines from $z_1$ picture lines.

The television system according to this invention, with simultaneous transmission of colour-difference signals during blanking intervals may be modified so, that at the transmitting side, during generation of chrominance signals $E_c(t)$ and reflected modulated luminance signals $E_{yQ}(t)$, the colour-difference signals $E_{R-Y}(t)$ and $E_{B-Y}(t)$ and the luminance signals $E_y(t)$ used as video signals $E_{1-1}(t)$ and $E_{1-2}(t)$ to modulate the luminance subcarrier frequency $f_y$ and chrominance subcarrier frequency $f_o$, are submitted to preliminary correction.

Figure 20:
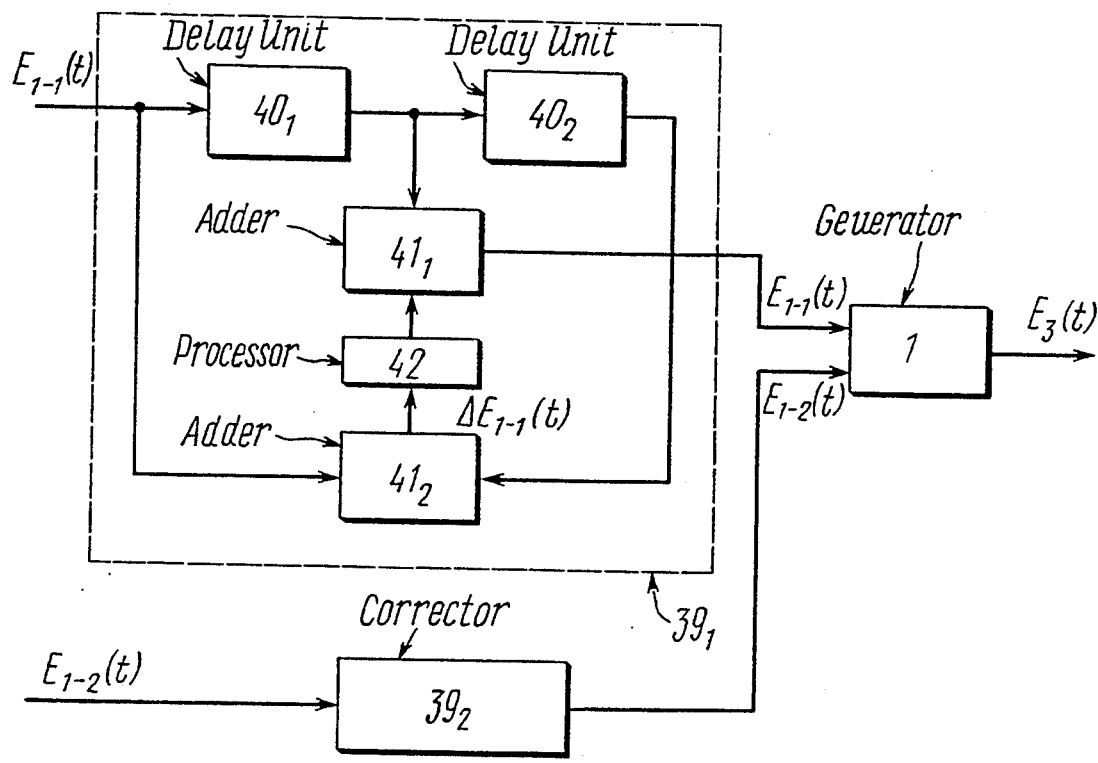
FIG. 20 shows a block diagram for precorrecting luminance and colour-difference signals.

The functional diagram of such a corrector is shown in FIG. 20.

Video signal $E_{1-1}(t)$ and $E_{1-2}(t)$ correctors $39_1$ and $39_2$ are of identical design, so that only corrector $39_1$ will be described.

The input of corrector $39_1$ receives the uncorrected video signal $E_{1-1}(t)$, arriving at the input of delay unit $40_1$, wherein it is delayed by the duration of one frame. The $E_{1-1}(t)$ video signal from the output of delay unit $40_1$ is passed to the input of delay unit $40_2$, wherein it is again delayed by $\tau_p$, and at the same time arrives at an input of algebraic adder $41_1$. The uncorrected video signal $E_{1-1}(t)$ is also applied to an input of algebraic adder $41_2$, the other input whereof receives the output signal of memory $40_2$. A difference signal, $\Delta E_{1-1}(t)$ is generated at the output of algebraic adder $41_2$ and represents the difference in the value of uncorrected video signal $E_{1-1}(t)$ at the moments of time t and $t-2\tau_p$.

This difference signal $\Delta E_{1-1}(t)$ is passed to the input of processor 42 for frequency filtering and noise suppression and the result is then applied to the second input of algebraic adder $41_1$, wherein it is summed with the delayed by $\tau_p$ uncorrected video signal $E_{1-1}(t)$.

The corrected video signal $E_{1-1}(t)$ from the output of algebraic adder $41_1$ arrives at the input of generator 1 to produce a reflected modulated signal $E_3(t)$; generator 1 is described herein above with reference to FIG. 1.

The television system with simultaneous transmission of color-difference signals during blanking intervals can be modified to include special processing of color-difference signals $E_{R-Y}(t)$ and $E_{B-Y}(t)$ and luminance signals $E_y(t)$. During the process of generating the chrominance signal, $E_c(t)$, and the reflected modulated luminance signal, $E_{yQ}(t)$, at the transmitting side, the color-difference signals are used as the $E_{1-1}(t)$ and $E_{1-2}(t)$ signals to modulate the luminance subcarrier frequency $f_y$ and the chrominance subcarrier frequency $f_o$, respectively. The functional diagram for processing video signals $E_{1-1}(t)$ and $E_{1-2}(t)$ is presented in FIG. 21.

Both signals are processed identically, so that processing of only the $E_{1-1}$ video signal shall be described herein below.

Each line of video signal $E_{1-1}(t)$ is entered into memory $43_1$ with a sampling frequency of $f_{s1}$, with readout from memory $43_1$ performed at a varying along the line sampling frequency $f_{s2}(t)$:

$$f_{s2}(t) = \frac{f_{s1}\int_0^{\pi/w_1} \cos\phi_1(t)d\phi}{\cos\phi_1(t)},$$

where $$\phi_1(t) = \frac{2\pi}{w_1\tau_H}\left(\frac{\tau_H + \Delta\tau_H}{2} - t\right),$$

with t varying within the limits from zero to $\tau_H$, $\tau_H$ is the line duration, $\Delta\tau_H$ is the horizontal blanking interval duration, the positive number $w_1$ exceeds 2, $(\pi/w_1)$ is the modulus of $\phi_1(t)$ at $t=\Delta\tau_H/2$.

The video signal $E_{1-1}(t)$ from the output of memory $43_1$ is passed to the input of corrector $44_1$ for frequency correction and the processed video signal is then applied to the input of generator 1 generating a reflected modulated signal of the form of $E_3(t)$ to be included as a component part in composite colour television signal $E_{MQ}(t)$.

At the receiving side the separated $E_y(t)$ luminance signals and $E_{R-Y}(t)$ and $E_{B-Y}(t)$ colour-difference signals are by-line entered into memories $28_1$, $28_2$ and 30, respectively, in $E_{yQ}(t)$ and $E_c(t)$ signal processor 27, described herein above with reference to FIG. 14; writing is performed with a sampling frequency of $f_{s3}$ and readout is carried out with a varying along the line sampling frequency of $f_{s4}(t)$:

$$f_{s4} = \frac{f_{s3}\cos\phi_1(t)}{\int_0^{\pi/w_1}\cos\phi(t)d\phi}$$

Figure 21:
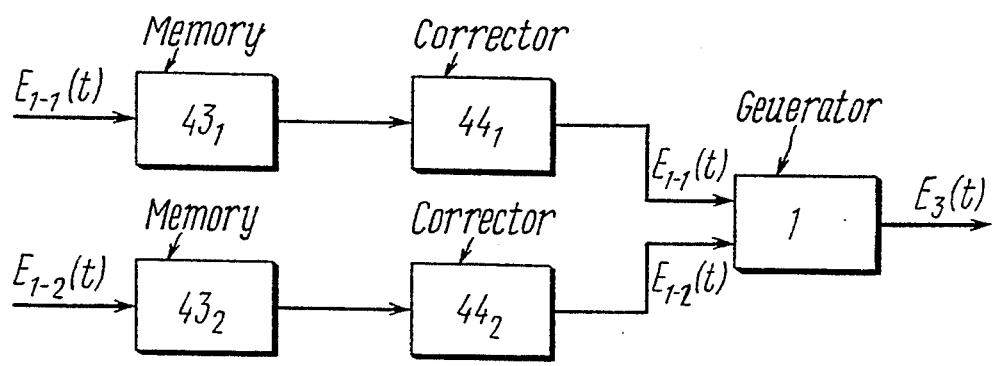
FIG. 21 shows a block diagram for special processing of the luminance and colour-difference signals at the transmitting side.

The television system with simultaneous transmission of colour-difference signals during blanking intervals may be further modified so, that during processing of $E_{1-1}(t)$ and $E_{1-2}(t)$ video signals at the transmitting side, as described herein above with reference to FIG. 21, the sampling frequency $f_{s1}$ be varied during a time interval equal to the field duration $\tau_v$ according to the relation:

$$f_{s1}(t) = \frac{f_{s1} \int_0^{\pi/w_2} \cos\phi_2(t) d\phi}{\cos\phi_2(t)},$$

where $$\phi_2(t) = \frac{2\pi}{w_2 \tau_v} \left( \frac{\tau_v + \Delta\tau_v}{2} - t \right),$$

t varies within the limits from zero to $\tau_v$, $\Delta\tau_v$ is the vertical blanking interval duration, $w_2$ is a positive number exceeding 2, $(\pi/w_2)$ is the modulus of $\phi_2(t)$ at $t=\Delta\tau_v/2$, $f_{s1}(t)=f_{s1}$ at $$\cos\phi_2(t) = \int_0^{\pi/w_2} \cos\phi(t) d\phi,$$

and readout is with a sampling frequency of $f_{s2}(t)$.

At the receiving side processing of luminance signals $E_y(t)$ and colour-difference signals $E_{R-Y}(t)$ and $E_{B-Y}(t)$ (as described herein above with reference to FIG. 14), the write sampling frequency $f_{s3}(t)$ is variable during a field interval duration according to the relation:

$$f_{s3}(t) = \frac{f_{s3} \cos \phi_2(t)}{\int_0^{\pi/w_2} \cos \phi_2(t) d\phi},$$

where $$f_{s3} = f_{s3}(t) \text{ at } \cos \phi_2(t) = \int_0^{\pi/w_2} \cos \phi_2(t) dt,$$

and readout is performed with a sampling frequency $f_{s4}(t)$.

The television system with simultaneous transmission of colour-difference signals during blanking intervals may also be modified to include a time-varying write sampling frequency $f_{s1}(t)$ during processing of the $E_{1-1}(t)$ and $E_{1-2}(t)$ signals at the transmitting side (described herein above with reference to FIG. 21), with write sampling frequency varying during a field duration in accordance to the relation:

$$f_{s1}(t) = \frac{2}{(1 + c_1)\tau_v} f_{s1} [c_1\tau_v + (1 - c_1)|\tau_v + \Delta\tau_v - 2t|],$$

where $|\tau_v + \Delta\tau_v - 2t|$ is the absolute value of $(\tau_v + \Delta\tau_v - 2t)$, $c_1$ is a coefficient equal to the ratio of $f_{s1}(t)$ at $t=\Delta\tau_v/2$ to its value at $t=(\tau_v+\Delta\tau_v)/2$, $c_1 \neq 0$, $f_{s1}$ is the value of $f_{s1}(t)$ at $$t = \frac{\tau_v}{4} + \frac{\Delta\tau_v}{2}.$$

The readout sampling frequency $f_{s2}(t)$ is selected to be time-varying during a line interval $\tau_H$ according to the relation:

$$f_{s2}(t) = \frac{2}{(1 + c_2)\tau_H} f_{s1}(t)[c_2\tau_H + (1 - c_2)|\tau_H + \Delta\tau_H - 2t|],$$

where $|\tau_H + \Delta\tau_H - 2t|$ is the modulus of $(\tau_H + \Delta\tau_H - 2t)$, t varies within the limits from zero to $\tau_H$, $c_2$ is a positive coefficient equal to the ratio of $f_{s2}(t)$ at $t=\tau_H/2$ to its value at $t=(\tau_H+\Delta\tau_H)/2$.

At the receiving side processing of $E_y(t)$ luminance signals and $E_{R-Y}(t)$ and $E_{B-Y}(t)$ colour-difference signals, as described herein above with reference to FIG. 14, is performed with a write sampling frequency $f_{s3}(t)$ varying during a field interval according to the relation:

$$f_{s3}(t) = f_{s3} \frac{0.5(1 + c_1)\tau_v}{c_1\tau_v + (1 - c_1)|\tau_v + \Delta\tau_v - 2t|},$$

where $f_{s3}$ is the value of $f_{s3}(t)$ at $t=(\tau_v/4)+(\Delta\tau_v/2)$. The readout sampling frequency is selected according to:

$$f_{s4}(t) = f_{s3}(t) \frac{0.5(1 + c_2)\tau_H}{c_2\tau_H + (1 - c_2)|\tau_H + \Delta\tau_H - 2t|},$$

where t varies within the limits from zero to $\tau_H$.

EMBODIMENTS

Television signal transmission in a narrow bandwidth.

The television system of this invention, the composite colour television signal $E_{MQ}(t)$ which comprises picture lines of $2\tau_H$ duration, may be used to transmit television signals, for instance via special communications paths, or in recording television programs on domestic video tape recorders. In contrast to the system for transmitting two colour pictures in a combined bandwidth, the description whereof was presented herein above with reference to FIGS. 10, 11, 12, 13, 14, 15, the television system with picture lines of $2\tau_H$ duration can be used, for instance, in satellite communications (with frequency-division multiplexing of the radio frequency channel) to transmit two television programs with different picture decomposition standards, namely, with the European standard (625 lines, 25 frames) and the USA standard (525 lines, 30 frames). Due to a narrower composite colour television signal bandwidth, reduced from the standard 5-6 MHz of the European standard to 2.5-3 MHZ or from the standard 4.2 MHz of the US standard to 2.1 MHz, the deviation ratio and the noise immunity of transmission of each of these programs will be practically the same as that of a standard broadcast program transmission via this satellite communications channel. Another possible application of this system is transmission of high definition television pictures without a proportional widening of the composite colour television signal bandwidth.

Embodiment 1: transmission of a television picture with initially 625 lines, 25 frames (50 fields) via a channel of about 3 MHz bandwidth.

The input signal Em(t) characteristics are: 625 decomposition lines, line duration 64 μs, active line duration 52 μs, chrominance signal transmission duration 10.4 μs (chrominance signal compression ratio 5:1), composite colour television signal bandwidth 6 MHz, luminance signal peak-to-peak valve (from reference black to reference white) 0.7, pedestal amplitude 0.35 (FIG. 8).

Generation of the $E_{MQexp}$ signal:

the $E_{c(2S-1)}*(t)$ chrominance signal with its pedestal is separated out of the $E_{M(2S-1)}(t)$ line signal of the first field and the $E_{c(2S)}*$ chrominance signal with its pedestal is separated out of the $E_{M(2S)}(t)$ line signal of the second field. Algebraic summing (in this case - subtraction) of these voltages generates the $E_c*(t)$ chrominance signal, with the difference between their pedestals yielding zero;

luminance signals $E_{y(2S-1)}(t)$ and $E_{y(2S)}(t)$, separated out of the $E_{M(2S-1)}(t)$ and $E_{M(2S)}(t)$ signals, are complemented with pedestals of 0.35 peak-to-peak value (half the peak-to-peak from reference black to reference white) during the blanking interval, from which chrominance signals have been removed, and the level is clamped to the flat part (top) of the pedestal pulse. The result is bipolar luminance signals $E_{y(2S-1)}(t)$ and $E_{y(2S)}(t)$ with a peak-to-peak value of ±0.35, used to modulate the luminance subcarrier frequency $f_y=(2d-1/4)f_H$, where $f_H$ is the line frequency of the input $E_M(t)$ signal. The reflected modulated luminance signal $E_{yQ}(t)$ features a peak-to-peak value of half the clamping level (DC component), as does the chrominance signal $E_c*(t)$. Signals $E_{yQ}(t)$ and $E_c*(t)$ are summed (they do not coincide in time), thus forming the composite colour television signal $E_{MQ}(t)$, which is expanded in time by a factor of two and then supplemented with synchronization signals $E_s$. The pattern of a composite colour television signal $E_{MQexp}(t)$ with picture lines of $2\tau_H$ duration is shown in FIG. 2.

In this case the interval from $t_{o-1}$ to $t_{o-2}$ (between the leading edges of synchronization signals $E_s$) is 128 μs. The 2 μs interval from $t_{o-1}$ to $t_1$ is used to transmit synchronization signals $E_s$, the $t_1$ to $t_2$, $t_3$ to $t_4$, and $t_5$ to $t_6$ intervals are 0.4 μs guard gaps between signals. The 20.8 μs interval from $t_2$ to $t_3$ is used to transmit chrominance signals $E_c*(t)$, the interval from $t_4$ to $t_5$ with a 104 μs duration is used to transmit the time-expanded reflected modulated luminance signal $E_{yQexp}(t)$. Thus, the input $E_{MQ}(t)$ signal is transformed into the $E_{MQexp}(t)$ signal with the following characteristics:

7812.5 Hz horizontal frequency-7812.5 Hz number of lines per frame-312.5 frame frequency-25 Hz bandwidth of the composite color television signal-3 MHz.

$$E_{yQexp}(t) = E_{y(2S-1)exp}(t)\sin\frac{\omega_y}{2}t + E_{y(2S)exp}(t)\cos\frac{\omega_y}{2}t,$$

where $\omega_y=2\pi f_y$.

The number of independent signal $E_{y(2S-1)exp}(t)$ sin ($\omega y/2$) t, pixels is $2.3.10^6 \cdot 104.10^{-6}=624$, the number of independent pixels in the $E_{y(2S)exp}(t)$ cos ($\omega y/2$) t signal in the same picture line is $2.3.10^6 \cdot 104.10^{-6}=624$. Thus, the total number of independent luminance pixels in one transmitted picture line is $624.2=1248$, this yielding $39.10^4$ pixels per frame, 358,800 pixels per active frame, and $897.10^4$ pixels per second, i.e. the same as in the initial input signal $E_M(t)$.

At the receiving side, the composite colour television signal $E_{MQexp}(t)$ is processed to restore the $E_{y(2S-1)}(t)$ and $E_{y(2S)}(t)$ luminance signals and the $E_c*(t)$ chrominance signal common to both the (2S−1) and the 2S lines, to reproduce the (2S−1) and (2S−1+(z+1/2)), picture lines with the aid of techniques described herein above with reference to FIG. 17.

The restored luminance and chrominance signal parameters correspond to those of the initial signals used to generate the composite colour television signal at the transmitting side.

Embodiment 2: implementation of a high definition television (HDTV) system. Original data: 2,000 independent luminance pixels per line, this corresponding to the requirements of the HDTV 1125/60/2:1 system with a total bandwidth of 33.75 MHz; active line duration $\tau_{Ha}=0.78\tau_H$; horizontal luminance-to-chrominance definition ratio 4:1. These data are selected the same, as in the HDTV 1125 system for convenience of comparison.

The number of independent pixels per active line is $2,000\times0.78=1560$, this, with the difference in formats 16:9 and 4:3 taken into account, provides a higher luminance definition, as compared to 625 lines, 50 fields systems, namely:

as compared to the 625-line system with a 5 MHz bandwidth (CCIR standard G):

$$1560\frac{9}{16}\cdot\frac{4}{3.52\cdot10^{-6}2\Delta F} = \frac{877.5}{390} = 2.25 \text{ times,}$$

where 16:9 is the picture ratio in the HDTV system, 1560 is the number of pixels per active line. The equivalent horizontal definition of the HDTV system is 1560 (9/16)=877.5. 4:3 is the picture ratio in the 625-line system, 52 μs is the active line duration in the 625 lines, 50 fields system;

as compared to the 625-line, ΔF=5.75 MHz system (analogue base of the 4:2:2 digital studio code)-by 1.96 times;

as compared to the 625=line, ΔF=6 MHz system (CCIR standards D, K, K1 and L)-by 1.875 times;

as compared to the 525 lines, 60 fields, ΔF=4.2 MHz system (CCIR standard M, adopted in the USA, Canada, Japan and some other countries)-by about 2.68 times;

as compared to the HDTV 1125=line, ΔF=20 MHz system-by 1.69 times;

as compared to the potential theoretical definition of the MUSE system (748 samples per line) by 2.1 times.

It should be noted, that the value of horizontal definition, calculated as the ratio of independent pixels per active line to the picture ratio, and equal to 877.5 pixels, corresponds to a 1125 pixels horizontal definition. At a viewing distance of 3 to 4 screen heights (or about 1.69 to 2.25 screen widths, correspondingly) this constitutes 41.7 Hz per degree and 32 Hz per degree; at an 877.5 pixel definition (accounting for pixels only in the active line) and at the same viewing angles this yields, respectively, 32.5 Hz per degree and 25.6 Hz per degree. For comparizon, a visual acuity of 1 angular minute, adopted as the rated value for observing natural objects, corresponds to a spatial frequency of 30 Hz per degree.

The required vertical definition is a function of the anisotropy of vertical and horizontal visual definition when observing wide-format images, when the horizontal definition is determined by binocular vision and the vertical resolution is determined by monocular vision. According to physiologic findings, this anisotropy is 0.7 to 0.8, so that at an 877.5 pixel horizontal definition, the vertical definition in the active frame should be some 614 to 702 pixels, or 667 to 763 pixels, with the frame retrace (8%) taken into account. For comparison, in systems with 625 decomposition lines, an active frame is 575 lines, and with interlaced scanning the vertical definition is 364 pixels, with progressive scanning it is about 405 pixels, and with frame retrace taken into account these values are increased to 395 and 440 pixels, respectively. In the 1125-line HDTV system the active frame is 1035 lines and the vertical definition with interlaced scanning is 655 lines (712 pixels with frame retrace taken into account) and about 729 lines with progressive scanning (792 pixel with frame retrace taken into account).

Using a digital filter as an interpolator at the receiving side, with the filter's frequency response featuring a cutoff slope of about 11% to 15% of the passband, the number of decomposition lines may be reduced to $z = 875$, at about 805 to 810 active lines, this providing a vertical definition of the reproduced picture of 725 to 729 pixel per active frame (787.5 pixel with beam retrace taken into account) at an 11% cutoff slope of the filter's frequency response and a vertical definition about 702 to 706 lines per active frame (763 lines, with beam retrace taken into account) at the cutoff slope of the filter frequency response consituting 15% of its passband.

Consequently, the vertical definition attainable by transmitting 875 lines of the original picture decomposition and using interpolation at the receiving side is higher than the definition provided by 625-line systems with interlaced scanning by a factor of 1.9 to 2 and exceeds that of 625-line systems with progressive scanning by 1.74 to 1.8 times.

As compared to the 1125-line HDTV system, the system of this invention provides a 1.07 to 1.11 times higher vertical definition, if the HDTV system uses interlaced scanning and a 0.996 to 1.0 times definition if the HDTV system uses progressive scanning: i.e. the vertical definition of these systems is practically the same.

Transmission of signals in a system with 2000 pixels per line duration $\tau_H$, 875 decomposition lines, and field repetition frequency 50 Hz (25 frames) requires a bandwidth $\Delta F$ of 21.875 MHz, as follows from the following train of reasoning: the line duration $\tau_H = 1/f_p z$; $f_p = 25$ Hz, $z = 875$, so that $f_H = 875 \cdot 25 = 21875$ Hz and $\tau_H = 45.714 \cdot 10^{-6}$ seconds, this yielding $\Delta F = 2000$: $\tau_H = 21.875 \cdot 10^6$ Hz. (This system may be conventionally denoted as HDTV 2000×875/50/2:1.).

The composite colour television signal of this system, $E_M(t)$, arrives at the input of signal separator 5 (FIG. 16), the waveform of this input signal $E_M(t)$ shown in FIG. 8. The time interval from $t_{o-1}$ to $t_{o-2}$ is $45.714 \cdot 10^{-6}$ seconds and is the line duration $\tau_H$; the time interval from $t_{o-1}$ to $t_1$ is about $0.534 \cdot 10^{-6}$ second (about 23.5 independent signal samples) and accommodating the $E_s$ horizontal synchronization signal; the time interval from $t_2$ to $t_3$ is $8 \cdot 914 \cdot 10^{-6}$ seconds long and accommodating the 0.35 peak-to-peak pedestal (half the $E_y(t)$ luminance signal from reference black to reference white). The pedestal mounts the time-compressed $E_{cu}*(t)$ chrominance signal (390 independent samples of the $E_{R-Y}(t)$ colour-difference signal and 390 independent samples of the $E_{B-Y}(t)$ colour-difference signal, which reflected modulate the chrominance subcarrier frequency $f_o$). The time interval from $t_4$ to $t_5$ is $35.66 \cdot 10^{-6}$ seconds long (1560 independent samples of the $E_y(t)$ luminance signal) and constitutes the active line duration $\tau_{Ha}$; $t_1$ to $t_2$, $t_3$ to $t_4$, and $t_4$ to $t_{o-2}$ time intervals are guard spaces, of about $0.2 \cdot 10^{-6}$ seconds duration each (about nine independent signal samples each).

Chrominance signals $E_c*_{(2S-1)}(t)$ and $E_c*_{(2S)}(t)$, with their pedestals are separated out of the composite colour television signal $E_M(t)$ in picture line (2S−1) of the first field and the 2S picture line of the second field "which is spatially adjacent to (2S−1)". Algebraic summing of the separated signal voltages (in this case-subtraction) yields the common to lines (2S−1) and (2S−1+(z+1/2)) chrominance signal $E_c*(t)$, the difference between pedestals being zero.

The blanking intervals, thus freed of the $E_c*(t)$ chrominance signals, are filled by pedestals of 0.35 peak-to-peak value (half the luminance signal from reference black to reference white, FIG. 8), complementing the $E_{y(2S-1)}(t)$ and $E_{y(2S)}(t)$ luminance signals in the (2S−1) and (2S−1+(z+1/2)) picture lines of the $E_M(t)$ composite colour television signal, and the level is then clamped to the flat top of the pedestal pulses. The result is bipolar $E_{y(2S-1)}(t)$ and $E_{y(2S)}(t)$ luminance signals with a ±0.35 peak-to-peak value, used to modulate the luminance subcarrier frequency $f_y = 2d - 1/4\ f_H$, where $f_H$ is the horizontal frequency of the input signal $E_M(t)$ and is 21875 Hz. Assuming $d = 3$, for instance, yields the luminance subcarrier frequency $f_y = 27,343.75$ Hz. The reflected modulated luminance signal $E_{yQ}(t)$ features a peak-to-peak value of ±0.5 from the clamping level, which is the reference ("zero") level and the chrominance signal $E_c*(t)$ has the same peak-to-peak value. Twofold time-expanded chrominance signals $E_c*(t)$ and the reflected modulated modulated luminance signal $E_{yQ}(t)$ are used to generate the composite colour television signal $E_{MQexp}(t)$, the output waveform whereof is illustrated in FIG. 2.

The time interval from $t_{o-1}$ to $t_{o-2}$ is the duration of a line of the transformed input signal in the HDTV system 2000×875/50/2:1 of this invention, the output line duration $\tau_H$ (transmission line duration) being equal to the total time of $4 \cdot 10_3$ individual samples of the 21.875 MHz frequency (about $91.43 \cdot 10^{-6}$ seconds). The time interval from $t_{o-1}$ to $t_1$ is used to transmit horizontal synchronization pulses and is equal to 61 independent samples at a sampling frequency of 21 875 MHz×2 (about $1.386 \cdot 10^{-6}$ seconds).

The time interval from $t_2$ to $t_3$ is allocated to chrominance signals $E_c*(t)$ and is 780 independent samples long, at a sampling frequency of 21.875 MHz×2 (about $17.83 \cdot 10^{-6}$ seconds).

The active line duration $\tau_{Ha}$ is the time interval from $t_4$ to $t_5$ and is used to transmit the reflected modulated luminance signal $E_{yQ}(t)$; it is 3120 independent samples long, at a sampling frequency 21,875 MHz×2, about $71.314 \cdot 10^{-6}$ seconds.

Guard spaces $t_1$ to $t_2$, $t_3$ to $t_4$, $t_5$ to $t_{o-2}$ are about 0.3 μs each.

The horizontal frequency is 21875:2 = 10837.5 Hz.

The bandwidth $\Delta F$ of the output composite colour television signal $E_{MQexp}(t)$ is 10.937 MHz, twice narrower than that of the input signal of the HDTV 2000×875/50/2:1 system and 3.1 times narrower than in the HDTV 1125/60/2:1 system, $\Delta F = 33.75$ MHz, at the same reproduction definition on the receiving screen (1560 independent pixels per line).

As compared to the HDTV 1125/60/1:2 system with

ΔF=20 MHz, the horizontal definition is improved by about 1.69 times, at about a 1.83 times narrower bandwidth.

As compared to the MUSE system, the definition improvement is about by 2.1 times, at an about a 35% wider bandwidth.

The same horizontal difinition as in the HDTV 1125/60/1:2, ΔF=20 MHz, system is provided with a composite colour television signal $E_{MQexp}(t)$ bandwidth ΔF=6.48 MHz.

Introducing a varying horizontal and vertical definition, linearly falling off from 100% at the centre to about 93% at the raster edges (to 87% at the raster corners), this being practically visually imperceptable on the screen, allows narrowing the bandwidth to 6 MHz, this complying to the standard communications channels bandwidth in Europe (the video frequency passband of the modulating composite colour television signal $E_M(t)$).

Processing the composite colour television signal at the receiving side and separation of luminance and chrominance signals out of it are achieved by means of the method, described herein above with reference to FIG. 17.

Additional processing of luminance and color difference signals can be executed with the use of methods, described herein above with reference to FIGS. 19, 20, and 21.

The television system, according to this invention, with (1) time-division multiplexing of signals containing information about luminance and chrominance, (2) horizontal blanking intervals accommodating the chrominance signal which is the chrominance subcarrier, simultaneously reflected modulated by two colour-difference signals, and and, (3) a modification comprising transmission of reflected modulated luminance signals in active lines, provides transmission of a greater volume of information in the same bandwidth, as compared to known television broadcast systems. Since the comparison is to known broadcasting systems with different numbers of decomposition lines and frames, different active line $\tau_{Ha}$ to picture line $\tau_H$ ratios, and also differing in the composite colour television signal bandwidth, comparison is carried out at parameters identical to that of the system of this invention.

Chrominance data per unit time (1 second):

as compared to the SECAM system (625 lines, $\tau_{Ha} \approx 0.8125\tau_H$, ΔF=7 MHz) about 1.4 times higher at low colour saturation and about 2.7 times higher at a 50% "nonlinearity distortions" to nonlinear pre-emphasis in this system depends on colour saturation), no cross-modulation interference from the luminance channel, as is inherent in SECAM;

as compared to the PAL system-approximately equal, though without cross-modulation interference from the luminance channel;

as compared to the MAC-C system (625 lines, ΔF=8.4 MHz) about 1.5 times higher;

as compared to the HDTV system (1125 lines, 30 Hz frame repetition frequency, 60 Hz field repetition frequency, $\tau_{Ha} \approx 0.78\tau_H$, ΔF=20 MHz) twice higher;

as compared to the MUSE system (ΔF=8.1 MHz) twice higher.

Luminance data in an active line, all other things being equal (number of lines and frames, active line duration $\tau_{Ha}$, bandwidth) is more than twice higher, as compared to all other known television broadcasting systems; as compared to systems with frequency-division multiplexed luminance and chrominance signals, an important advantage is the absence of cross-modulation from the chrominance signals.

Theoretical analysis and experimental studies demonstrate the television system of this invention, due to a greater volume of chrominance data transmitted during the horizontal blanking interval, feature the following advantages over standard television broadcasting systems (NTSC, SECAM, PAL):

a higher quality of colour and monochrome (compatible) pictures due to the absence of cross-modulation interference between luminance and chrominance signals; a complete luminance definition, as specified in the broadcast standard; absence of flicker at horizontal colour transitions;

a high flexibility of characteristics in terms of the chrominance signal (variable horizontal, vertical definition, time-variable definition), this being especially useful when the system is used in different communications links. For instance, the colour definition may be varied from 1/5 to over ½ of the luminance definition, with corresponding changes in the vertical resolution from total to ¼ and along the time base from 100% to 50% of the luminance definition. It is essential, that this does not require decoding of the composite colour television signal, which could distort the luminance component;

the sensitivity to frequency and phase distortions in the communications channel is about the same as for monochrome television signals. Due to reflected quadrature modulation, irregularities in the frequency and phase response characteristics, and also differential phase and differential gain distortions, do not cause colour distortions (hue and saturation) on the screen, there are no cross-modulation distortions between the colour-difference signals. A limited pass-band of the communications channel will only affect the picture chrominance and luminance definition, in equal percentages. In sensitivity to passband limitations, the system of this invention is superior not only to existing standard television broadcasting systems, but to the MAC system as well;

no loss of quality, no specific distortions related to separation of the luminance and chrominance components in the original composite colour television signal during transcoding into signals of standard colour television systems, or into signals of digital television systems;

a higher interference immunity of chrominance signals, during transmissions via ground-based and satellite communications channels, and also in video recording applications. The luminance signal interference immunity is higher than that of the MAC system.

Industrial Applicability

The potentialities of the composite colour television signal of the system of this invention determine its wide range of potential applications in various fields of television technology.

1. In television program production, as a system for intermediate coding, because the system of this invention features a number of advantages over existing standard systems, namely:

during signal mixing existing mixers can be used in their monochrome mode, neither decoding nor recoding is required (which substantially degrade the picture quality), no subcarrier phase equalizing is necessary because at a low subcarrier frequency, (for instance 12 kHz, 5°) of subcarrier phase are substantially longer than half a pixel duration, (as required during mixing of monochrome television signals);

generation of composite pictures does not involve remodulation of the composite colour television signals (in contrast to the SECAM system);

composite colour signal recording does not pose additional requirements to the video tape recorder's picture signal path, as compared to those of monochrome television signal recording;

when handling composite colour signals, electronic synthesizers and picture converters do not cause quality degradation related to separation of the luminance and chrominance components in the input signal;

when hardware, utilizing analogue composite colour television signals (existing communications lines, video tape recorders), are used conjointly with hardware or hardware systems handling digital signals, this requiring several digital-to-analogue and analogue-to-digital conversion operations, picture quality is degraded only by quantization noise, as in monochrome television.

2. In ground-based and satellite communications systems, and also in communications systems using radio transmitters and radio relays:

to ensure a high picture quality of colour program transmission (without posing additional requirements to the communications line characteristics, related to transmission of chrominance signals);

to provide colour program transmission via special-purpose communications lines with characteristics, inferior as compared to standard, or time-instable;

to provide colour picture transmission via special-purpose narrowband (1.5 MHz to 2 MHz) channels;

to provide a high picture quality during international television program exchanges with transcoding;

to provide communications between digital television centers via analogue communications lines;

to reduce colorimetric distortions during colour television signal transmission via digital communications channels at reduced bit rates;

to allow creation of a system transmitting two colour television programs via existing communications channels (with a picture quality of each of the programs the same, as when this channel transmits one colour television program of a standard television broadcasting system);

to allow creation of a stereo colour television system with a complete vertical and horizontal definition in the "right" and "left" pictures (complying to the 625 lines, 50 fields television standards) via existing communications channels (the channel characteristics have to comply to additional requirements only in terms of the linearity of the amplitude characteristic, as during transmission of two programs);

to allow creation of HDTV signal transmission via existing communications channels, and also via existing television transmitters and radio relay systems, with higher requirements posed only to the linearity of their amplitude characteristics;

to allow creation of mass-produced television receiver sets to receive HDTV, with requirements to the radio channel characteristics whereof (selector, IFA) are practically the same, as in modern television sets.

3. In semi-professional and domestic video recording:

to ensure a complete luminance definition, for instance complying to the existing 625-line television standard, during recording of signals with a 2.6 MHz to 3 MHz bandwidth;

to provide HDTV signal recording in a 6 MHz to 8 MHz bandwidth on a two-head video tape recorder.

We claim:

1. A method of transmitting by time-division multiplexed signals containing information about luminance and chrominance of a picture in a composite color television signal in a television system, wherein said luminance information of said multiplexed signals allocated to an entire active line interval and time-compressed chrominance signals of said multiplexed signals containing said chrominance information are allocated to horizontal blanking intervals comprising the steps of:

generating said composite color television signal with reflected modulated signals containing reflected lower sidebands information about individual characters of said picture, said reflected modulated signals including reflected modulated luminance signals and chrominance signals;

at the transmitting side, selecting video signals containing information about individual characteristics of the picture used to quadrature modulate subcarriers at the zero and $\pm \pi/2$ phases, to generate said reflected modulated signals at subcarrier frequencies selected so as to ensure the required phase shifts between unmodulated subcarriers in adjacent lines of a frame and in identically numbered lines of adjacent frames;

transmitting during respective time intervals said reflected modulated signals within said composite color television signals;

at the receiving side, separating messages of said reflected modulated signals from said composite color television signals;

directing information contained in said messages to processing channels for processing;

delaying said messages by time intervals constituting multiples of a television scan;

executing conjoint processing of said delayed and undelayed messages of said reflected modulated signals by multiplying said delayed and undelayed messages by harmonic signals with appropriate phases, algebraic summing of the products of multiplications of the delayed and undelayed messages of said reflected modulated signals in each processing channel, and separating corresponding video signals which modulate said quadrature modulated sub-carriers at the transmitting side from a sum of signal voltages of each of said processing channels, said separated corresponding video signals including said reflected luminance signals and color-difference signals by processing said reflected modulated reflected luminance signals and chrominance signals; and equalizing time scales of said reflected luminance signals and said color-difference signals and aligning said luminance signals and said color-difference signals along a time base.

2. A method as claimed in claim 1 wherein at the receiving side conjoint processing of the delayed and undelayed messages of said reflected modulated signals is executed by multiplying one of said delayed and undelayed messages by a harmonic signal $U_1(t)=2 \cos \omega_x t$ of said harmonic signals and by multiplying the other of said delayed and undelayed messages by a harmonic signal $U_2(t)=2 \cos (\omega t+\tau+q\phi_H)$ of said harmonic signals, where $\omega_x=2\pi f_x$, $f_x$ is the harmonic signal frequency and it is higher than an upper limiting frequency in a spectrum of the reflected modulated signal, q is a natural number; the products of said multiplications are algebraically summed, and a summed quadrature modulated signal with unfolded side bands at a high carrier frequency is detected to separate two modulating video signals $E_{1-1}(t)$ and $E_{1-2}(t)$.

3. A method as claimed in claim 1 wherein, at the receiving side, said conjoint processing of the delayed and undelayed messages of said reflected modulated signal is executed directly at one of said subcarrier frequencies by multiplying one of said delayed and undelayed messages by a harmonic signal $U_1(t)=2\cos\omega t$ of said harmonic signals and by multiplying the other of said delayed and undelayed messages by a harmonic signal $U_2(t)=2\cos(\omega t+\pi+q\phi_H)$ of said harmonic signals, where $\omega=2\pi f$ and q is a natural number; algebraically summing the products of said multiplication operations to directly separate the video signal modulating the subcarrier; simultaneously multiplying the delayed and undelayed messages of said reflected modulated signal by harmonic signals $U_3(t)=2\sin\omega t$ and $U_4(t)=2\sin(\omega t+\pi+q^*\phi_H)$ of said harmonic signals, respectively, an algebraic summing of products of said multiplication of said delayed and undelayed messages of said reflected modulated signals by said harmonic signals $U_3(t)$ and $U_4(t)$ to directly separate a second video signal modulating another one of said subcarriers.

4. A method as claimed in claim 1, wherein the composite colour television signal simultaneously transmits both said colour-difference signals by reflected quadrature modulation of a chrominance subcarrier, wherein at the transmitting side said colour-difference signals are used as the video signals to modulate the chrominance subcarrier to the zero and $\pm\pi/2$ phases, thus generating the chrominance signal as said reflected modulated signal at a chrominance subcarrier frequency $$f_o = \frac{(2n-1)f_H \pm (2m-1)f_p}{4},$$

where $f_H$ is the horizontal frequency, $f_p$ is the frame repetition frequency, m and n are natural numbers selected such as to provide a phase shift $\phi_0$ of the colour subcarrier between adjacent lines of one frame $\phi_{0H}$ approximately equal to $(\pi/2)(2n-1)$ and between identically numbered lines of adjacent frames $\phi_{op}=(2i-1)$, where i is an integer, compressing the chrominance signal time scale by a factor of K equal to a ratio of an upper limiting frequency in a rated bandwidth of the composite colour television signal to a selected value of the upper limiting frequency in the chrominance signal transmitted in a single line prior to its time compression; colour synchronization signals, constituting component parts of the chrominance signal, in the form of messages of time-compressed by said factor of K of the reflected modulated chrominance subcarrier signal at a reference phase, are transmitted in several lines of a frame blanking interval, with each message of said colour synchronization signals during the frame blanking interval during a time of chrominance signal transmission in an active line; the time-compressed chrominance signal being transmitted within the composite colour television signal in the intervals between the trailing edge of a horizontal synchronization signal and the start of an active line, wherein at the receiving side messages of said chrominance signal are separated out of the received composite colour television signal and delayed by a frame duration, and algebraically summed to messages of said chrominance signal in identically numbered lines of the undelayed frame signal arriving at the input; messages of chrominance signals summed from identically numbered lines of adjacent frames are additionally delayed by a time interval $T=q\tau_H$, where $\tau_H=1/f_H$ is the line duration, and the delayed and undelayed messages of said chrominance signals are conjointly processed by multiplying them by harmonic signals with appropriate phases, providing a phase shift $\Delta\phi_0$ between the phase $\phi_{01}$ of an unmodulated chrominance subcarrier in the delayed message of said chrominance signal and the phase $\phi_{02}$ of the unmodulated chrominance subcarrier in the undelayed chrominance signal message, related by $\Delta\phi_0=\phi_{07}-\phi_{02}=\omega_0 9\tau_H$, where $\omega_0=2\pi F_0$.

5. A method as claimed in claim 4, wherein said conjoined processing of the delayed and undelayed messages of said algebrically summed chrominance signals and said identically numbered lines of said adjacent frames is executed by multiplying one of said delayed and undelayed messages by a harmonic signal $U_1(t)=2\cos\omega_x t$ of said harmonic signals and by multiplying the other of said delayed and undelayed messages by a harmonic signal $U_2(t)=2\cos(\omega_x t+\pi+\Delta\phi_0)$ of said harmonic signals, where $\omega_x=2\pi f_x$ is the harmonic signal frequency and is higher than an upper limiting frequency in a spectrum of the chrominance signal, and summing the products of said multiplications to produce a chrominance signal with unfolded side bands at a high carrier frequency, and detecting this chrominance signal to separate both said color-different signals.

6. A method as claimed in claim 4, wherein at the receiving side, conjoint processing of the delayed and undelayed messages of algebraically summed chrominance signals in said identically numbered lines of said adjacent frames is executed by multiplying one of said delayed and undelayed messages by a harmonic signal $U_1(t)=2\cos\omega_0 t$ of said harmonic signals and by multiplying the other of said delayed and undelayed messages by a harmonic signal $U_2(t)=2\cos(\omega_0 t+\pi+\Delta\phi_0)$ of said harmonic signals and summing the product of said multiplications to directly separate one of the color-difference signals; simultaneously multiplying the delayed and undelayed messages of said chrominance signals by harmonic signals $U_3(t)=2\sin\omega_0 t$ and $U_4(t)=2\sin(\omega_0 t+\pi+\Delta\phi_0)$, of said harmonic signals, respectively, and algebraically summing the products of these multiplications to directly separate the other color-difference signal.

7. A method as claimed in claim 5 wherein at the receiving side said messages of algebraically summed chrominance signals in said identically numbered lines of said adjacent frames are additionally delayed by a line duration, with the phase shift between the harmonic signals $U_1(t)$ and $U_2H(t)$ whereby the delayed and undelayed chrominance signal messages are multiplied, is equal to $\pi+\Delta\phi_o\approx(\pi/2)(2n+1)$.

8. A method as claimed in claim 5 wherein at the receiving side the messages of algebraically summed chrominance signals in said identically numbered lines of said adjacent frames are additionally delayed by an unequal number of lines in first and second fields, namely: in the first field a delay is set to $T_1=(z+1/2)\tau_H$, where z is the number of decomposition lines, and in the second field a delay is set to $T_2=(z-7/2)\tau_H$, with the phase shift between the harmonic signals $U_1(t)^2$ and $U_2(t)$, whereby delayed and undelayed messages of chrominance signals are multiplied, is set in the first field to $$\pi - \pi\left(\frac{2n-1}{4} \pm \frac{2m-1}{4z}\right)(z+1)$$

and in the second field is set equal to $$\pi - \pi\left(\frac{2n-1}{4} \pm \frac{2m-1}{4z}\right)(z-1).$$

9. A method as claimed in claim 5 wherein at the receiving side the messages of algebraically summed chrominance signals in identically numbered lines of adjacent frames are additionally equally delayed in first and second fields by $T_1=(z+1/2)\tau_H$ and the phase shift between harmonic signals, whereby delayed and undelayed messages of chrominance signals are multiplied, is set equal to $$\pi - \pi\left(\frac{2n-1}{4} \pm \frac{2m-1}{4z}\right)(z+1).$$

10. A method as claimed in claim 1 wherein said composite colour television signal during one picture line transmits said reflected modulated signals containing information on the chrominance and luminance in two spatially adjacent picture lines, and simultaneously transmits in real time two colour television pictures in a common frequency bandwidth, equal to the rated bandwidth allocated for transmission of one such colour picture; wherein at the transmitting side luminance and chrominance signals of two fields of a frame of first and second pictures are stored separately by sequentially writing into record lines of each picture signals of spatially adjacent picture lines of said picture from first and second fields, so that record line (2S−1) stores said information on the luminance and chrominance of the (2S−1) picture line of the first field and record line 2S stores said information on the luminance and chrominance of the (2S−1+(z+1/2)) picture line of the second field, where S is a natural number; said signals stored in said record lines (2S−1) and 2S of the first picture are transformed into a signal of a single transmission line of the first picture, said signals stored in said record lines (2S−1) and 2S of the second picture are transformed into a signal of a single transmission line of the second picture, these transformation operations being executed separately and by identical means, said chrominance signals of a picture are read from said record lines (2S−1) and 2S simultaneously and algebraically summed; recording said lines (2S−1) and 2S chrominance signal of said picture with a chrominance subcarrier frequency f of its original value and with a phase shift $\phi_{OH}$ of the unmodulated subcarrier between transmission lines of one of said first or second pictures generated from signals stored in said record lines (2S−1) and 2S and from said record lines (2S+1) and (2S+2) of the same picture, equal to $\phi_{OH}\approx\pi/2$ (2n−1); signals stored in said record lines (2S−1) and 2S and containing information about the luminance are also transmitted simultaneously by reflected quadrature modulating the luminance subcarrier, with signals read from said record lines (2S−1) and 2S used as said video signals to modulate the subcarrier at the zero and $\pm\pi/2$ phases, thus generating a reflected modulated luminance signal constituting a signal of the $E_3(t)$ kind at a luminance subcarrier frequency selected to be an odd harmonic of a quarter of the horizontal frequency, $f_y$ (2d−1/4)$f_H$, where d is a natural number selected such, that the phase shift $\phi_{yp}$ of the luminance subcarrier between identically numbered lines of adjacent frames is $\phi_{yp}=(\pi/2)$ (2d−1); said generated reflected modulated luminance signals and said chrominance signals containing information on luminance and chrominance held in said record lines (2S−1) and 2S of the first picture, are transmitted in said line (2S−1) of the composite colour television signal, said luminance signals and chrominance signals containing luminance and chrominance data held in said record lines (2S−1) and 2S of the second picture, are transmitted in said line 2S of the composite colour television signal, with said chrominance signals of the first and second pictures transmitted, respectively, during the horizontal blanking intervals, and with said reflected modulated luminance signals of the first and second pictures transmitted without time scaling in the active lines of the composite colour television signal, and with identically numbered lines of adjacent frames carrying signals of the same one of two pictures; at the receiving side said luminance and chrominance signals are separated out of the composite colour television signal and directed to processing channels of each of said first and second pictures, wherein said luminance and chrominance signals are processed identically, and delayed by a frame duration, separation of said chrominance signals of identically numbered picture lines out of the delayed and undelayed composite color television signals and algebraically summing the chrominance signals thus obtained, additionally delaying the algebraically summed chrominance signals from said identically numbered picture lines of adjacent frames by a time interval equal to two picture line durations, selecting the phase shift between the harmonic signals, wherein the delayed and undelayed messages of summed chrominance signals are multiplied, equal to $\pi+\Delta\phi_o\approx(\pi/2)(2n+1)$, using the resulting colour-difference signals from the processing channel outputs to restore chrominance data stored in said record lines (2S−1) and 2S of this given picture; separating messages of said reflected modulated luminance signals of identically numbered lines of adjacent frames out of the delayed by a frame duration ($\tau_p$) and undelayed line signals of a picture and processing them by multiplying by harmonic signals with appropriate phases, algebraically summing the products of these multiplications, and separating luminance signals stored in said record lines (2S−1) and 2S of this picture, delaying the signals containing luminance and chrominance data stored in said record lines 2S by a time interval $T_1=(z+1/2)\tau_H$, and restoring the signals of said picture lines (2S−1) and (2S−1+(z+1/2)) of the interlaced scanning of the original picture.

11. A method as claimed in claim 10, wherein at the receiving side conjoint processing of the delayed and undelayed messages of said reflected modulated luminance signals is executed by multiplying one message by a harmonic signal $U_1(t)=2\cos\omega_{xy}t$ and by multiplying the other message by a harmonic signal $U_2(t)=2\cos=2\cos$, where $\omega_{xy}=2\pi f_{xy}$, $f_{xy}$ is the carrier frequency complying to the requirement that $f_{xy}-f_y$ be higher than the upper limiting frequency in the spectrum of the reflected modulated luminance signal, algebraically summing the products of these multiplications, thereby generating a signal with unfolded sidebands at a carrier frequency $f_{xy}-f_y$, and detecting this signal to separate picture signals stored in said record lines (2S−1) and 2S.

12. A method as claimed in claim 10 wherein at the receiving side conjoint processing of the delayed and undelayed messages of said reflected modulated luminance signals from said identically numbered lines of said adjacent frames is executed directly at a luminance subcarrier frequency $f_y=\omega_y/2\pi$ by multiplying one message by a harmonic signal $U_1(t)=2\cos\omega_y t$ and by multiplying the other message by a harmonic signal $U_2=2\cos$, and algebraically summing the products of these multiplications to directly separate the luminance signal of the (2S−1) record line; by multiplying one message by a harmonic signal $U_3=2\sin\omega_y t$ and by multiplying the other message by a harmonic signal and algebraically summing the products of these multiplications to directly separate the luminance signal of the 2S record line of the picture.

13. A method as claimed in claim 10, wherein processing channels of signals of each of said first and second pictures receive at their inputs the signals of the respective picture to separate therefrom chrominance signals and replicas thereof by delaying them by a time interval $T_1=(z+1/2)\tau_H$, thereafter allocating the undelayed message of the chrominance signal to the blanking interval of the restored luminance signal of the (2S−1) picture line of the given picture, and allocating the delayed message of the chrominance signal to the blanking period of the restored luminance signal of the (2S−1+(z+1/2) picture line of the same picture, thereby restoring the composite colour television signal of the respective picture.

14. A method as claimed in claims 1 or 4 wherein said composite colour television signal during a time interval equal to two picture lines duration transmits expanded in time said reflected modulated containing luminance and chrominance data of two spatially adjacent picture lines, by twofold expanding transmission time of luminance and chrominance signals of each picture line and by generating from pairs of time-expanded and simultaneously transmitted signals of two spatially adjacent picture lines a composite colour television signal with a horizontal frequency $f_H/2$ and a $2\tau_H$ duration of each time-expanded line, and by real-time transmission of said television picture signals with an original number of decomposition lines $z_1=f_H/f_p$ and number of frames per second $N=1/f_p$, with a bandwidth equal to half the rated bandwidth required to transmit signals of such television pictures using current television transmission technology, wherein at the transmitting side the luminance and chrominance signals of two fields of one picture frame are stored by sequentially allocating signals of spatially adjacent picture lines of the first and second fields into record lines, with the (2S−1) record line storing the luminance and chrominance data of the (2S−1) picture line of the first field and the 2S record line storing the luminance and chrominance data of the (2S−1+(z+1/2) picture line of the second field, simultaneously reading signals containing luminance and chrominance data from the (2S−1) and 2S record lines, and algebraically summing these signals, thereby generating a common to record lines (2S−1) and 2S chrominance signal with a subcarrier frequency F and a phase shift of the unmodulated chrominance subcarrier between signals generated from the (2S−1) and 2S record lines and from the (2S+1) and (2S+2) record lines constituting $\Delta\phi_0\approx(\pi/2)(2n-7)$; signals containing luminance data and stored in said (2S−1) and 2S record lines are also transmitted simultaneously by reflected quadrature modulating the luminance subcarrier, wherefore luminance signals read from said record lines (2S−1) and 2S are used as said video signals to modulate the luminance subcarrier at zero and $\pm(\pi/2)$ phases, thereby generating said reflected modulated luminance signal constituting the reflected modulated signal, with a luminance subcarrier frequency $f_y=(2d-1/4)f_H$, this ensuring a phase shift $\phi_{yp}$ of the luminance subcarrier in identically numbered lines of adjacent frames $\phi_{yp}=(\pi/2)(2d-1)$, twofold expanding the transmission time of the generated chrominance signals and reflected modulated luminance signals, thus twofold reducing their bandwidths and also reducing their subcarrier frequencies to $f_o/2$ and $f_y/2$, and transmitting said chrominance signals and reflected modulated luminance signals, respectively, during the blanking intervals and in the active lines of the composite colour television signal, with the duration of each line of the composite colour television signal equal to $2\tau_H$ and the number of picture lines per frame equal to $$z_2 = \frac{f_H}{2f_p} = \frac{1}{2\tau_H}f_p = z\frac{1}{2},$$

and at the receiving side reducing twofold the picture line duration in the received composite colour television signal, thereby restoring the original time duration of the chrominance signals in the blanking intervals and the reflected modulated luminance signals in the active lines and thus, correspondingly, restoring their bandwidths and rated subcarrier frequencies $f_o$ and $f_y$, delaying the restored composite colour television signal by a frame duration to separate said chrominance signal messages and said reflected modulated luminance signals out of the delayed by a frame duration and undelayed signals of identically numbered lines of adjacent frames, algebraically summing the chrominance signal messages from identically numbered lines of adjacent frames, additionally delaying the summed chrominance signals by the duration of two picture lines and selecting the phase shift between harmonic signals, whereby the delayed and undelayed messages of summed chrominance signals are multiplied, equal to $\pi+\Delta\phi_0\approx(\tau/2)(2n+1)$, and using the resulting colour-difference signals to restore the chrominance data stored in said record lines (2S−1) and 2S of the picture; the delayed and undelayed messages of said reflected modulated luminance signals from identically numbered lines of adjacent frames are processed by multiplying by harmonic signals with appropriate phases, algebraically summing the products of these multiplications, and separating the luminance signals of said record lines (2S−1) and 2S, wherein the signals containing chrominance and luminance data of said record lines 2S are delayed by $T_1=(z+1/2)\tau_H$ to restore the signals of picture lines (2S−1) and (2S−1+(z+1/2) of the interlaced scan of the original picture.

15. A method as claimed in 14, wherein at the receiving side the delayed and undelayed messages of said reflected modulated luminance signals are processed by multiplying one message by a harmonic signal $U_1(t)=2\cos\omega_{xy}t$ and by multiplying the other message by a harmonic signal $U_2(t)=2\cos$, where $\omega_{xy}=2\pi_{xy}$, $f_{xy}$ is the carrier frequency complying to the requirement that $f_{xy}-f_y$ be higher than the upper limiting frequency in the spectrum of the reflected modulated luminance signal prior to time expansion, summing the products of these multiplications of said reflected modulated luminance signals by harmonic signals to generate a signal with unfolded sidebands at a high carrier frequency, and detecting this signal to separate the luminance signals stored in said record lines (2S−1) and 2S.

16. A method as claimed in claim 14, wherein at the receiving side conjoint processing of the delayed and undelayed messages of said reflected modulated luminance signals from said identically numbered lines of said adjacent frames is executed directly at the luminance subcarrier frequency $f_y = \omega_y/2\pi$ by multiplying one message by a harmonic signal $U_1(t) = 2 \cos \omega_y t$ and multiplying the other message by a harmonic signal $U_2(t) = 2 \cos$, algebraically summing the products of these multiplications, thereby directly separating the luminance signal stored in the (2S-1) record line; by multiplying one message by a harmonic signal $U_3(t) + 2 \sin \omega_y t$ and multiplying the other message by a harmonic signal $U_4(t) = 2 \cos$ and algebraically summing the products of these multiplications, thereby directly separating the luminance signal stored in the 2S record line.

17. A method as claimed in claim 14 wherein at the receiving side the number of scanning lines providing visual perception of the specified vertical definition is set equal to $z_3$, higher than the number $(z_1)$ of decomposition lines of the luminance signal and colour-difference signals at the transmitting side, with the number of display lines, $z_3$, of each of the luminance signal and colour-difference signals derived from the number of decomposition lines $z_1$ by interpolation, using 1 decomposition lines from the transmitting side to interpolate each scan line at the receiving side, half of these 1 lines preceding the line being displayed and the other half of these lines following the line being interpolated, and the number $z_1$ of decomposition lines at the transmitting side being selected, with the characteristics of the interpolation technique taken into account.

18. A method as claimed in claim 14, wherein at the transmitting side, during generation of the chrominance signals and said reflected modulated luminance signals, the colour-difference signals, and the luminance signals used to modulate the chrominance and luminance subcarriers, respectively, as the modulating video signals, are submitted to precorrection, with the uncorrected video signal modulating the respective subcarrier is delayed by a time interval of two frame durations $(\tau_p)$, a difference signal is generated as the difference of uncorrected signal values at the moments of time t and $t - 2\tau_p$, the difference signals are submitted to the required frequency filtration and noise suppression, the difference signal is algebraically added to the uncorrected video signal delayed by a frame duration, thereby generating corrected signals used as modulating signals to generate reflected modulated signals to be included in the composite colour television signal.

19. A method as claimed in claim 14 wherein at the transmitting side, during generation of chrominance signals and said reflected modulated luminance signals, colour-difference signals and luminance signals used to modulate the chrominance and luminance subcarriers, respectively, as video signals are submitted to processed by, recording the signals of each picture line at a sampling frequency $f_{s1}$, reading the stored signals of each line along the line sampling frequency $$f_{s2}(t) = \frac{f_{s1} \int_0^{\pi/w_1} \cos \phi_1(t) d\phi}{\cos \phi_1(t)},$$

where $$\phi_1(t) = \frac{2\pi}{w_1 \tau_H} \left( \frac{\tau_H + \Delta\tau_H}{2} - t \right),$$

t varies from zero to $\tau_H$, $\tau_H$ is the picture line duration, $\Delta\tau_H$ is the horizontal blanking interval duration, $w_1$ is a positive number exceeding 2, $\pi/w_1$ is the modulus of $\phi_1(t)$ at $t = \Delta\tau_H/2$; thus preprocessed video signals are frequency corrected and used to modulate the chrominance and luminance subcarriers, respectively, to generate the chrominance signals and said reflected modulated luminance signals constituting said reflected modulated signals included in the composite colour television signal, and at the receiving side the separated luminance signals and colour-difference signals are by-line recorded at a sampling frequency $f_{s3}$ and read at a varying along the line sampling frequency $$f_{s4} = \frac{f_{s3} \cos \phi_1(t)}{\int_0^{\pi/w_1} \cos\phi_1(t) d\phi}.$$

20. A method as claimed in claim 19, wherein at the transmitting side, during processing of the modulating signals, the sampling frequency $f_{s1}(t)$ during recording is time-variable within a time interval equal to the field duration $(\tau_v)$ according to:

$$f_{s1} = \frac{f_{s1} \int_0^{\pi/w_1} \cos\phi_2(t) d\phi}{\cos\phi_2},$$

where $$\phi_2(t) = \frac{2\pi}{w_2 \tau_v} \left( \frac{\tau_v - \Delta\tau_v}{2} - t \right),$$

t varies from zero to $\tau_v$, $\Delta\tau_v$ is the vertical blanking interval, $w_2$ is a positive number exceeding 2, $\pi/w_2$ is the modulus of $\phi_2(t)$ at $t = \Delta\tau_v/2$, $f_{s1}(t) = f_{s1}$ at $$\cos\phi_2(t) = \int_0^{\pi/w_2} \cos\phi_2(t) d\phi,$$

and in processing of luminance signals and color difference signals separated at the receiving side the sampling frequency $f_{s3}$ during recording varies in a time interval of the field duration according to:

$$f_{s3}(t) = \frac{f_{s1} \cos \phi_2(t)}{\int_0^{\pi/w_2} \cos \phi_2(t) d\phi},$$

where $$f_{s3}(t) = f_{s3} \text{ at } \cos \phi_2(t) = \int_0^{\pi/w_2} \cos \phi_2(t) d\phi.$$

21. A method as claimed in claims 19, wherein during modulating video signals processing at the transmitting side the sampling frequency $f_{s1}$ for recording is selected time-variable during an interval equal to the field duration $\tau_v$ in accordance to:

$$f_{s1}(t) = \frac{2}{(1+c_1)\tau_v} f_{s1} [c_1\tau_v + (1-c_1)|\tau_v + \Delta\tau_v - 2t|]$$

Where $|\tau_v + \Delta\tau_v - 2t|$ is the absolute value of $(\tau_v + \Delta\tau_v - 2t)$, $c_1$ is an unequal to zero positive number denoting a coefficient equal to the ratio of $f_{s1}(t)$ values at $t = \Delta\tau_v/2$ and at $t = (\tau_v + \Delta\tau_v)/2$, $f_{s1}$ is the value of $f_{s1}(t)$ at $t = (\tau_v + 2\Delta\tau_v)/4$, the sampling frequency $f_{s2}(t)$ during reading is selected time-variable in a time interval equal to the line duration $(\tau_H)$ according to:

$$f_{s2}(t) = \frac{2}{(1+c_2)\tau_H} f_{s1}(t)[c_2\tau_H + (1-c_2)|\tau_H + \Delta\tau_H - 2t|],$$

where $|\tau_H + \Delta\tau_H - 2t|$ is the modulus of $(\tau_H + \Delta\tau_H - 2t)$, t varies from zero to $\tau_H$, $c_2$ is a positive unequal to zero number denoting the ratio of $f_{s2}(t)$ value at $t = \tau_H/2$ to its value at $t = (\tau_H + \Delta\tau_H)/2$, and at the receiving side the sampling frequency $f_{s3}(t)$ during recording is selected to be time-variable during a time interval equal to the field duration $\tau_v$ according to:

$$f_{s3}(t) = f_{s3} \frac{0.5(1+c_1)\tau_v}{c_1\tau_v + (1-c_1)|\tau_v + \Delta\tau_v - 2t|},$$

where $f_{s3}$ is the value of $f_{s3}(t)$ at $t = (\tau_v + 2\Delta\tau_v)/4$, and the sampling frequency $f_{s4}(t)$ during readout is selected time-variable in a time interval equal to the line duration $\tau_H$ according to:

$$f_{s4}(4) = f_{s3}(t) \frac{0.5(1+c_2)\tau_H}{c_2\tau_H + (1-c_2)|\tau_H + \Delta\tau_H - 2t|},$$

where t varies from zero to $\tau$.

22. A method as claimed in claim 6, wherein at the receiving side messages of algebraically summed chrominance signals in said identically numbered lines of said adjacent frames are additionally delayed by a line duration and wherein the phase shift between the harmonic signals, by which said delayed and undelayed chrominance signal are multiplied, is equal to $(\pi/2) + \Delta\phi_0 \approx (\pi/2)(2n+1)$.

23. A method as claimed in claim 6, wherein at the receiving side the messages of algebraically summed chrominance signals in said identically numbered lines of said adjacent frames are additionally delayed by an unequal number of lines in the first and second fields, namely: in the first field the delay is set to $T_1 = (z+1/2)\tau_H$, where z is the number of decomposition lines, and in the second field the delay is set to $T_2 = (z-1/2)\tau_H$, and wherein the phase shift between the harmonic signals, by which said delayed and undelayed messages of chrominance signals are multiplied, is set in the first field to $$\pi - \pi\left(\frac{2n-1}{4} \pm \frac{2m-1}{4z}\right)(z+1)$$

and in the second field is set equal to $$\pi - \pi\left(\frac{2n-1}{4} \pm \frac{2m-1}{4z}\right)(z-1).$$

24. A method as claimed in claim 6, wherein at the receiving side the messages of algebraically summed chrominance signals in said identically numbered lines of said adjacent frames are additionally, and equally, delayed in the first and second fields by $T_1 = (z+1/2)\tau_H$ and wherein the phase shift between harmonic signals, by which said delayed and undelayed messages of chrominance signals are multiplied, is set equal to $$\pi - \pi\left(\frac{2n-1}{4} \pm \frac{2m-1}{4z}\right)(z+1).$$

25. A method as claimed in claim 20 wherein during modulating video signals ($E_{1-1}(t)$, ($E_{1-2}(t)$) processing at the transmitting side the sampling frequency $f_{s1}$ for recording is selected time-variable during an interval equal to the field duration $\tau_v$ in accordance to:

$$f_{s1}(t) = \frac{2}{(1+c_1)\tau_v} f_{s1} [c_1\tau_v + (1-c_1)|\tau_v + \Delta\tau_v - 2t|]$$

where $|\tau_v + \Delta\tau_v - 2t|$ is the absolute value of $(\tau_v + \Delta\tau_v - 2t)$, $c_1$ is an unequal to zero positive number denoting a coefficient equal to the ratio of $f_{s1}(t)$ values at $t = \Delta\tau_v/2$ and at $t = (\tau_v + \Delta\tau_v)/2$, $f_{s1}$ is the value of $f_{s1}(t)$ at $t = (\tau_v + 2\Delta\tau_v)/4$, the sampling frequency $f_{s2}(t)$ during reading is selected time-variable in a time interval equal to the line duration $(\tau_H)$ according to:

$$f_{s2}(t) = \frac{2}{(1+c_2)\tau_H} f_{s1}(t)[c_2\tau_H + (1-c_2)|\tau_H + \Delta\tau_H - 2t|]$$

where $|\tau_H + \Delta\tau_H - 2t|$ is the modulus of $(\tau_H + \Delta\tau_H - 2t)$, t varies from zero to $\tau_H$, $c_2$ is a positive unequal to zero number denoting the ratio of $f_{s2}(t)$ value at $t = \tau_H/2$ to its value at $t = (\tau_H + \Delta\tau_H)/2$, and at the receiving side the sampling frequency $f_{s3}(t)$ during recording is selected to be time-variable during a time interval equal to the field duration $\tau_v$ according to:

$$f_{s3}(t) = f_{s3} \frac{0.5(1+c_1)\tau_v}{c_1\tau_v + (1-c_1)|\tau_v + \Delta\tau_v - 2t|}$$

where $f_{s3}$ is the valuse of $f_{s3}(t)$ at $t = (\tau_v + 2\Delta\tau_v)/4$, and the sampling frequency $f_{s4}(t)$ during readout is selected time-variable in a time interval equal to the line duration $\tau_H$ accoriding to:

$$f_{s4}(t) = f_{s3}(t) \frac{0.5(1+c_2)\tau_H}{c_2\tau_H + (1-c_2)|\tau_H + \Delta\tau_H - 2t|}$$

where t varies from zero to $\tau_H$.

* * * * *